United States Patent
Lin et al.

(10) Patent No.: US 11,249,282 B2
(45) Date of Patent: Feb. 15, 2022

(54) PHOTOGRAPHING OPTICAL LENS ASSEMBLY, IMAGING APPARATUS AND ELECTRONIC DEVICE

(71) Applicant: LARGAN PRECISION CO., LTD., Taichung (TW)

(72) Inventors: Cheng-Chen Lin, Taichung (TW); Chun-Yen Chen, Taichung (TW); Yu-Tai Tseng, Taichung (TW); Kuan-Ting Yeh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 240 days.

(21) Appl. No.: 16/299,381

(22) Filed: Mar. 12, 2019

(65) Prior Publication Data

US 2019/0377161 A1 Dec. 12, 2019

(30) Foreign Application Priority Data

Jun. 6, 2018 (TW) .................................. 107119522

(51) Int. Cl.
*G02B 3/02* (2006.01)
*G02B 13/18* (2006.01)
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
CPC .. G02B 9/64; G02B 13/0045; G02B 13/0015; G02B 13/18

USPC .......................................................... 359/708
See application file for complete search history.

(56) References Cited

U.S. PATENT DOCUMENTS

| 2015/0277083 | A1* | 10/2015 | Chae ........................ G02B 9/64 |
| | | | 359/708 |
| 2015/0378131 | A1* | 12/2015 | Tang ........................ G02B 9/64 |
| | | | 359/708 |
| 2016/0306140 | A1* | 10/2016 | Chen ........................ G02B 9/62 |
| 2017/0184819 | A1 | 6/2017 | Shi | |
| 2018/0188484 | A1 | 7/2018 | Gong et al. | |

(Continued)

FOREIGN PATENT DOCUMENTS

| CN | 106896474 A | 6/2017 |
| CN | 107797237 A | 3/2018 |

(Continued)

*Primary Examiner* — Mahidere S Sahle
(74) *Attorney, Agent, or Firm* — McClure, Qualey & Rodack, LLP

(57) ABSTRACT

A photographing optical lens assembly includes seven lens elements, the seven lens elements are, in order from an object side to an image side, a first lens element, a second lens element, a third lens element, a fourth lens element, a fifth lens element, a sixth lens element and a seventh lens element, wherein the first lens element has positive refractive power, the fifth lens element with negative refractive power has image-side surface being concave in a paraxial region thereof, the sixth lens element has an image-side surface being convex in a paraxial region thereof, and the seventh lens element has an image-side surface being concave in a paraxial region thereof, wherein the image-side surface of the seventh lens element includes at least one convex critical point in an off-axis region thereof.

29 Claims, 27 Drawing Sheets

(56) References Cited

U.S. PATENT DOCUMENTS

| | | | |
|---|---|---|---|
| 2018/0188488 A1* | 7/2018 | Gong | G02B 13/0045 |
| 2019/0004285 A1* | 1/2019 | Tang | G02B 9/64 |
| 2019/0079270 A1* | 3/2019 | Tseng | G02B 13/18 |

FOREIGN PATENT DOCUMENTS

| | | | |
|---|---|---|---|
| CN | 107817581 A | 3/2018 | |
| CN | 108121055 A | 6/2018 | |
| CN | 108363180 A | 8/2018 | |
| CN | 108363186 A | 8/2018 | |
| TW | I622822 B | 5/2018 | |
| TW | 201819976 A | 6/2018 | |

* cited by examiner

PHOTOGRAPHING OPTICAL LENS ASSEMBLY, IMAGING APPARATUS AND ELECTRONIC DEVICE

RELATED APPLICATIONS

This application claims priority to Taiwan Application Serial Number 107119522, filed Jun. 6, 2018, which is herein incorporated by reference.

BACKGROUND

Technical Field

The present disclosure relates to a photographing optical lens assembly and an imaging apparatus. More particularly, the present disclosure relates to a compact photographing optical lens assembly and an imaging apparatus which are applied to electronic devices.

Description of Related Art

With the advancement of the manufacturing process of the semiconductor technology, the performances of image sensors have been enhanced, and the pixel size is minimized. Therefore, photographing optical lens assemblies with high image quality have played an important role the related fields. With recent technology advances, the applicable range of the electronic device including an optical lens assembly has expanded, and the demands for photographing optical lens assemblies are becoming more diverse. However, because of the difficulty of balancing requirements among image quality, sensitivity, aperture size, volume or viewing angle of the conventional optical lens assembly, creating an optical lens assembly which can satisfy all the aforementioned demands has become the major goal in the related fields.

SUMMARY

According to one aspect of the present disclosure, a photographing optical lens assembly includes seven lens elements, the seven lens elements are, in order from an object side to an image side, a first lens element, a second lens element, a third lens element, a fourth lens element, a fifth lens element, a sixth lens element and a seventh lens element, wherein the first lens element has positive refractive power, the fifth lens element with negative refractive power has an image-side surface being concave in a paraxial region thereof, the sixth lens element has an image-side surface being convex in a paraxial region thereof, and the seventh lens element has an image-side surface being concave in a paraxial region thereof, wherein the image-side surface of the seventh lens element includes at least one convex critical point in an off-axis region thereof. Wherein an Abbe number of the fourth lens element is V4, an Abbe number of the fifth lens element is V5, a focal length of the third lens element is f3, a focal length of the fifth lens element is f5, and the following conditions are satisfied:

$V4+V5<70$; and $-4.0<f5/f3<8.0$.

According to another aspect of the present disclosure, an image apparatus includes the photographing optical lens assembly according to the aforementioned aspect and an image sensor disposed on an image surface of the photographing optical lens assembly.

According to another aspect of the present disclosure, an electronic device includes the image apparatus according to the aforementioned aspect.

According to another aspect of the present disclosure, a photographing optical lens assembly includes seven lens elements, the seven lens elements are, in order from an object side to an image side, a first lens element, a second lens element, a third lens element, a fourth lens element, a fifth lens element, a sixth lens element and a seventh lens element, wherein the first lens element has positive refractive power, the fifth lens element with negative refractive power has an image-side surface being concave in a paraxial region thereof, the sixth lens element has an image-side surface being convex in a paraxial region thereof, and the seventh lens element has an image-side surface being concave in a paraxial region thereof, wherein the image-side surface of the seventh lens element includes at least one convex critical point in an off-axis region thereof. Wherein an Abbe number of the fourth lens element is V4, an Abbe number of the fifth lens element is V5, a focal length of the photographing optical lens assembly is f, a focal length of the fifth lens element is f5, and the following conditions are satisfied:

$V4+V5<70$; and $f/f5 \leq -0.25$.

According to another aspect of the present disclosure, an image apparatus includes the photographing optical lens assembly according to the aforementioned aspect and an image sensor disposed on an image surface of the photographing optical lens assembly.

According to another aspect of the present disclosure, an electronic device includes the image apparatus according to the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
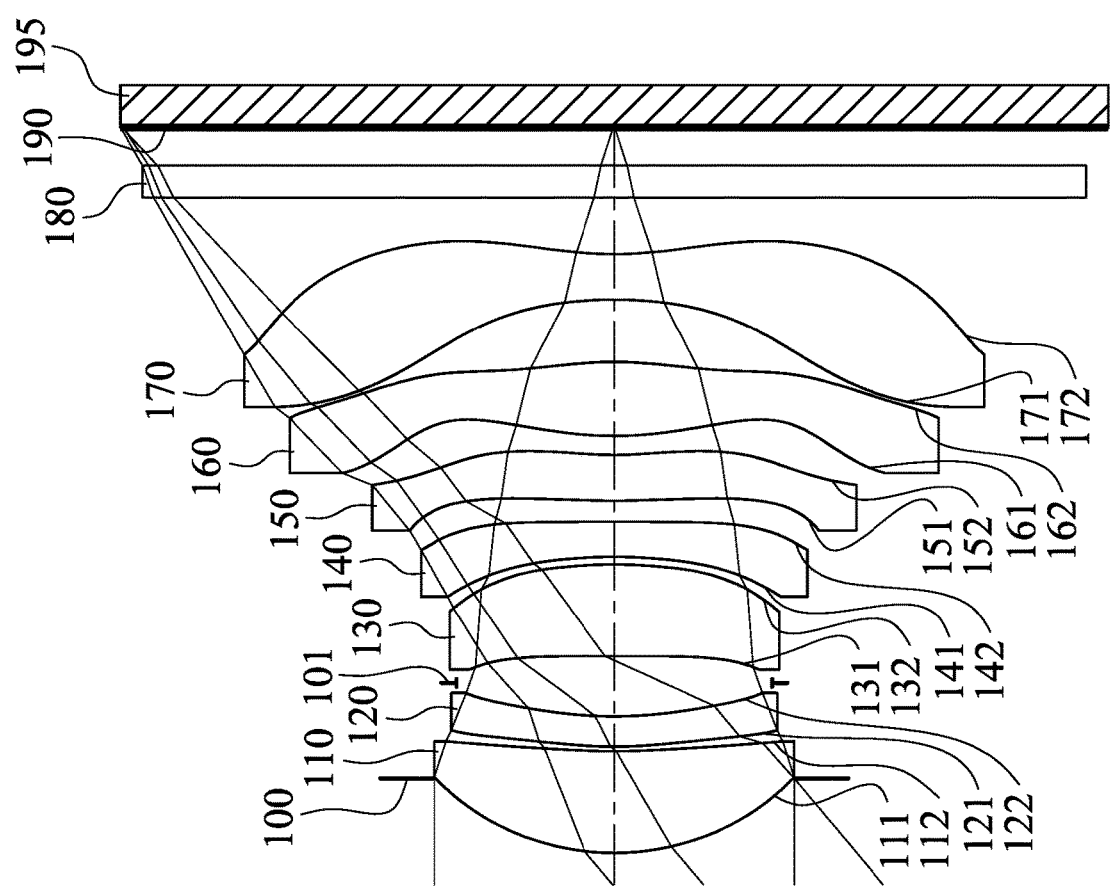
FIG. 1 is a schematic view of an imaging apparatus according to the 1st embodiment of the present disclosure.

A photographing optical lens assembly includes seven lens elements, the seven lens elements are, in order from an object side to an image side, a first lens element, a second lens element, a third lens element, a fourth lens element, a fifth lens element, a sixth lens element and a seventh lens element.

The first lens element has positive refractive power. Therefore, the total track length of the photographing optical lens assembly can be reduced.

The fifth lens element has negative refractive power. Therefore, the arrangement of the overall refractive power of the photographing optical lens assembly can be balanced. An image-side surface of the fifth lens element is concave in a paraxial region thereof. Therefore, the photographing optical lens assembly can have a configuration in a paraxial region thereof for positioning the exit pupil closer to an imaged object, and can control the shape in the off-axis region thereof. Thus, it is favorable for the fifth lens element to correct images in the peripheral region thereof, and the shape (such as the overall lens shape of the fifth lens element can be less curved) of the photographing optical lens assembly can be miniaturized. Moreover, the image-side surface of the fifth lens element can include at least two inflection points. Furthermore, the image-side surface of the fifth lens element can include at least one convex critical point. Therefore, it is favorable for correcting the image in the peripheral region thereof, and the compactness of the photographing optical lens assembly can be achieved.

The sixth lens element has an image-side surface being convex in a paraxial region thereof. Therefore, it is favorable for correcting aberrations. The sixth lens element can have positive refractive power. Therefore, it is favorable for providing sufficient refractive power so as to further reduce the total track length of the photographing optical lens assembly.

The seventh lens element has an image-side surface being concave in a paraxial region thereof. Therefore, it is favorable for positioning the principal point of the photographing optical lens assembly toward the object side so as to reduce the total track length of the photographing optical lens assembly. The image-side surface of the seventh lens element includes at least one convex critical point. Therefore, an incident angle of light on the image surface can be suppressed so as to enhance the image quality in the peripheral region thereof. The seventh lens element can have negative refractive power. Therefore, the compactness of the photographing optical lens assembly can be achieved.

When an Abbe number of the fourth lens element is V4, and an Abbe number of the fifth lens element is V5, the following condition is satisfied: V4+V5<70. Therefore, the compact photographing optical lens assembly can further reduce chromatic aberration so as to increase the image quality. Especially, the image quality in the peripheral region thereof can be further increased. Moreover, the following condition can be satisfied: V4+V5<50.

When a focal length of the third lens element is f3, and a focal length of the fifth lens element is f5, the following condition is satisfied: −4.0<f5/f3<8.0. Therefore, the refractive power of the fifth lens element and other lens elements can be properly distributed so as to prevent high variations of refractive power between lens elements resulting excessive or insufficient aberration corrections. Moreover, the following condition can be satisfied: −3.0<f5/f3<3.0.

When a focal length of the photographing optical lens assembly is f, and the focal length of the fifth lens element is f5, the following condition can be satisfied: f/f5≤−0.25. Therefore, it is favorable for providing enough negative refractive power from the fifth lens element so as to balance the refractive power on the image side of the photographing optical lens assembly. Moreover, the following condition can be satisfied: −1.50<f/f5<−0.50.

When a focal length of the second lens element is f2, and the focal length of the fifth lens element is f5, the following condition can be satisfied: f5/f2<2.0. Therefore, refractive power of the fifth lens element and other lens elements can be properly distributed so as to prevent high variations of refractive power between lens elements resulting excessive or insufficient aberration corrections. Moreover, the following condition can be satisfied: 0<f5/f2<2.0.

When an axial distance between an object-side surface of the first lens element and the image-side surface of the seventh lens element is Td, and an entrance pupil diameter of the photographing optical lens assembly is EPD, the following condition can be satisfied: 1.0<Td/EPD<2.0. Therefore, a proper balance between miniaturization and a large aperture configuration can be obtained.

When an axial distance between the object-side surface of the first lens element and an image surface is TL, and a maximum image height of the photographing optical lens assembly is ImgH, the following condition can be satisfied: 0.80<TL/ImgH<1.70. Therefore, the configuration of the field of view and the total track length of the photographing optical lens assembly can be more proper so as to enhance the compactness thereof. Moreover, the following condition can be satisfied: 0.80<TL/ImgH<1.60. Furthermore, the following condition can be satisfied: 0.90<TL/ImgH<1.55.

When the focal length of the photographing optical lens assembly is f, and a curvature radius of an image-side surface of the fifth lens element is R10, the following condition can be satisfied: 1.0<f/R10<3.0. Therefore, it is favorable for providing better image correction in the peripheral region of the fifth lens element and the compactness of the photographing optical lens assembly with a more suitable shape of the fifth lens element. Moreover, the following condition can be satisfied: 1.0<f/R10<2.30.

When a curvature radius of an object-side surface of the sixth lens element is R11, and a curvature radius of the image-side surface of the sixth lens element is R12, the following condition can be satisfied: |(R11+R12)/(R11−R12)|<0.50. Therefore, it is favorable for obtaining a proper balance between the compactness and the image quality with the shape configuration of the sixth lens element. Moreover, the following condition can be satisfied: |(R11+R12)/(R11−R12)|<0.25.

When an axial distance between the object-side surface of the first lens element and the image-side surface of the seventh lens element is Td, and a sum of all central thicknesses of lens elements of the photographing optical lens assembly is ΣCT, the following condition can be satisfied: 1.0<Td/ΣCT<1.55. Therefore, it is favorable for avoiding gaps between each lens element of the photographing optical lens assembly from being excessively large, so that internal space therein is underutilized and lens miniaturization becomes difficult.

When an Abbe number of the sixth lens element is V6, the following condition can be satisfied: V6<32. Therefore, it is favorable for eliminating chromatic aberration of the photographing optical lens assembly so as to increase the image quality in the peripheral region thereof.

When a number of the lens elements of the photographing optical lens assembly having Abbe numbers less than or equal to 40 is V40, the following condition can be satisfied: 5≤V40. Therefore, chromatic aberration of the photographing optical lens assembly can be further eliminated so as to increase the image quality.

When a curvature radius of the object-side surface of the first lens element is R1, and the curvature radius of the image-side surface of the fifth lens element is R10, the following condition can be satisfied: 0.75<R10/R1<2.0. Therefore, it is favorable for the first lens element and the fifth lens element to obtain shapes more suitable for image corrections in the peripheral region and for miniaturizing the photographing optical lens assembly.

When a central thickness of the sixth lens element is CT6, and an axial distance between the sixth lens element and the seventh lens element is T67, the following condition can be satisfied: 1.0<CT6/T67<3.0. Therefore, it is favorable for providing sufficient space in the photographing optical lens assembly by the arrangement of the sixth lens element and enhancing the image quality in the peripheral region thereof.

When a sum of all axial distances between adjacent lens elements of the photographing optical lens assembly is ΣAT, an axial distance between the first lens element and the second lens element is T12, an axial distance between the third lens element and the fourth lens element is T34, and an axial distance between the fifth lens element and the sixth lens element is T56, the following condition can be satisfied: 2.50<ΣAT/(T12+T34+T56). Therefore, it is favorable for avoiding an overly large distance between the lens elements of the photographing optical lens assembly so as to avoid the space therein not being fully utilized and being difficult for miniaturization. Moreover, the following condition can be satisfied: 3.50<ΣAT/(T12+T34+T56).

When the focal length of the photographing optical lens assembly is f, a focal length of the fourth lens element is f4, and the focal length of the fifth lens element is f5, the following condition can be satisfied: −2.0<(f/f4)+(f/f5)<−0.50. Therefore, it is favorable for providing enough negative refractive power from the fifth lens element so as to better correct aberrations in the middle region of the photographing optical lens assembly. Moreover, the following condition can be satisfied: −2.0<(f/f4)+(f/f5)<−0.55.

Each of the aforementioned features of the photographing optical lens assembly of the present disclosure can be utilized in numerous combinations, so as to achieve the corresponding functionality.

According to the photographing optical lens assembly of the present disclosure, the lens elements thereof can be made of plastic materials or glass materials. When the lens element is made of a glass material, the arrangement of refractive power of the photographing optical lens assembly can be more flexible to design. The glass lens elements can be made by a grinding method, a molding method or other manufacturing methods. When the lens element is made of a plastic material, the manufacturing cost can be reduced. Furthermore, the surfaces of the lens elements can be aspheric (ASP). Therefore, more controllable variables can be obtained so as to reduce aberrations and further decrease the required number of the lens elements. Thus, the total track length of the photographing optical lens assembly of the present disclosure can be efficiently reduced. Moreover, the aspherical surfaces can be made by a plastic injection molding method, a glass molding method or other manufacturing methods.

According to the photographing optical lens assembly of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for lights in a wavelength range of 600 nm-800 nm in the photographing optical lens assembly so as to reduce extra red light or infrared lights, or the additives can have the absorption ability for lights in a wavelength range of 350 nm-450 nm in the photographing optical lens assembly so as to reduce blue light or ultraviolet lights. Therefore, additives can prevent the image from interfering by lights in a particular wavelength range. Furthermore, the additives can be homogeneously mixed with the plastic material, and the lens elements can be made by the injection molding method.

According to the photographing optical lens assembly of the present disclosure, when a surface of the lens element is aspheric, it indicates that entire optical effective region of the surface of the lens element or a part thereof is aspheric.

According to the photographing optical lens assembly of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not been defined, it indicates that the aforementioned surfaces of the lens elements can be concave in the paraxial region thereof. In the photographing optical lens assembly of the present disclosure, if the lens element has positive refractive power or negative refractive power, or the focal length of the lens element, all can be referred to the refractive power, or the focal length, in the paraxial region of the lens element.

According to the photographing optical lens assembly of the present disclosure, a critical point is a non-axial point of the lens surface where its tangent is perpendicular to the optical axis.

According to the photographing optical lens assembly of the present disclosure, the definition of the inflection point is a point on a curve of a lens surface ranging from a paraxial region to an off-axis region where the center of curvature of the curve changes from the object side to the image side (or from the image side to the object side).

According to the photographing optical lens assembly of the present disclosure, the image surface thereof, based on the corresponding image sensor, can be flat or curved. In particular, the image surface can be a concave curved surface facing towards the object side. Furthermore, the photographing optical lens assembly of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

Furthermore, according to the photographing optical lens assembly of the present disclosure, the photographing optical lens assembly can include at least one stop, such as an aperture stop, a glare stop or a field stop, for eliminating stray light and thereby improving image resolution thereof.

According to the photographing optical lens assembly of the present disclosure, the aperture stop can be configured as a front stop or a middle stop, wherein the front stop indicates that the aperture stop is disposed between an object and the first lens element, and the middle stop indicates that the aperture stop is disposed between the first lens element and the image surface. When the aperture stop is a front stop, a longer distance between an exit pupil of the photographing optical lens assembly and the image surface can be obtained, and thereby obtains a telecentric effect and improves the image-sensing efficiency of the image sensor, such as CCD or CMOS. The middle stop is favorable for enlarging the field of view of the photographing optical lens assembly and thereby provides a wider field of view for the same.

According to the photographing optical lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the photographing optical lens assembly according to the present disclosure, so as to moderate the image quality by changing f-number such as changing the depth of field or the exposure speed.

According to the photographing optical lens assembly of the present disclosure, the photographing optical lens assembly of the present disclosure can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the present disclosure, an imaging apparatus including the aforementioned photographing optical lens assembly and an image sensor is provided, wherein the image sensor is disposed on the image surface of the photographing optical lens assembly. By adjusting the fifth lens element of the photographing optical lens assembly with larger negative refractive power, the sixth lens element and the seventh lens element which have larger refractive power can be balanced so as to balance the overall refractive power arrangement of the photographing optical lens assembly. Furthermore, by adjusting the surface shape of the image-side surface of the fifth lens element, the proper configuration in the paraxial region thereof can be satisfied and the shape of the off-axis region can be controlled simultaneously, so that an image correcting ability in the peripheral region thereof and a shape suitable for miniaturizing the photographing optical lens assembly can be obtained. Moreover, the imaging apparatus can further include a barrel member, a holder member or a combination thereof.

According to the present disclosure, an electronic device including the aforementioned imaging apparatus is provided. Therefore, the image quality can be increased. Moreover, the electronic device can further include a control unit, a display, a storage unit, a random-access memory unit (RAM) or a combination thereof.

According to the above description of the present disclosure, the following specific 1st-14th embodiments are provided for further explanation.

1st Embodiment

Figure 2:
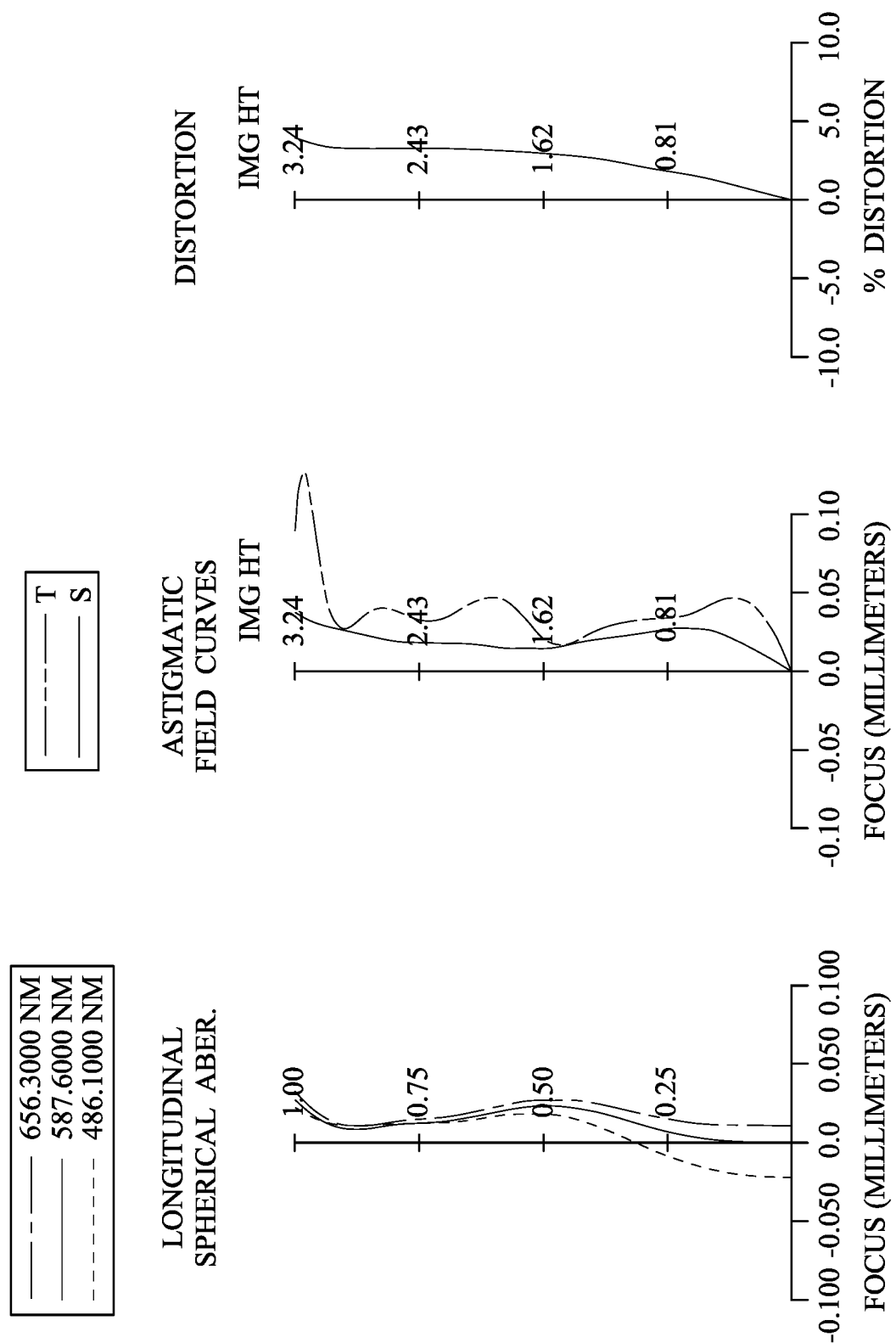
FIG. 2 shows, in order from left to right, spherical aberration curves, astigmatic field curves and a distortion curve of the imaging apparatus of the 1st embodiment.

FIG. 1 is a schematic view of an imaging apparatus according to the 1st embodiment of the present disclosure. FIG. 2 shows, in order from left to right, spherical aberration curves, astigmatic field curves and a distortion curve of the imaging apparatus of the 1st embodiment. As shown in FIG. 1, the imaging apparatus according to the 1st embodiment includes a photographing optical lens assembly (reference number is omitted) and an image sensor 195. The photographing optical lens assembly includes, in order from an object side to an image side, an aperture stop 100, a first lens element 110, a second lens element 120, a stop 101, a third lens element 130, a fourth lens element 140, a fifth lens element 150, a sixth lens element 160, a seventh lens element 170, a filter 180 and an image surface 190, wherein the image sensor 195 is disposed on the image surface 190 of the photographing optical lens assembly. The photographing optical lens assembly includes seven lens elements (110, 120, 130, 140, 150, 160, 170) without additional one or more lens elements inserted between the first lens element 110 and the seventh lens element 170.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with negative refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of a plastic material, and has the object-side surface 151 and the image-side surface 152 being both aspheric. Furthermore, the image-side surface 152 of the fifth lens element 150 includes at least two inflection points and at least one convex critical point.

The sixth lens element 160 with positive refractive power has an object-side surface 161 being convex in a paraxial region thereof and an image-side surface 162 being convex in a paraxial region thereof. The sixth lens element 160 is made of a plastic material, and has the object-side surface 161 and the image-side surface 162 being both aspheric.

The seventh lens element 170 with negative refractive power has an object-side surface 171 being concave in a paraxial region thereof and an image-side surface 172 being concave in a paraxial region thereof. The seventh lens element 170 is made of a plastic material, and has the object-side surface 171 and the image-side surface 172 being both aspheric. Furthermore, the image-side surface 172 of the seventh lens element 170 includes at least one convex critical point in an off-axis region thereof.

The filter 180 is made of a glass material and disposed between the seventh lens element 170 and the image surface 190 and will not affect the focal length of the photographing optical lens assembly.

The equation of the aspheric surface profiles of the aforementioned lens elements is expressed as follows:

$$X(Y) = (Y^2/R)/(1 + \text{sqrt}(1 - (1+k) \times (Y/R)^2)) = \sum_{i}(Ai) \times (Y^i);$$

wherein,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens assembly according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=3.70 mm; Fno=1.56; and HFOV=40.0 degrees.

In the photographing optical lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, an Abbe number of the seventh lens element 170 is V7, and a number of the lens elements of the photographing optical lens assembly having Abbe numbers less than or equal to 40 is V40 (that is, a sum number of V1, V2, V3, V4, V5, V6 and V7 which is less than or equal to 40), the following conditions are satisfied: V4+V5=38.8; and V40=5.

In the photographing optical lens assembly according to the 1st embodiment, when a central thickness of the sixth lens element 160 is CT6, and an axial distance between the sixth lens element 160 and the seventh lens element 170 is T67, the following condition is satisfied: CT6/T67=1.19.

In the photographing optical lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, the axial distance between the sixth lens element 160 and the seventh lens element 170 is T67, and a sum of all axial distances between adjacent lens elements of the photographing optical lens assembly is ΣAT (that is, ΣAT=T12+T23+T34+T45+T56+T67), the following condition is satisfied: ΣAT/(T12+T34+T56)=5.62.

In the photographing optical lens assembly according to the 1st embodiment, when the focal length of the photographing optical lens assembly is f, an axial distance between the object-side surface 111 of the first lens element 110 and the image-side surface 172 of the seventh lens element 170 is Td, an entrance pupil diameter of the photographing optical lens assembly is EPD, an axial distance between the object-side surface 111 of the first lens element 110 and the image surface 190 is IL, a maximum image height of the photographing optical lens assembly is ImgH, a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, the central thickness of the sixth lens element 160 is CT6, a central thickness of the seventh lens element 170 is CT7, and a sum of central thicknesses of all lens elements of the photographing optical lens assembly is ΣCT (that is, ΣCT=CT1+CT2+CT3+CT4+CT5+CT6+CT7), the following conditions are satisfied: f/EPD=1.56 (which has the same value as Fno); Td/EPD=1.67; Td/ΣCT=1.41; and TL/ImgH=1.48.

In the photographing optical lens assembly according to the 1st embodiment, when a curvature radius of the object-side surface 111 of the first lens element 110 is R1, a curvature radius of the image-side surface 152 of the fifth lens element 150 is R10, a curvature radius of the object-side surface 161 of the sixth lens element 160 is R11, and a curvature radius of the image-side surface 162 of the sixth lens element 160 is R12, the following conditions are satisfied: |(R11+R12)/(R11−R12)|=0.04; and R10/R1=1.33.

In the photographing optical lens assembly according to the 1st embodiment, the focal length of the photographing optical lens assembly is f, a focal length of the second lens element 120 is f2, a focal length of the third lens element 130 is f3, a focal length of the fourth lens element 140 is f4, a focal length of the fifth lens element 150 is f5, and the curvature radius of the image-side surface 152 of the fifth lens element is R10, the following conditions are satisfied: f5/f3=−1.16; f5/f2=−0.06; f/R10=1.62; (f/f4)+(f/f5)=−1.26; and f/f5=−0.53.

The detailed optical data of the 1st embodiment are shown in Table 1 and the aspheric surface data are shown in Table 2 below.

TABLE 1

1st Embodiment
f = 3.70 mm, Fno = 1.56, HFOV = 40.0 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.490 | | | | |
| 2 | Lens 1 | 1.712 | ASP | 0.669 | Plastic | 1.545 | 56.0 | 4.93 |
| 3 | | 4.077 | ASP | 0.030 | | | | |
| 4 | Lens 2 | 2.755 | ASP | 0.200 | Plastic | 1.680 | 18.4 | 124.85 |
| 5 | | 2.763 | ASP | 0.220 | | | | |
| 6 | Stop | Plano | | 0.176 | | | | |
| 7 | Lens 3 | −109.732 | ASP | 0.608 | Plastic | 1.544 | 55.9 | 6.04 |
| 8 | | −3.195 | ASP | 0.049 | | | | |
| 9 | Lens 4 | −3.074 | ASP | 0.231 | Plastic | 1.660 | 20.4 | −5.08 |
| 10 | | −37.850 | ASP | 0.139 | | | | |
| 11 | Lens 5 | 4.605 | ASP | 0.301 | Plastic | 1.680 | 18.4 | −7.01 |
| 12 | | 2.279 | ASP | 0.126 | | | | |
| 13 | Lens 6 | 2.143 | ASP | 0.489 | Plastic | 1.614 | 26.0 | 1.89 |
| 14 | | −2.307 | ASP | 0.412 | | | | |
| 15 | Lens 7 | −2.717 | ASP | 0.300 | Plastic | 1.607 | 26.6 | −2.01 |
| 16 | | 2.299 | ASP | 0.373 | | | | |
| 17 | Filter | Plano | | 0.210 | Glass | 1.517 | 64.2 | — |
| 18 | | Plano | | 0.251 | | | | |
| 19 | Image | Plano | | — | | | | |

Reference wavelength is 587.6 nm (d-line).
Effective radius of Surface 6 is 1.040 mm.
Effective radius of Surface 13 is 1.790 mm.

TABLE 2

Aspheric Coefficients

| | Surface # | | | | | | |
|---|---|---|---|---|---|---|---|
| | 2 | 3 | 4 | 5 | 7 | 8 | 9 |
| k = | −6.2990E−01 | −4.0364E+01 | −8.5488E−01 | −1.0217E+00 | −9.0000E+01 | −6.2510E−01 | 1.8228E+00 |
| A4 = | 1.8822E−02 | −1.7902E−01 | −2.7056E−01 | −7.4862E−02 | −4.9311E−02 | 1.3097E−01 | 2.6434E−01 |
| A6 = | 4.1909E−03 | 3.8148E−01 | 3.6004E−01 | 7.2106E−02 | −7.1788E−02 | −7.8142E−01 | −1.1298E+00 |
| A8 = | 2.1178E−02 | −4.0315E−01 | −2.3533E−01 | −9.4133E−02 | 8.6681E−02 | 1.3560E+00 | 1.9572E+00 |
| A10 = | −3.5729E−02 | 2.2140E−01 | −1.4050E−02 | 1.9297E−01 | −1.3387E−01 | −1.3472E+00 | −1.8249E+00 |
| A12 = | 3.0294E−02 | −5.4307E−02 | 1.0337E−01 | −2.1487E−01 | 5.6986E−02 | 7.0260E−01 | 8.7147E−01 |
| A14 = | −9.4663E−03 | 2.4995E−03 | −3.4422E−02 | 1.0149E−01 | 6.5324E−03 | −1.4708E−01 | −1.6502E−01 |

| | Surface # | | | | | | |
|---|---|---|---|---|---|---|---|
| | 10 | 11 | 12 | 13 | 14 | 15 | 16 |
| k = | 9.0000E+01 | 4.9515E+00 | −1.8863E+01 | −9.4155E−02 | −3.5091E+01 | −1.7580E−01 | −9.6371E+00 |
| A4 = | 8.5113E−02 | −3.6560E−01 | −4.8459E−01 | −2.2966E−01 | 1.8012E−02 | −1.4973E−02 | −1.2228E−01 |
| A6 = | −3.4034E−01 | 8.9250E−01 | 8.3974E−01 | 2.3691E−01 | 1.8720E−01 | −1.0941E−01 | 6.1046E−02 |
| A8 = | 3.7417E−01 | −1.5162E+00 | −1.0367E+00 | −1.7802E−01 | −2.8354E−01 | 1.1889E−01 | −2.6015E−02 |
| A10 = | −1.9014E−01 | 1.4714E+00 | 7.4761E−01 | −7.7411E−03 | 1.7298E−01 | −5.1692E−02 | 8.3997E−03 |
| A12 = | 1.8696E−02 | −8.1670E−01 | −2.9655E−01 | 6.3326E−02 | −5.6318E−02 | 1.2179E−02 | −1.9499E−03 |
| A14 = | 9.1085E−03 | 2.3930E−01 | 6.0489E−02 | −2.8916E−02 | 1.0321E−02 | −1.6342E−03 | 3.0391E−04 |
| A16 = | | −2.8999E−02 | −4.9734E−03 | 5.3859E−03 | −1.0048E−03 | 1.1763E−04 | −2.9006E−05 |
| A18 = | | | −3.7464E−04 | 4.0318E−05 | | −3.5291E−06 | 1.2855E−06 |

Table 1 shows the detailed optical data of FIG. 1 of the 1st embodiment, wherein the curvature radius, thickness and the focal length are shown in millimeters (mm), and Surface numbers 0-19 represent the surfaces sequentially arranged from the object side to the image side. Table 2 shows the aspheric surface data of the 1st embodiment, wherein k represents the conic coefficient of the equation of the aspheric surface profiles, and A4-A18 represent the aspheric coefficients of each surface ranging from the 4th order to the 18th order. The tables presented below for each embodiment correspond to the schematic view and aberration curves of each embodiment, and term definitions of the tables are the same as those in Table 1 and Table 2 of the 1st embodiment. Therefore, an explanation in this regard will not be provided again.

2nd Embodiment

Figure 3:
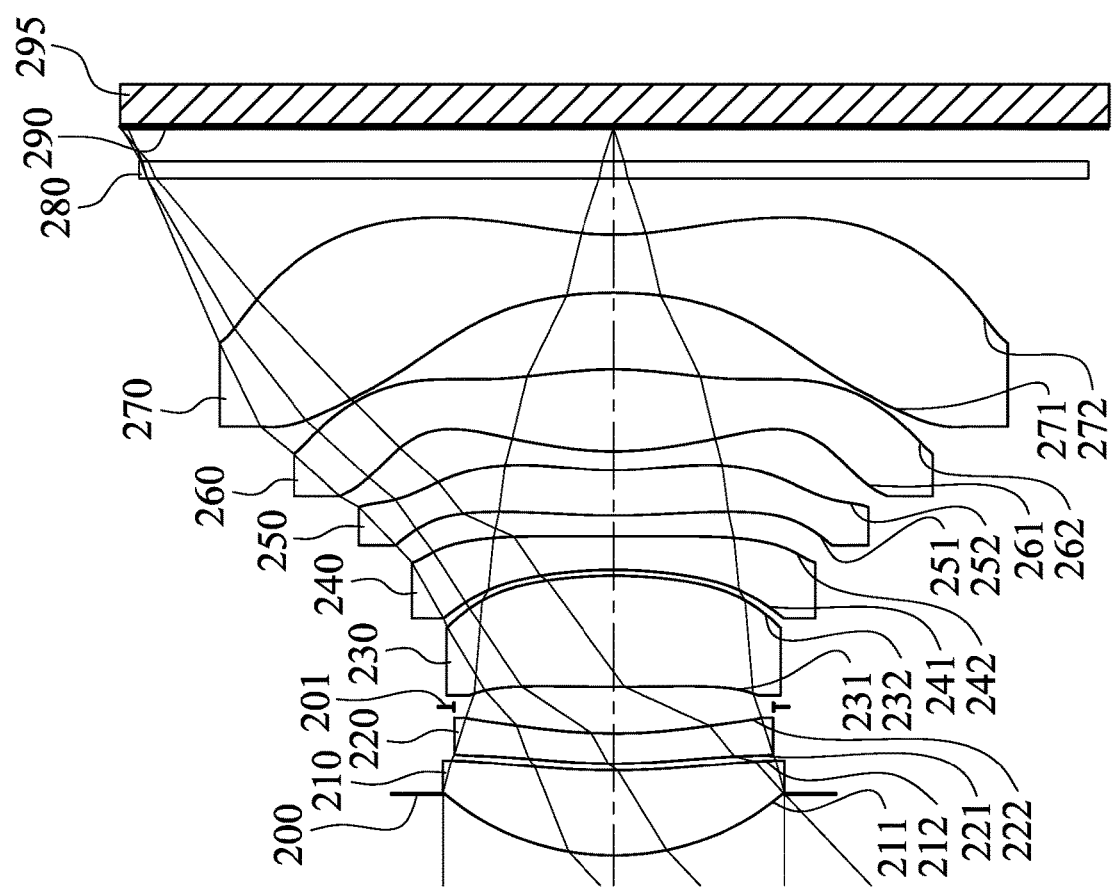
FIG. 3 is a schematic view of an imaging apparatus according to the 2nd embodiment of the present disclosure.
Figure 4:
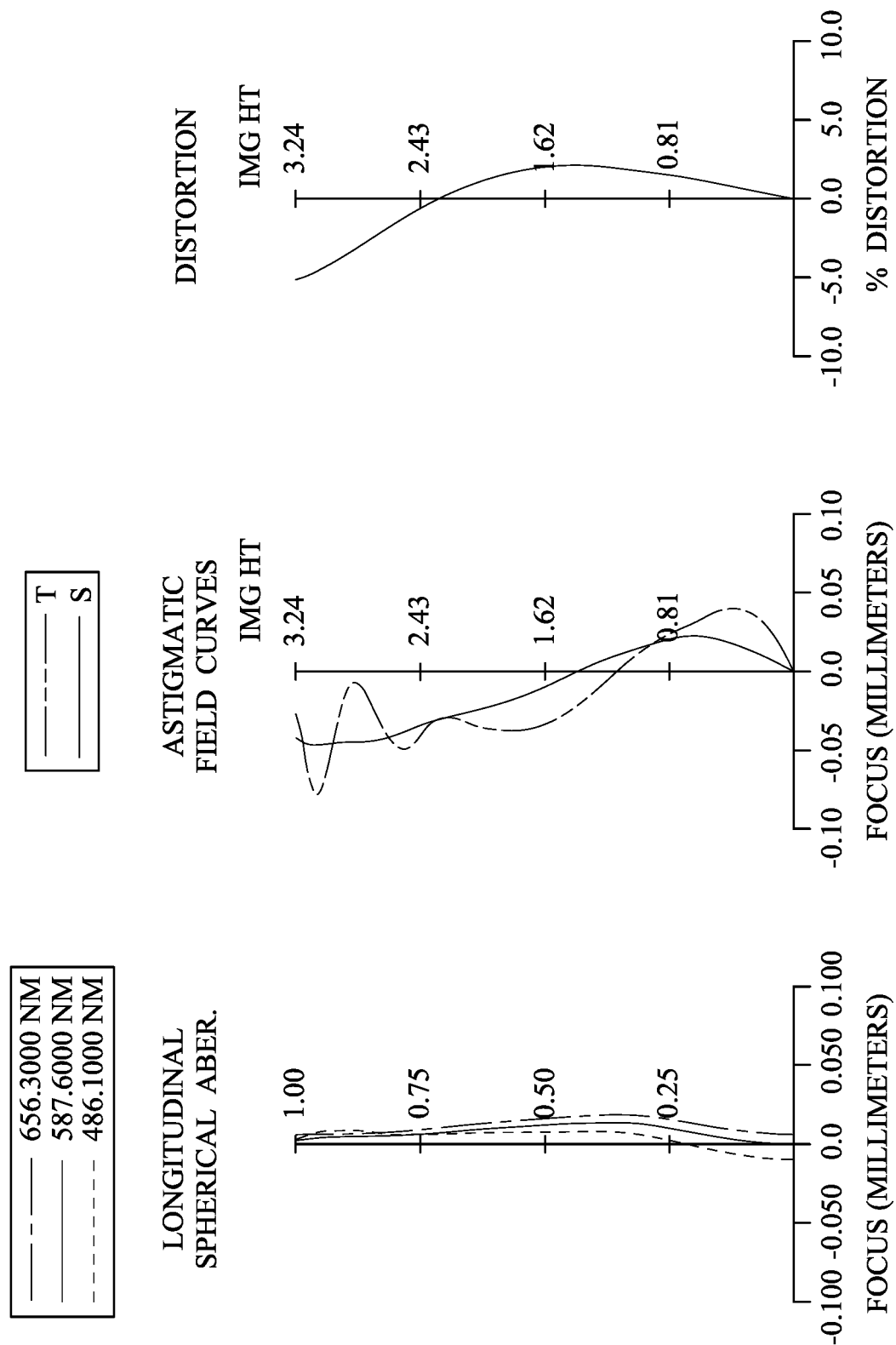
FIG. 4 shows, in order from left to right, spherical aberration curves, astigmatic field curves and a distortion curve of the imaging apparatus of the 2nd embodiment.

FIG. 3 is a schematic view of an imaging apparatus according to the 2nd embodiment of the present disclosure. FIG. 4 shows, in order from left to right, spherical aberration curves, astigmatic field curves and a distortion curve of the imaging apparatus of the 2nd embodiment. As shown in FIG. 3, the imaging apparatus of the 2nd embodiment includes a photographing optical lens assembly (reference number is omitted) and an image sensor 295. The photographing optical lens assembly includes, in order from an object side to an image side, an aperture stop 200, a first lens element 210, a second lens element 220, a stop 201, a third lens element 230, a fourth lens element 240, a fifth lens element 250, a sixth lens element 260, a seventh lens element 270, a filter 280 and an image surface 290, wherein the image sensor 295 is disposed on the image surface 290 of the photographing optical lens assembly. The photographing optical lens assembly includes seven lens elements (210, 220, 230, 240, 250, 260, 270) without additional one or more lens elements inserted between the first lens element 210 and the seventh lens element 270.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being concave in a paraxial region thereof and an image-side surface 242 being planar in a paraxial region thereof. The fourth lens element 240 is made of a plastic material, and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of a plastic material, and has the object-side surface 251 and the image-side surface 252 being both aspheric. Furthermore, the image-side surface 252 of the fifth lens element 250 includes at least three inflection points and at least one convex critical point.

The sixth lens element 260 with positive refractive power has an object-side surface 261 being convex in a paraxial region thereof and an image-side surface 262 being convex in a paraxial region thereof. The sixth lens element 260 is made of a plastic material, and has the object-side surface 261 and the image-side surface 262 being both aspheric.

The seventh lens element 270 with negative refractive power has an object-side surface 271 being concave in a paraxial region thereof and an image-side surface 272 being concave in a paraxial region thereof. The seventh lens element 270 is made of a plastic material, and has the object-side surface 271 and the image-side surface 272 being both aspheric. Furthermore, the image-side surface 272 of the seventh lens element 270 includes at least one convex critical point in an off-axis region thereof.

The filter 280 is made of a glass material and disposed between the seventh lens element 270 and the image surface 290 and will not affect the focal length of the photographing optical lens assembly.

The detailed optical data of the 2nd embodiment are shown in Table 3 and the aspheric surface data are shown in Table 4 below.

TABLE 3

2nd Embodiment
f = 3.59 mm, Fno = 1.60, HFOV = 43.5 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.402 | | | | |
| 2 | Lens 1 | 1.791 | ASP | 0.560 | Plastic | 1.545 | 56.1 | 5.26 |
| 3 | | 4.247 | ASP | 0.044 | | | | |
| 4 | Lens 2 | 3.454 | ASP | 0.200 | Plastic | 1.632 | 23.4 | −271.76 |
| 5 | | 3.310 | ASP | 0.174 | | | | |
| 6 | Stop | Plano | | 0.132 | | | | |
| 7 | Lens 3 | 18.896 | ASP | 0.731 | Plastic | 1.544 | 56.0 | 4.52 |
| 8 | | −2.787 | ASP | 0.037 | | | | |
| 9 | Lens 4 | −2.837 | ASP | 0.220 | Plastic | 1.669 | 19.4 | −4.24 |
| 10 | | ∞ | ASP | 0.137 | | | | |
| 11 | Lens 5 | 4.405 | ASP | 0.300 | Plastic | 1.645 | 22.5 | −7.72 |
| 12 | | 2.275 | ASP | 0.125 | | | | |

TABLE 3-continued

2nd Embodiment
f = 3.59 mm, Fno = 1.60, HFOV = 43.5 deg.

| Surface # | | Curvature radius | | Thickness | Material | Index | Abbe # | Focal Length |
|---|---|---|---|---|---|---|---|---|
| 13 | Lens 6 | 2.138 | ASP | 0.540 | Plastic | 1.582 | 30.2 | 2.01 |
| 14 | | −2.344 | ASP | 0.502 | | | | |
| 15 | Lens 7 | −2.706 | ASP | 0.383 | Plastic | 1.566 | 37.4 | −2.07 |
| 16 | | 2.163 | ASP | 0.373 | | | | |
| 17 | Filter | Plano | | 0.110 | Glass | 1.517 | 64.2 | — |
| 18 | | Plano | | 0.228 | | | | |
| 19 | Image | Plano | | — | | | | |

Reference wavelength is 587.6 nm (d-line).
Effective radius of Surface 6 is 1.050 mm.
Effective radius of Surface 13 is 1.800 mm.

TABLE 4

Aspheric Coefficients

| | Surface # | | | | | | |
|---|---|---|---|---|---|---|---|
| | 2 | 3 | 4 | 5 | 7 | 8 | 9 |
| k = | −5.5625E−01 | −3.3815E+01 | −1.2751E+00 | −2.7521E+00 | −4.5713E+01 | 3.8466E−01 | 2.6171E+00 |
| A4 = | 6.0851E−02 | −8.5108E−02 | −2.2703E−01 | −6.2802E−02 | −6.7663E−02 | 2.0211E−01 | 2.1700E−01 |
| A6 = | −3.3161E−01 | 1.0597E−01 | 4.7206E−01 | −1.1547E−01 | 2.9391E−01 | −1.4674E+00 | −1.2094E+00 |
| A8 = | 1.3613E+00 | 2.5208E−01 | −1.2184E+00 | 1.2497E+00 | −2.1366E+00 | 5.7585E+00 | 4.0683E+00 |
| A10 = | −3.2044E+00 | −1.1668E+00 | 2.9513E+00 | −5.2445E+00 | 7.5895E+00 | −1.4347E+01 | −9.0601E+00 |
| A12 = | 4.6422E+00 | 1.6183E+00 | −5.9051E+00 | 1.2474E+01 | −1.6248E+01 | 2.1598E+01 | 1.2332E+01 |
| A14 = | −4.1526E+00 | −4.9726E−01 | 8.4732E+00 | −1.7949E+01 | 2.1055E+01 | −1.9915E+01 | −1.0087E+01 |
| A16 = | 2.2125E+00 | −9.6634E−01 | −7.7051E+00 | 1.5546E+01 | −1.6119E+01 | 1.1063E+01 | 4.7741E+00 |
| A18 = | −6.3121E−01 | 9.9654E−01 | 3.8991E+00 | −7.4866E+00 | 6.6443E+00 | −3.4093E+00 | −1.1724E+00 |
| A20 = | 7.0847E−02 | −2.8382E−01 | −8.2822E−01 | 1.5546E+00 | −1.1143E+00 | 4.4861E−01 | 1.0957E−01 |

| | Surface # | | | | | | |
|---|---|---|---|---|---|---|---|
| | 10 | 11 | 12 | 13 | 14 | 15 | 16 |
| k = | 0.0000E+00 | 5.0036E+00 | −1.9853E+01 | −2.2422E−01 | −3.5117E+01 | −1.6423E−01 | −6.8240E+00 |
| A4 = | 2.4829E−02 | −3.1395E−01 | −3.6470E−01 | −1.7517E−01 | −4.7683E−02 | −6.9263E−02 | −1.2616E−01 |
| A6 = | −9.4287E−02 | 8.7488E−01 | 6.6966E−01 | 2.2206E−01 | 3.2293E−01 | −8.5072E−03 | 8.0992E−02 |
| A8 = | −9.4150E−02 | −2.0655E+00 | −1.1420E+00 | −2.2141E−01 | −4.0119E−01 | 1.7799E−03 | −4.7964E−02 |
| A10 = | 4.4943E−01 | 3.3133E+00 | 1.2893E+00 | 6.1639E−02 | 2.4983E−01 | 2.7302E−02 | 2.1847E−02 |
| A12 = | −6.8361E−01 | −3.6394E+00 | −9.6016E−01 | 4.4616E−02 | −9.5746E−02 | −1.9505E−02 | −7.0215E−03 |
| A14 = | 5.8342E−01 | 2.6572E+00 | 4.6732E−01 | −5.0586E−02 | 2.3702E−02 | 6.0034E−03 | 1.4764E−03 |
| A16 = | −2.9859E−01 | −1.2214E+00 | −1.4050E−01 | 2.1231E−02 | −3.7041E−03 | −9.6697E−04 | −1.8968E−04 |
| A18 = | 8.3682E−02 | 3.1697E−01 | 2.3412E−02 | −4.2087E−03 | 3.3100E−04 | 8.0118E−05 | 1.3347E−05 |
| A20 = | −9.4382E−03 | −3.5146E−02 | −1.6463E−03 | 3.2340E−04 | −1.2766E−05 | −2.7040E−06 | −3.8962E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.59 | TL/ImgH | 1.48 |
| f/EPD | 1.60 | |(R11 + R12)/(R11 − R12)| | 0.05 |
| HFOV [deg.] | 43.5 | R10/R1 | 1.27 |
| V4 + V5 | 41.9 | f5/f3 | −1.71 |
| V40 | 5 | f5/f2 | 0.03 |
| CT6/T67 | 1.08 | f/R10 | 1.58 |
| ΣAT/(T12 + T34 + T56) | 5.59 | (f/f4) + (f/f5) | −1.31 |
| Td/EPD | 1.82 | f/f5 | −0.46 |
| Td/ΣCT | 1.39 | | |

3rd Embodiment

Figure 5:
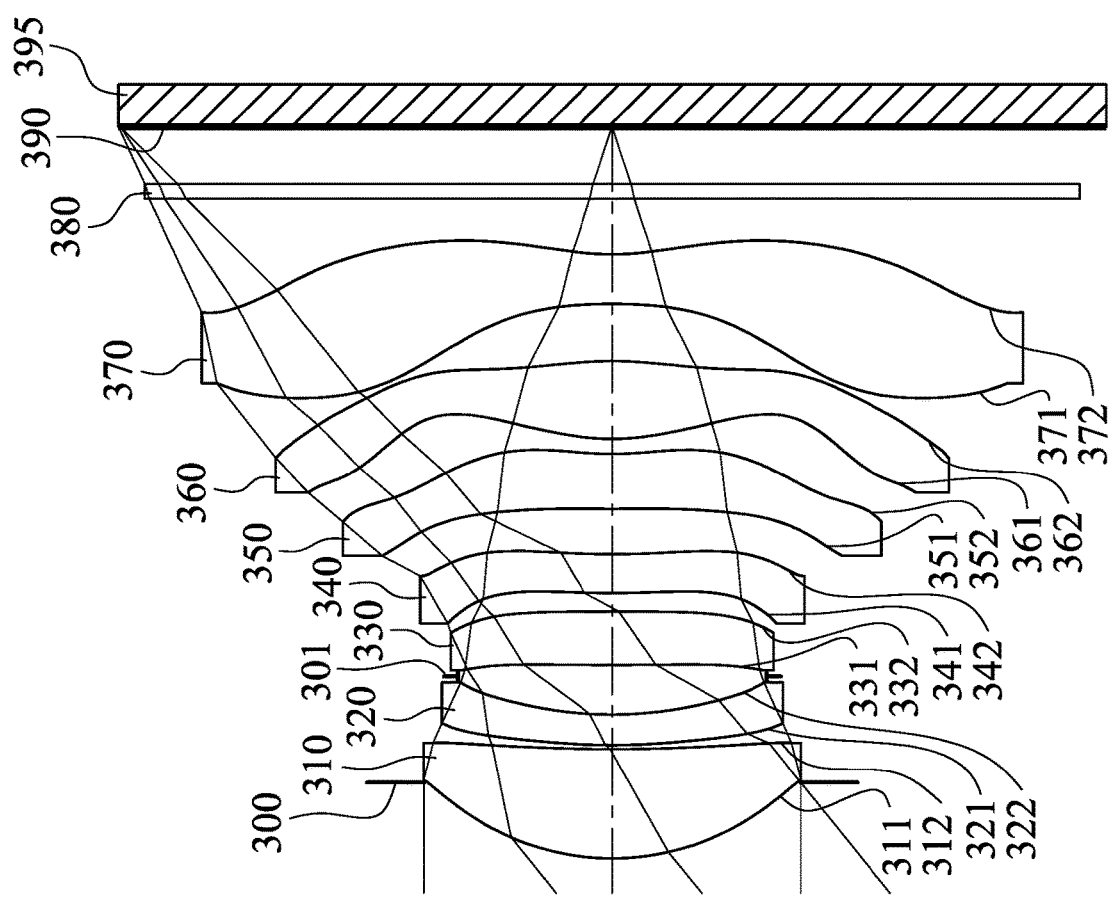
FIG. 5 is a schematic view of an imaging apparatus according to the 3rd embodiment of the present disclosure.
Figure 6:
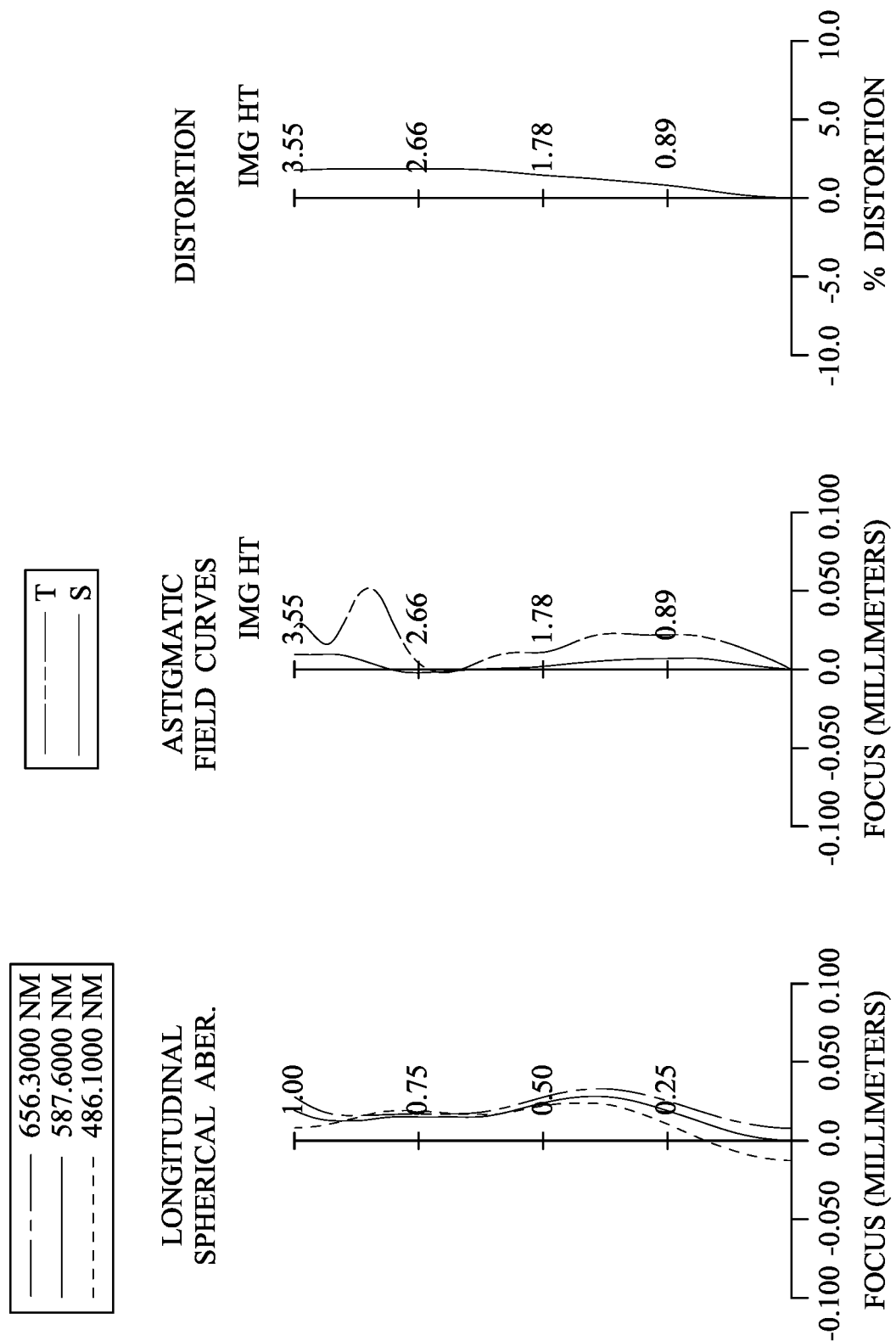
FIG. 6 shows, in order from left to right, spherical aberration curves, astigmatic field curves and a distortion curve of the imaging apparatus of the 3rd embodiment.

FIG. 5 is a schematic view of an imaging apparatus according to the 3rd embodiment of the present disclosure. FIG. 6 shows, in order from left to right, spherical aberration curves, astigmatic field curves and a distortion curve of the imaging apparatus of the 3rd embodiment. As shown in FIG. 5, the imaging apparatus of the 3rd embodiment includes a photographing optical lens assembly (reference number is omitted) and an image sensor 395. The photographing optical lens assembly includes, in order from an object side to an image side, an aperture stop 300, a first lens element 310, a second lens element 320, a stop 301, a third lens element 330, a fourth lens element 340, a fifth lens element 350, a sixth lens element 360, a seventh lens element 370, a filter 380 and an image surface 390, wherein the image sensor 395 is disposed on the image surface 390 of the photographing optical lens assembly. The photographing optical lens assembly includes seven lens elements (310, 320, 330, 340, 350, 360, 370) without additional one or more lens elements inserted between the first lens element 310 and the seventh lens element 370.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of a plastic material, and has the object-side surface 351 and the image-side surface 352 being both aspheric. Furthermore, the image-side surface 352 of the fifth lens element 350 includes at least three inflection points and at least one convex critical point.

The sixth lens element 360 with positive refractive power has an object-side surface 361 being convex in a paraxial region thereof and an image-side surface 362 being convex in a paraxial region thereof. The sixth lens element 360 is made of a plastic material, and has the object-side surface 361 and the image-side surface 362 being both aspheric.

The seventh lens element 370 with negative refractive power has an object-side surface 371 being concave in a paraxial region thereof and an image-side surface 372 being concave in a paraxial region thereof. The seventh lens element 370 is made of a plastic material, and has the object-side surface 371 and the image-side surface 372 being both aspheric. Furthermore, the image-side surface 372 of the seventh lens element 370 includes at least one convex critical point in an off-axis region thereof.

The filter 380 is made of a glass material and disposed between the seventh lens element 370 and the image surface 390 and will not affect the focal length of the photographing optical lens assembly.

The detailed optical data of the 3rd embodiment are shown in Table 5 and the aspheric surface data are shown in Table 6 below.

TABLE 5

3rd Embodiment
f = 4.30 mm, Fno = 1.58, HFOV = 39.0 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.548 | | | | |
| 2 | Lens 1 | 1.844 | ASP | 0.792 | Plastic | 1.545 | 56.1 | 4.07 |
| 3 | | 9.293 | ASP | 0.030 | | | | |
| 4 | Lens 2 | 4.359 | ASP | 0.220 | Plastic | 1.669 | 19.5 | −10.95 |
| 5 | | 2.677 | ASP | 0.275 | | | | |
| 6 | Stop | Plano | | 0.083 | | | | |
| 7 | Lens 3 | 27.418 | ASP | 0.386 | Plastic | 1.544 | 56.0 | 43.15 |
| 8 | | −162.470 | ASP | 0.134 | | | | |
| 9 | Lens 4 | 6.719 | ASP | 0.280 | Plastic | 1.669 | 19.5 | −62.92 |
| 10 | | 5.697 | ASP | 0.328 | | | | |
| 11 | Lens 5 | 20.122 | ASP | 0.399 | Plastic | 1.566 | 37.4 | −4.80 |
| 12 | | 2.379 | ASP | 0.109 | | | | |
| 13 | Lens 6 | 1.732 | ASP | 0.563 | Plastic | 1.544 | 56.0 | 2.00 |
| 14 | | −2.587 | ASP | 0.411 | | | | |
| 15 | Lens 7 | −4.269 | ASP | 0.358 | Plastic | 1.534 | 55.9 | −2.44 |
| 16 | | 1.932 | ASP | 0.400 | | | | |
| 17 | Filter | Plano | | 0.110 | Glass | 1.517 | 64.2 | — |
| 18 | | Plano | | 0.415 | | | | |
| 19 | Image | Plano | | — | | | | |

Reference wavelength is 587.6 nm (d-line).
Effective radius of Surface 6 is 1.115 mm.
Effective radius of Surface 13 is 2.195 mm.

TABLE 6

Aspheric Coefficients

| Surface # | | | | | | | |
|---|---|---|---|---|---|---|---|
| | 2 | 3 | 4 | 5 | 7 | 8 | 9 |
| k = | −1.8304E−01 | 4.0381E+01 | 2.7089E+00 | −6.8391E−01 | −9.8691E+01 | 9.0000E+01 | −6.0427E+00 |
| A4 = | 5.4817E−03 | −7.1422E−02 | −1.0416E−01 | −3.7841E−02 | −1.2777E−02 | −2.7053E−02 | −1.0330E−01 |
| A6 = | −5.5651E−03 | 1.3018E−01 | 1.4825E−01 | 2.2533E−02 | −5.7926E−02 | −1.4883E−01 | −7.8431E−02 |
| A8 = | 1.6469E−02 | −1.5666E−01 | −1.5240E−01 | 1.0764E−02 | 9.8269E−02 | 2.9311E−01 | 6.9485E−02 |
| A10 = | −1.8965E−02 | 1.0131E−01 | 9.5500E−02 | −2.1449E−02 | −1.5244E−01 | −3.5997E−01 | −5.0076E−02 |
| A12 = | 1.0402E−02 | −3.3010E−02 | −2.3990E−02 | 1.7188E−02 | 1.1161E−01 | 2.2482E−01 | 1.3949E−02 |
| A14 = | −2.5404E−03 | 3.6660E−03 | 1.2561E−03 | | −2.7927E−02 | −5.5475E−02 | |

| Surface # | | | | | | | |
|---|---|---|---|---|---|---|---|
| | 10 | 11 | 12 | 13 | 14 | 15 | 16 |
| k = | −1.1949E+01 | 4.9982E+00 | −1.4278E+01 | −4.9460E+00 | −1.2716E+01 | 3.2369E−01 | −1.1395E+01 |
| A4 = | −7.7113E−02 | −1.9509E−01 | −3.6450E−01 | −8.0029E−02 | 1.4125E−01 | −1.6042E−01 | −1.2745E−01 |
| A6 = | −6.6587E−03 | 3.1342E−01 | 2.8978E−01 | 4.6355E−02 | −5.3455E−02 | 6.7947E−02 | 7.6868E−02 |
| A8 = | −7.7426E−02 | −3.5307E−01 | −1.8793E−01 | −1.7498E−02 | −1.4301E−02 | −5.0979E−03 | −3.4696E−02 |
| A10 = | −8.6758E−03 | 2.4590E−01 | 8.4904E−02 | −1.9870E−02 | 7.9475E−03 | −1.8656E−03 | 1.1213E−02 |
| A12 = | 2.5882E−02 | −1.0489E−01 | −2.1705E−02 | 1.5153E−02 | 4.3603E−04 | 3.4917E−04 | −2.4676E−03 |
| A14 = | −1.9722E−02 | 2.4389E−02 | 2.8010E−03 | −3.9168E−03 | −6.7431E−04 | 1.3763E−05 | 3.5053E−04 |
| A16 = | 5.1824E−03 | −2.3159E−03 | −1.4500E−04 | 4.4702E−04 | 1.1640E−04 | −8.7189E−06 | −3.0261E−05 |
| A18 = | | | | −1.9118E−05 | −6.3588E−06 | 8.4136E−07 | 1.4321E−06 |
| A20 = | | | | | | −2.7006E−08 | −2.8332E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.30 | TL/ImgH | 1.49 |
| f/EPD | 1.58 | |(R11 + R12)/(R11 − R12)| | 0.20 |
| HFOV [deg.] | 39.0 | R10/R1 | 1.29 |
| V4 + V5 | 56.9 | f5/f3 | −0.11 |
| V40 | 3 | f5/f2 | 0.44 |
| CT6/T67 | 1.37 | f/R10 | 1.81 |
| ΣAT/(T12 + T34 + T56) | 5.02 | (f/f4) + (f/f5) | −0.96 |
| Td/EPD | 1.61 | f/f5 | −0.89 |
| Td/ΣCT | 1.46 | | |

4th Embodiment

Figure 7:
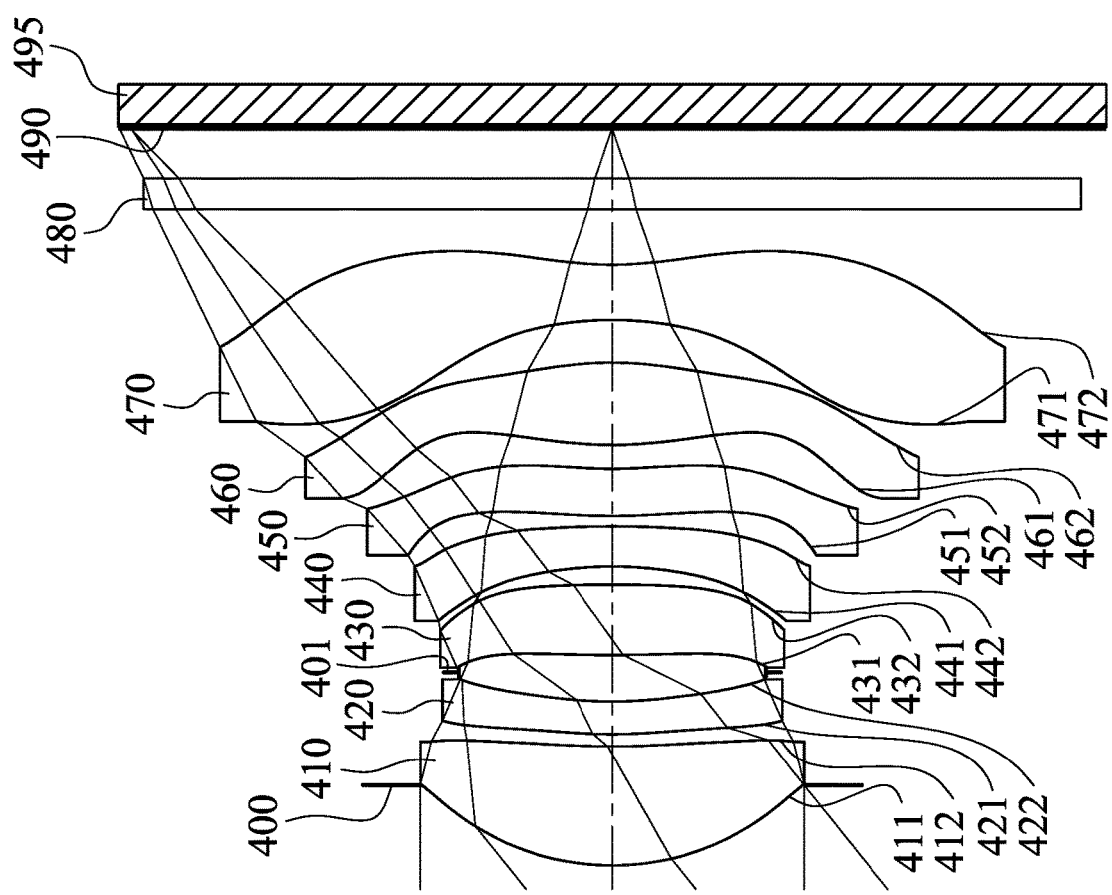
FIG. 7 is a schematic view of an imaging apparatus according to the 4th embodiment of the present disclosure.
Figure 8:
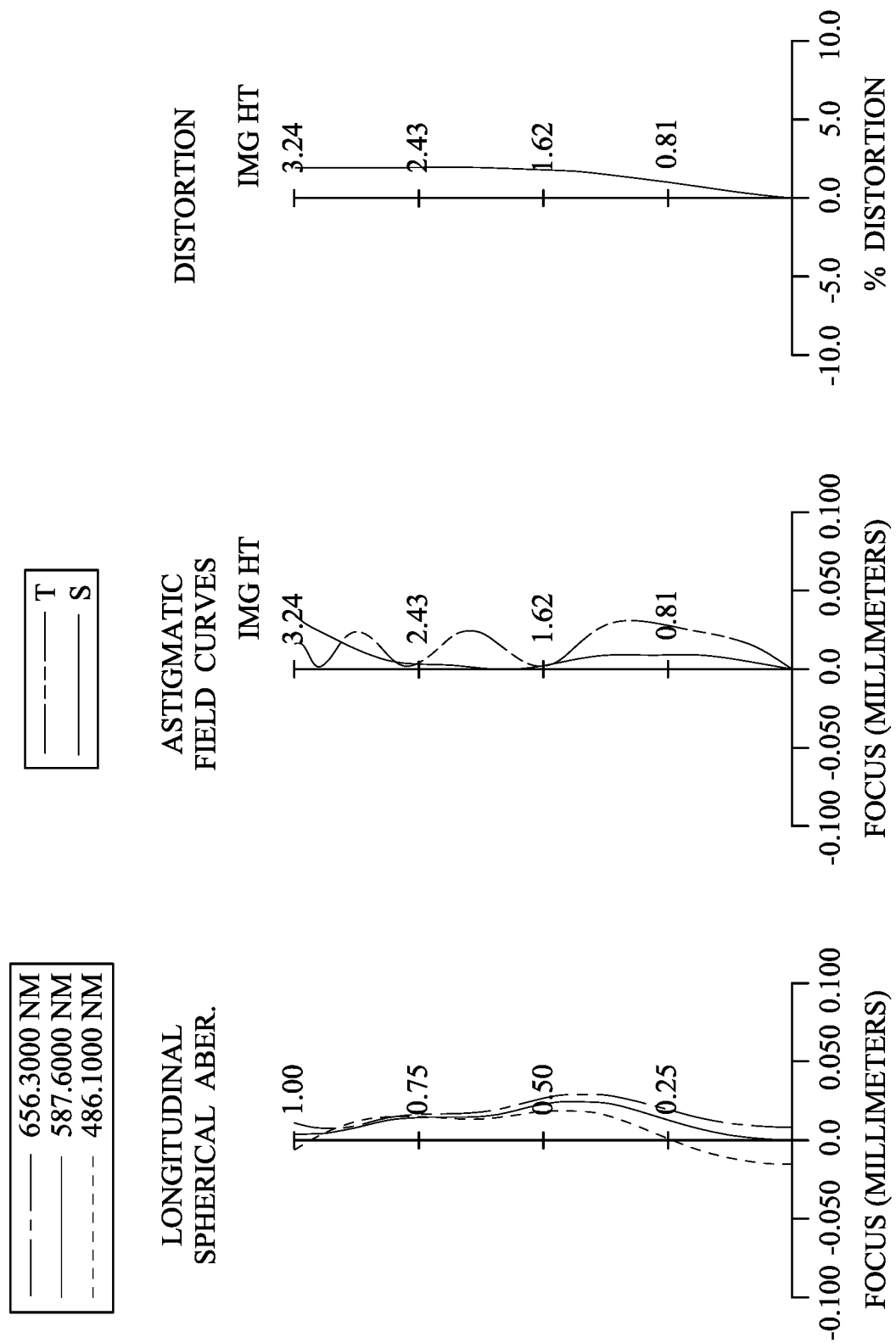
FIG. 8 shows, in order from left to right, spherical aberration curves, astigmatic field curves and a distortion curve of the imaging apparatus of the 4th embodiment.

FIG. 7 is a schematic view of an imaging apparatus according to the 4th embodiment of the present disclosure. FIG. 8 shows, in order from left to right, spherical aberration curves, astigmatic field curves and a distortion curve of the imaging apparatus of the 4th embodiment. As shown in FIG. 7, the imaging apparatus of the 4th embodiment includes a photographing optical lens assembly (reference number is omitted) and an image sensor 495. The photographing optical lens assembly includes, in order from an object side to an image side, an aperture stop 400, a first lens element 410, a second lens element 420, a stop 401, a third lens element 430, a fourth lens element 440, a fifth lens element 450, a sixth lens element 460, a seventh lens element 470, a filter 480 and an image surface 490, wherein the image sensor 495 is disposed on the image surface 490 of the photographing optical lens assembly. The photographing optical lens assembly includes seven lens elements (410, 420, 430, 440, 450, 460, 470) without additional one or more lens elements inserted between the first lens element 410 and the seventh lens element 470.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of a plastic material, and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of a plastic material, and has the object-side surface 451 and the image-side surface 452 being both aspheric. Furthermore, the image-side surface 452 of the fifth lens element 450 includes at least two inflection points and at least one convex critical point.

The sixth lens element 460 with positive refractive power has an object-side surface 461 being convex in a paraxial region thereof and an image-side surface 462 being convex in a paraxial region thereof. The sixth lens element 460 is made of a plastic material, and has the object-side surface 461 and the image-side surface 462 being both aspheric.

The seventh lens element 470 with negative refractive power has an object-side surface 471 being concave in a paraxial region thereof and an image-side surface 472 being concave in a paraxial region thereof. The seventh lens element 470 is made of a plastic material, and has the object-side surface 471 and the image-side surface 472 being both aspheric. Furthermore, the image-side surface 472 of the seventh lens element 470 includes at least one convex critical point in an off-axis region thereof.

The filter 480 is made of a glass material and disposed between the seventh lens element 470 and the image surface 490 and will not affect the focal length of the photographing optical lens assembly.

The detailed optical data of the 4th embodiment are shown in Table 7 and the aspheric surface data are shown in Table 8 below.

TABLE 7

4th Embodiment
f = 3.94 mm, Fno = 1.53, HFOV = 38.8 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.541 | | | | |
| 2 | Lens 1 | 1.729 | ASP | 0.802 | Plastic | 1.545 | 56.1 | 4.39 |
| 3 | | 5.209 | ASP | 0.082 | | | | |
| 4 | Lens 2 | 3.424 | ASP | 0.220 | Plastic | 1.669 | 19.4 | −24.11 |
| 5 | | 2.752 | ASP | 0.196 | | | | |
| 6 | Stop | Plano | | 0.117 | | | | |
| 7 | Lens 3 | 9.539 | ASP | 0.472 | Plastic | 1.545 | 56.0 | 9.05 |
| 8 | | −10.023 | ASP | 0.121 | | | | |
| 9 | Lens 4 | −2.563 | ASP | 0.270 | Plastic | 1.669 | 19.4 | −6.58 |
| 10 | | −6.397 | ASP | 0.070 | | | | |
| 11 | Lens 5 | 4.122 | ASP | 0.320 | Plastic | 1.632 | 23.3 | −15.72 |
| 12 | | 2.826 | ASP | 0.160 | | | | |
| 13 | Lens 6 | 2.454 | ASP | 0.553 | Plastic | 1.580 | 34.8 | 2.07 |
| 14 | | −2.148 | ASP | 0.286 | | | | |
| 15 | Lens 7 | −2.550 | ASP | 0.370 | Plastic | 1.564 | 38.2 | −2.01 |
| 16 | | 2.142 | ASP | 0.373 | | | | |
| 17 | Filter | Plano | | 0.210 | Glass | 1.517 | 64.2 | — |
| 18 | | Plano | | 0.347 | | | | |
| 19 | Image | Plano | | — | | | | |

Reference wavelength is 587.6 nm (d-line).
Effective radius of Surface 6 is 1.030 mm.

TABLE 8

Aspheric Coefficients

| Surface # | | | | | | | |
|---|---|---|---|---|---|---|---|
| | 2 | 3 | 4 | 5 | 7 | 8 | 9 |
| k = | −8.7100E−01 | −6.6851E+01 | 0.0000E+00 | −3.4632E+00 | 4.0787E+01 | 0.0000E+00 | 1.5189E+00 |
| A4 = | 2.1996E−02 | −7.7232E−02 | −2.3122E−01 | −1.2219E−01 | −7.1481E−02 | 1.0027E−02 | 1.6659E−01 |
| A6 = | −7.7219E−03 | 1.2235E−01 | 2.7109E−01 | 1.7497E−01 | −1.5172E−02 | −3.4123E−01 | −6.3403E−01 |
| A8 = | 3.8856E−02 | −1.1136E−01 | −1.8792E−01 | −1.9527E−01 | −5.7329E−02 | 6.2050E−01 | 1.0673E+00 |
| A10 = | −5.2635E−02 | 5.6732E−02 | 7.0647E−02 | 2.3510E−01 | 7.0757E−02 | −8.5678E−01 | −1.1061E+00 |
| A12 = | 3.4238E−02 | −1.8097E−02 | −6.8454E−03 | −1.9368E−01 | −9.5949E−02 | 5.9953E−01 | 6.2946E−01 |
| A14 = | −9.0151E−03 | 2.2931E−03 | −2.2865E−04 | 7.2698E−02 | 4.6520E−02 | −1.5604E−01 | −1.4543E−01 |

| Surface # | | | | | | | |
|---|---|---|---|---|---|---|---|
| | 10 | 11 | 12 | 13 | 14 | 15 | 16 |
| k = | 0.0000E+00 | 2.0421E+00 | −2.8396E+01 | 0.0000E+00 | −1.8441E+01 | 0.0000E+00 | −1.3755E+01 |
| A4 = | 9.6017E−02 | −2.6157E−01 | −3.6330E−01 | −2.0488E−01 | 2.6977E−02 | −5.7553E−02 | −1.0285E−01 |
| A6 = | −3.0157E−01 | 5.3179E−01 | 5.9283E−01 | 1.9461E−01 | 2.4703E−02 | −4.1038E−02 | 5.0161E−02 |
| A8 = | 2.4977E−01 | −8.8210E−01 | −7.2717E−01 | −1.8030E−01 | −5.1266E−02 | 6.5651E−02 | −1.8309E−02 |
| A10 = | −2.9463E−02 | 7.7928E−01 | 5.0654E−01 | 7.0152E−02 | 2.0970E−02 | −2.6774E−02 | 4.4346E−03 |
| A12 = | −6.7432E−02 | −3.5928E−01 | −1.9132E−01 | −1.1812E−02 | −2.8727E−03 | 5.2839E−03 | −6.7443E−04 |
| A14 = | 2.5303E−02 | 7.1674E−02 | 3.6933E−02 | 9.1284E−04 | −2.8944E−05 | −5.2538E−04 | 5.6997E−05 |
| A16 = | | −3.1657E−03 | −2.8571E−03 | −4.5370E−05 | 2.5070E−05 | 2.1294E−05 | −1.9916E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.94 | TL/ImgH | 1.53 |
| f/EPD | 1.53 | |(R11 + R12)/(R11 − R12)| | 0.07 |
| HFOV [deg.] | 38.8 | R10/R1 | 1.63 |
| V4 + V5 | 42.7 | f5/f3 | −1.74 |
| V40 | 5 | f5/f2 | 0.65 |
| CT6/T67 | 1.93 | f/R10 | 1.39 |
| ΣAT/(T12 + T34 + T56) | 2.84 | (f/f4) + (f/f5) | −0.85 |
| Td/EPD | 1.57 | f/f5 | −0.25 |
| Td/ΣCT | 1.34 | | |

5th Embodiment

Figure 9:
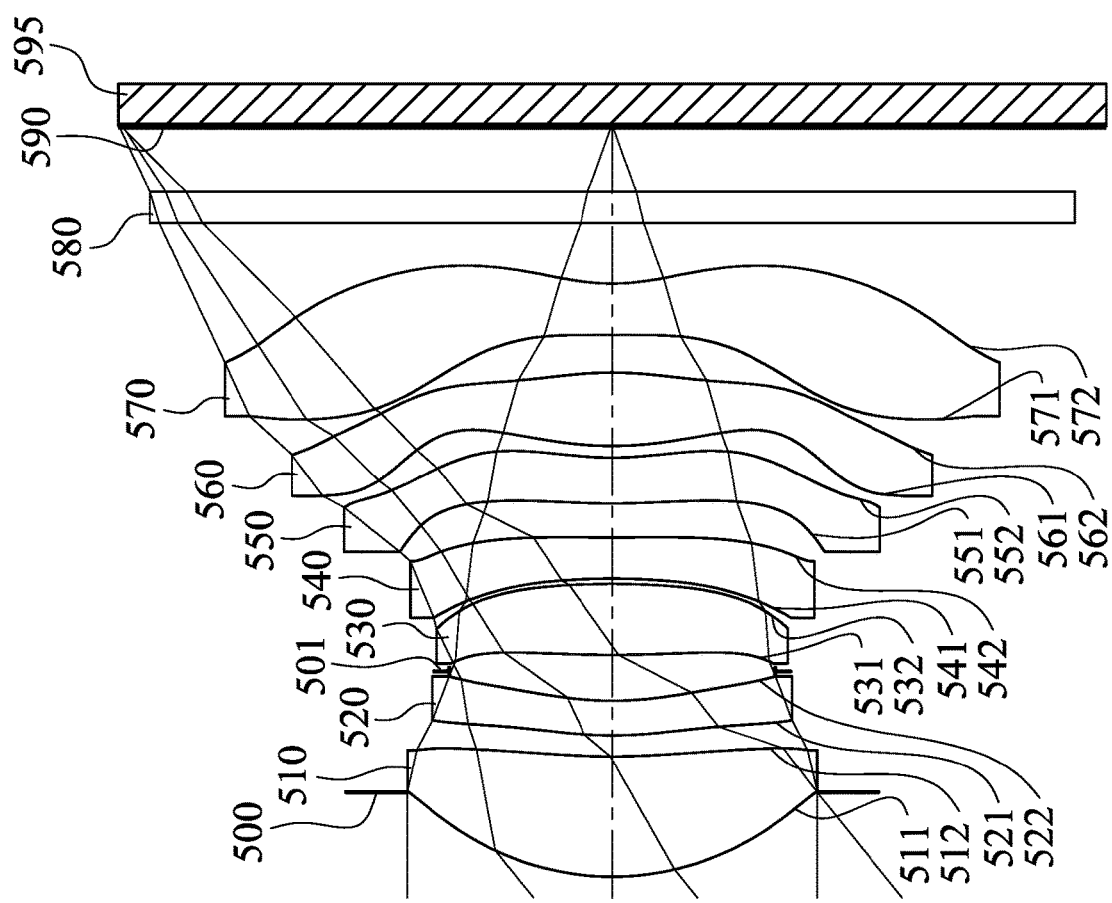
FIG. 9 is a schematic view of an imaging apparatus according to the 5th embodiment of the present disclosure.
Figure 10:
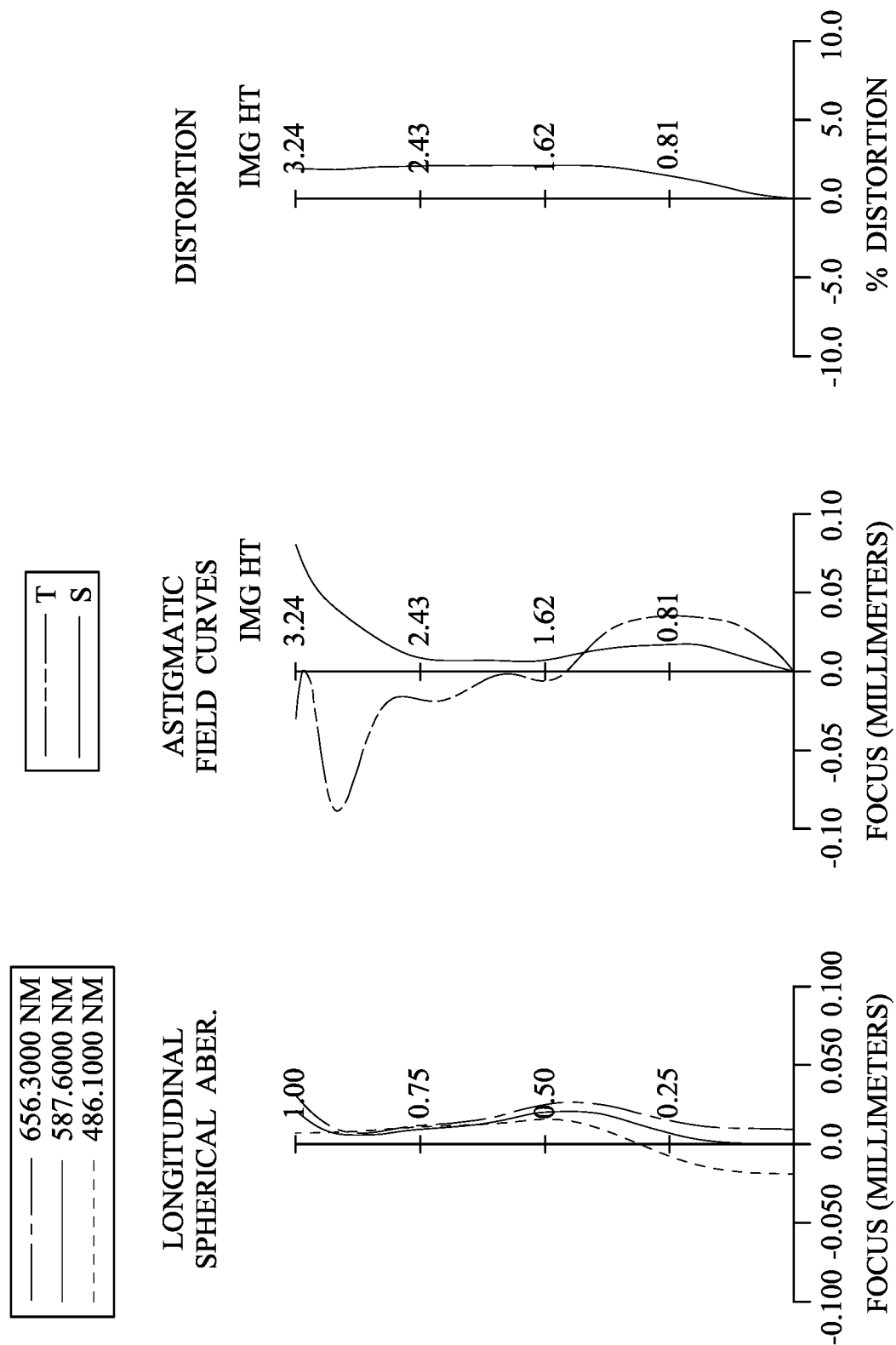
FIG. 10 shows, in order from left to right, spherical aberration curves, astigmatic field curves and a distortion curve of the imaging apparatus of the 5th embodiment.

FIG. 9 is a schematic view of an imaging apparatus according to the 5th embodiment of the present disclosure. FIG. 10 shows, in order from left to right, spherical aberration curves, astigmatic field curves and a distortion curve of the imaging apparatus of the 5th embodiment. As shown in FIG. 9, the imaging apparatus of the 5th embodiment includes a photographing optical lens assembly (reference number is omitted) and an image sensor 595. The photographing optical lens assembly includes, in order from an object side to an image side, an aperture stop 500, a first lens element 510, a second lens element 520, a stop 501, a third lens element 530, a fourth lens element 540, a fifth lens element 550, a sixth lens element 560, a seventh lens element 570, a filter 580 and an image surface 590, wherein the image sensor 595 is disposed on the image surface 590 of the photographing optical lens assembly. The photographing optical lens assembly includes seven lens elements (510, 520, 530, 540, 550, 560, 570) without additional one or more lens elements inserted between the first lens element 510 and the seventh lens element 570.

The first lens element 510 with positive refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with negative refractive power has an object-side surface 541 being concave in a paraxial region thereof and an image-side surface 542 being concave in a paraxial region thereof. The fourth lens element 540 is made of a plastic material, and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of a plastic material, and has the object-side surface 551 and the image-side surface 552 being both aspheric. Furthermore, the image-side surface 552 of the fifth lens element 550 includes at least three inflection points and at least one convex critical point.

The sixth lens element 560 with positive refractive power has an object-side surface 561 being convex in a paraxial region thereof and an image-side surface 562 being convex in a paraxial region thereof. The sixth lens element 560 is made of a plastic material, and has the object-side surface 561 and the image-side surface 562 being both aspheric.

The seventh lens element 570 with negative refractive power has an object-side surface 571 being convex in a paraxial region thereof and an image-side surface 572 being concave in a paraxial region thereof. The seventh lens element 570 is made of a plastic material, and has the object-side surface 571 and the image-side surface 572 being both aspheric. Furthermore, the image-side surface 572 of the seventh lens element 570 includes at least one convex critical point in an off-axis region thereof.

The filter 580 is made of a glass material and disposed between the seventh lens element 570 and the image surface 590 and will not affect the focal length of the photographing optical lens assembly.

The detailed optical data of the 5th embodiment are shown in Table 9 and the aspheric surface data are shown in Table 10 below.

TABLE 9

5th Embodiment
f = 3.93 mm, Fno = 1.45, HFOV = 38.9 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.560 | | | | |
| 2 | Lens 1 | 1.800 | ASP | 0.797 | Plastic | 1.545 | 56.1 | 5.19 |
| 3 | | 4.174 | ASP | 0.140 | | | | |
| 4 | Lens 2 | 2.339 | ASP | 0.230 | Plastic | 1.669 | 19.5 | −43.46 |
| 5 | | 2.080 | ASP | 0.194 | | | | |
| 6 | Stop | Plano | | 0.108 | | | | |

TABLE 9-continued

5th Embodiment
f = 3.93 mm, Fno = 1.45, HFOV = 38.9 deg.

| Surface # | | Curvature radius | | Thickness | Material | Index | Abbe # | Focal Length |
|---|---|---|---|---|---|---|---|---|
| 7 | Lens 3 | 8.055 | ASP | 0.471 | Plastic | 1.544 | 56.0 | 5.28 |
| 8 | | −4.371 | ASP | 0.035 | | | | |
| 9 | Lens 4 | −4.238 | ASP | 0.270 | Plastic | 1.669 | 19.5 | −5.59 |
| 10 | | 32.655 | ASP | 0.226 | | | | |
| 11 | Lens 5 | 4.927 | ASP | 0.305 | Plastic | 1.669 | 19.5 | −5.70 |
| 12 | | 2.097 | ASP | 0.079 | | | | |
| 13 | Lens 6 | 2.383 | ASP | 0.484 | Plastic | 1.639 | 23.5 | 1.90 |
| 14 | | −2.270 | ASP | 0.248 | | | | |
| 15 | Lens 7 | 62.539 | ASP | 0.340 | Plastic | 1.584 | 28.2 | −2.30 |
| 16 | | 1.315 | ASP | 0.400 | | | | |
| 17 | Filter | Plano | | 0.210 | Glass | 1.517 | 64.2 | — |
| 18 | | Plano | | 0.434 | | | | |
| 19 | Image | Plano | | — | | | | |

Reference wavelength is 587.6 nm (d-line).
Effective radius of Surface 6 is 1.078 mm.
Effective radius of Surface 9 is 1.180 mm.

TABLE 10

Aspheric Coefficients

| Surface # | 2 | 3 | 4 | 5 | 7 | 8 | 9 |
|---|---|---|---|---|---|---|---|
| k = | −9.9448E−01 | −2.7642E+01 | −4.7628E+00 | −6.7823E+00 | 3.6194E+01 | −1.0457E+01 | 4.8902E+00 |
| A4 = | 2.2734E−02 | −9.7878E−02 | −2.4916E−01 | −1.3158E−01 | −4.6751E−02 | 1.4184E−01 | 1.0480E−01 |
| A6 = | −1.8911E−02 | 1.3405E−01 | 2.2732E−01 | 1.4082E−01 | −3.5106E−02 | −8.4478E−01 | −7.1648E−01 |
| A8 = | 4.8903E−02 | −1.3271E−01 | −1.4360E−01 | −1.6145E−01 | −2.7018E−02 | 1.7209E+00 | 1.4704E+00 |
| A10 = | −5.3510E−02 | 8.7138E−02 | 1.0246E−01 | 2.2527E−01 | 7.7892E−03 | −1.9393E+00 | −1.4206E+00 |
| A12 = | 2.8583E−02 | −3.4323E−02 | −5.8459E−02 | −1.7210E−01 | 2.1091E−03 | 1.0898E+00 | 5.5494E−01 |
| A14 = | −6.2256E−03 | 5.4395E−03 | 1.4728E−02 | 5.0292E−02 | −2.8684E−03 | −2.4000E−01 | 1.7249E−02 |
| A16 = | | | | | | | −4.6041E−02 |

| Surface # | 10 | 11 | 12 | 13 | 14 | 15 | 16 |
|---|---|---|---|---|---|---|---|
| k = | 0.0000E+00 | 4.2211E+00 | −9.0776E+00 | 9.7895E−03 | −2.6423E+01 | 0.0000E+00 | −7.8836E+00 |
| A4 = | −5.1552E−02 | −2.5429E−01 | −3.4864E−01 | −6.6509E−02 | 9.3838E−02 | −3.0043E−01 | −2.1077E−01 |
| A6 = | −1.0869E−01 | 4.5390E−01 | 4.2108E−01 | −1.0563E−01 | −2.1728E−02 | 9.0898E−02 | 1.5017E−01 |
| A8 = | 1.9079E−01 | −6.9017E−01 | −5.0544E−01 | 1.9258E−01 | −4.7562E−02 | 3.4896E−02 | −7.7550E−02 |
| A10 = | −1.1991E−01 | 5.9498E−01 | 3.6036E−01 | −2.6680E−01 | 1.3763E−02 | −2.7749E−02 | 2.7413E−02 |
| A12 = | 1.4850E−02 | −2.8409E−01 | −1.3807E−01 | 1.7501E−01 | 8.6410E−03 | 7.3944E−03 | −6.3327E−03 |
| A14 = | 6.1604E−03 | 6.3743E−02 | 2.7131E−02 | −5.6222E−02 | −5.0937E−03 | −1.0063E−03 | 9.0797E−04 |
| A16 = | | −4.5118E−03 | −2.1719E−03 | 8.6850E−03 | 9.3935E−04 | 7.0301E−05 | −7.5303E−05 |
| A18 = | | | | −4.8851E−04 | −5.9538E−05 | −2.0048E−06 | 3.1702E−06 |
| A20 = | | | | −6.2719E−06 | −9.9622E−08 | | −4.8337E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

5th Embodiment

| f [mm] | 3.93 | TL/ImgH | 1.54 |
|---|---|---|---|
| f/EPD | 1.45 | |(R11 + R12)/(R11 − R12)| | 0.02 |

-continued

5th Embodiment

| HFOV [deg.] | 38.9 | R10/R1 | 1.16 |
|---|---|---|---|
| V4 + V5 | 38.9 | f5/f3 | −1.08 |
| V40 | 5 | f5/f2 | 0.13 |
| CT6/T67 | 1.95 | f/R10 | 1.87 |
| ΣAT/(T12 + T34 + T56) | 4.06 | (f/f4) + (f/f5) | −1.39 |
| Td/EPD | 1.45 | f/f5 | −0.69 |
| Td/ΣCT | 1.36 | | |

6th Embodiment

Figure 11:
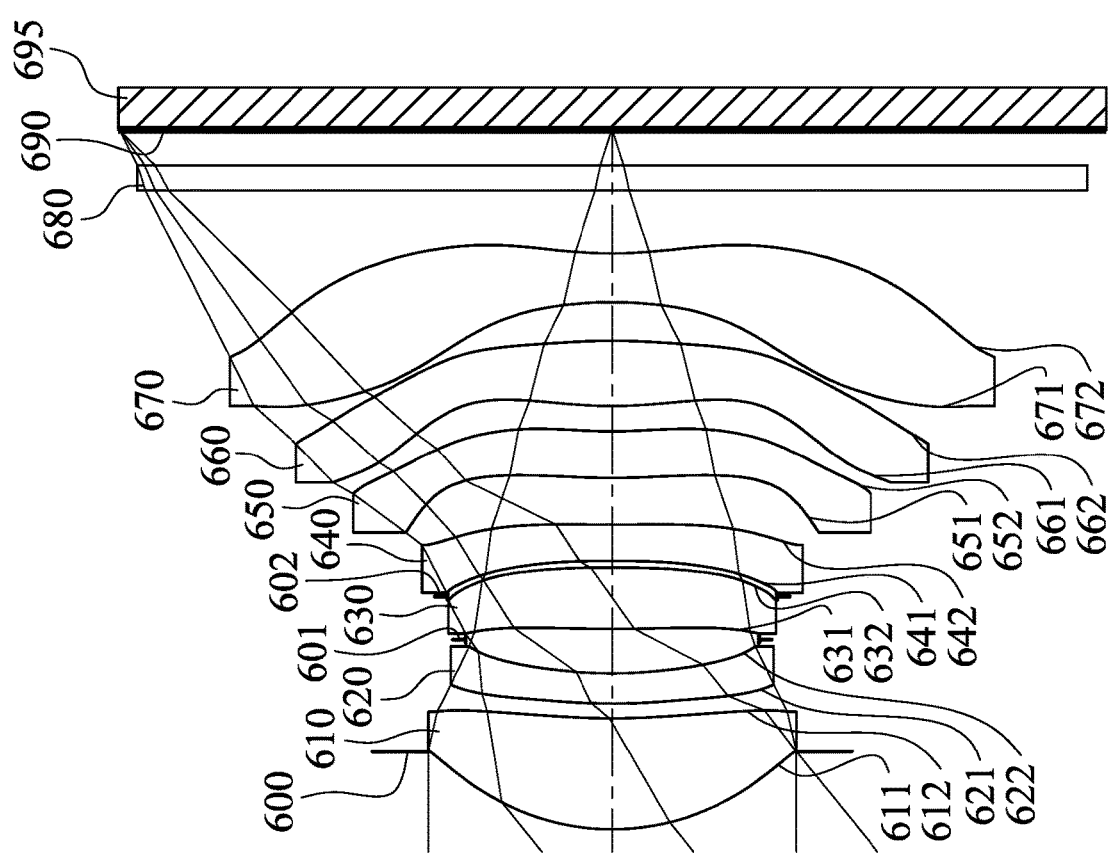
FIG. 11 is a schematic view of an imaging apparatus according to the 6th embodiment of the present disclosure.

FIG. 11 is a schematic view of an imaging apparatus according to the 6th embodiment of the present disclosure.

Figure 12:
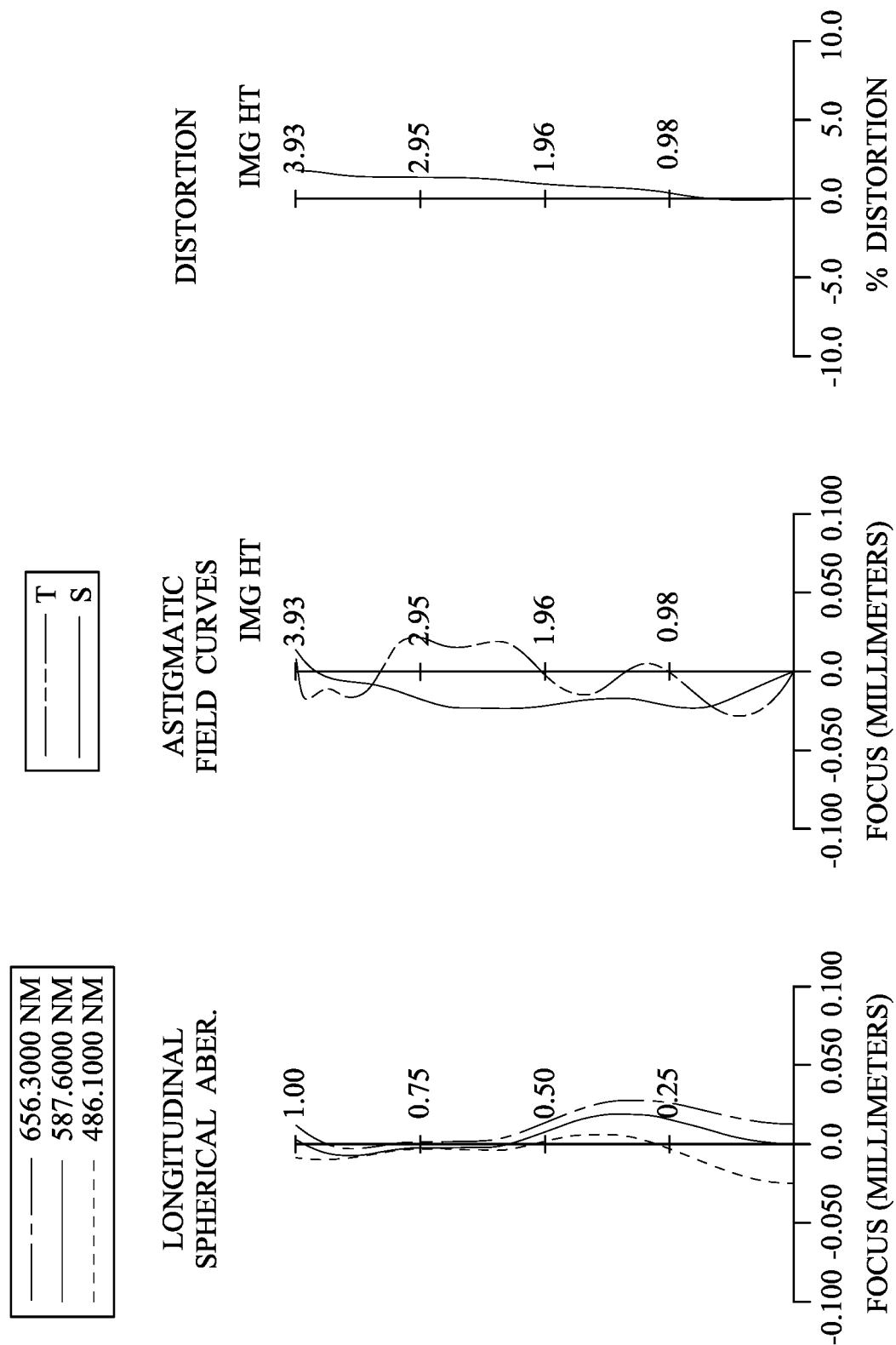
FIG. 12 shows, in order from left to right, spherical aberration curves, astigmatic field curves and a distortion curve of the imaging apparatus of the 6th embodiment.

FIG. 12 shows, in order from left to right, spherical aberration curves, astigmatic field curves and a distortion curve of the imaging apparatus of the 6th embodiment. As shown in FIG. 11, the imaging apparatus of the 6th embodiment includes a photographing optical lens assembly (reference number is omitted) and an image sensor 695. The photographing optical lens assembly includes, in order from an object side to an image side, an aperture stop 600, a first lens element 610, a second lens element 620, an stop 601, a third lens element 630, a stop 602, a fourth lens element 640, a fifth lens element 650, a sixth lens element 660, a seventh lens element 670, a filter 680 and an image surface 690, wherein the image sensor 695 is disposed on the image surface 690 of the photographing optical lens assembly. The photographing optical lens assembly includes seven lens elements (610, 620, 630, 640, 650, 660, 670) without additional one or more lens elements inserted between the first lens element 610 and the seventh lens element 670.

The first lens element 610 with positive refractive power has an object-side surface 611 being convex in a paraxial region thereof and an image-side surface 612 being concave in a paraxial region thereof. The first lens element 610 is made of a plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of a plastic material, and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of a plastic material, and has the object-side surface 651 and the image-side surface 652 being both aspheric. Furthermore, the image-side surface 652 of the fifth lens element 650 includes at least three inflection points and at least one convex critical point.

The sixth lens element 660 with positive refractive power has an object-side surface 661 being convex in a paraxial region thereof and an image-side surface 662 being convex in a paraxial region thereof. The sixth lens element 660 is made of a plastic material, and has the object-side surface 661 and the image-side surface 662 being both aspheric.

The seventh lens element 670 with negative refractive power has an object-side surface 671 being concave in a paraxial region thereof and an image-side surface 672 being concave in a paraxial region thereof. The seventh lens element 670 is made of a plastic material, and has the object-side surface 671 and the image-side surface 672 being both aspheric. Furthermore, the image-side surface 672 of the seventh lens element 670 includes at least one convex critical point in an off-axis region thereof.

The filter 680 is made of a glass material and disposed between the seventh lens element 670 and the image surface 690 and will not affect the focal length of the photographing optical lens assembly.

The detailed optical data of the 6th embodiment are shown in Table 11 and the aspheric surface data are shown in Table 12 below.

TABLE 11

6th Embodiment
f = 4.76 mm, Fno = 1.62, HFOV = 39.1 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.623 | | | | |
| 2 | Lens 1 | 1.892 | ASP | 0.891 | Plastic | 1.545 | 56.1 | 4.90 |
| 3 | | 5.409 | ASP | 0.117 | | | | |
| 4 | Lens 2 | 4.058 | ASP | 0.240 | Plastic | 1.669 | 19.5 | −25.91 |
| 5 | | 3.210 | ASP | 0.270 | | | | |
| 6 | Stop | Plano | | 0.085 | | | | |
| 7 | Lens 3 | 13.672 | ASP | 0.490 | Plastic | 1.544 | 56.0 | 12.26 |
| 8 | | −12.866 | ASP | −0.231 | | | | |
| 9 | Stop | Plano | | 0.282 | | | | |
| 10 | Lens 4 | −16.510 | ASP | 0.290 | Plastic | 1.669 | 19.5 | −12.45 |
| 11 | | 16.916 | ASP | 0.373 | | | | |
| 12 | Lens 5 | 5.126 | ASP | 0.376 | Plastic | 1.669 | 19.5 | −22.31 |
| 13 | | 3.703 | ASP | 0.201 | | | | |
| 14 | Lens 6 | 3.276 | ASP | 0.520 | Plastic | 1.614 | 26.0 | 3.21 |
| 15 | | −4.640 | ASP | 0.307 | | | | |
| 16 | Lens 7 | −3.419 | ASP | 0.389 | Plastic | 1.614 | 26.0 | −2.57 |
| 17 | | 3.058 | ASP | 0.500 | | | | |
| 18 | Filter | Plano | | 0.210 | Glass | 1.517 | 64.2 | — |
| 19 | | Plano | | 0.280 | | | | |
| 20 | Image | Plano | | — | | | | |

Reference wavelength is 587.6 nm (d-line).
Effective radius of Surface 6 is 1.170 mm.
Effective radius of Surface 9 is 1.315 mm.

TABLE 12

Aspheric Coefficients

| Surface # | 2 | 3 | 4 | 5 | 7 | 8 | 10 |
|---|---|---|---|---|---|---|---|
| k = | −2.2801E−01 | −1.6518E+01 | −5.6079E+00 | 1.2634E+00 | 0.0000E+00 | −4.9940E+01 | 0.0000E+00 |
| A4 = | −2.4522E−04 | −6.0900E−02 | −1.2749E−01 | −9.0203E−02 | −2.9836E−02 | −9.8474E−02 | −1.6859E−01 |
| A6 = | 2.6586E−03 | 5.3209E−02 | 1.1809E−01 | 8.0597E−02 | −4.2514E−02 | −6.0852E−03 | 1.5051E−01 |
| A8 = | 4.1263E−03 | −3.2060E−02 | −4.4934E−02 | −1.4163E−02 | 9.7206E−02 | 3.7460E−01 | 1.1497E−01 |
| A10 = | −8.4479E−03 | 1.3707E−02 | 1.0858E−02 | 3.3495E−04 | −1.3111E−01 | −6.8714E−01 | −3.7318E−01 |
| A12 = | 5.0753E−03 | −4.3697E−03 | −9.0038E−04 | −1.9804E−03 | 8.1466E−02 | 5.0286E−01 | 2.7841E−01 |
| A14 = | −1.1931E−03 | 5.3124E−04 | | 3.1614E−03 | −1.8780E−02 | −1.5981E−01 | −7.6158E−02 |
| A16 = | | | | | | 1.6644E−02 | 4.3933E−03 |

| Surface # | 11 | 12 | 13 | 14 | 15 | 16 | 17 |
|---|---|---|---|---|---|---|---|
| k = | 0.0000E+00 | 2.5491E+00 | −8.0000E+01 | −1.1859E−01 | 1.2539E+00 | −1.6397E−01 | −1.0000E+00 |
| A4 = | −1.3798E−01 | −1.7438E−01 | −1.5200E−01 | −1.3656E−01 | 1.2923E−01 | −7.8495E−03 | −1.2449E−01 |
| A6 = | 1.4573E−01 | 1.8313E−01 | 9.7315E−02 | 6.1177E−02 | −1.1867E−01 | −8.8349E−02 | 3.1886E−02 |
| A8 = | −1.1267E−01 | −1.6125E−01 | −5.0391E−02 | −5.8135E−02 | 3.6094E−02 | 7.1609E−02 | −1.8233E−03 |
| A10 = | 3.8938E−02 | 8.3215E−02 | 1.5214E−02 | 2.6194E−02 | −2.1342E−03 | −2.4209E−02 | −1.2908E−03 |
| A12 = | −1.6683E−03 | −2.5162E−02 | −2.1639E−03 | −5.4062E−03 | −1.0517E−03 | 4.4610E−03 | 3.8908E−04 |
| A14 = | −2.0856E−03 | 3.1743E−03 | 1.0706E−04 | 5.1911E−04 | 2.2917E−04 | −4.7022E−04 | −5.0779E−05 |
| A16 = | 4.1990E−04 | | | −1.8738E−05 | −1.6358E−05 | 2.6759E−05 | 3.3213E−06 |
| A18 = | | | | | 3.1884E−07 | −6.4018E−07 | −8.8080E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.76 | TL/ImgH | 1.42 |
| f/EPD | 1.62 | |(R11 + R12)/(R11 − R12)| | 0.17 |
| HFOV [deg.] | 39.1 | R10/R1 | 1.96 |
| V4 + V5 | 38.9 | f5/f3 | −1.82 |
| V40 | 5.00 | f5/f2 | 0.86 |
| CT6/T67 | 1.69 | f/R10 | 1.28 |
| ΣAT/(T12 + T34 + T56) | 3.80 | (f/f4) + (f/f5) | −0.60 |
| Td/EPD | 1.57 | f/f5 | −0.21 |
| Td/ΣCT | 1.44 | | |

7th Embodiment

Figure 13:
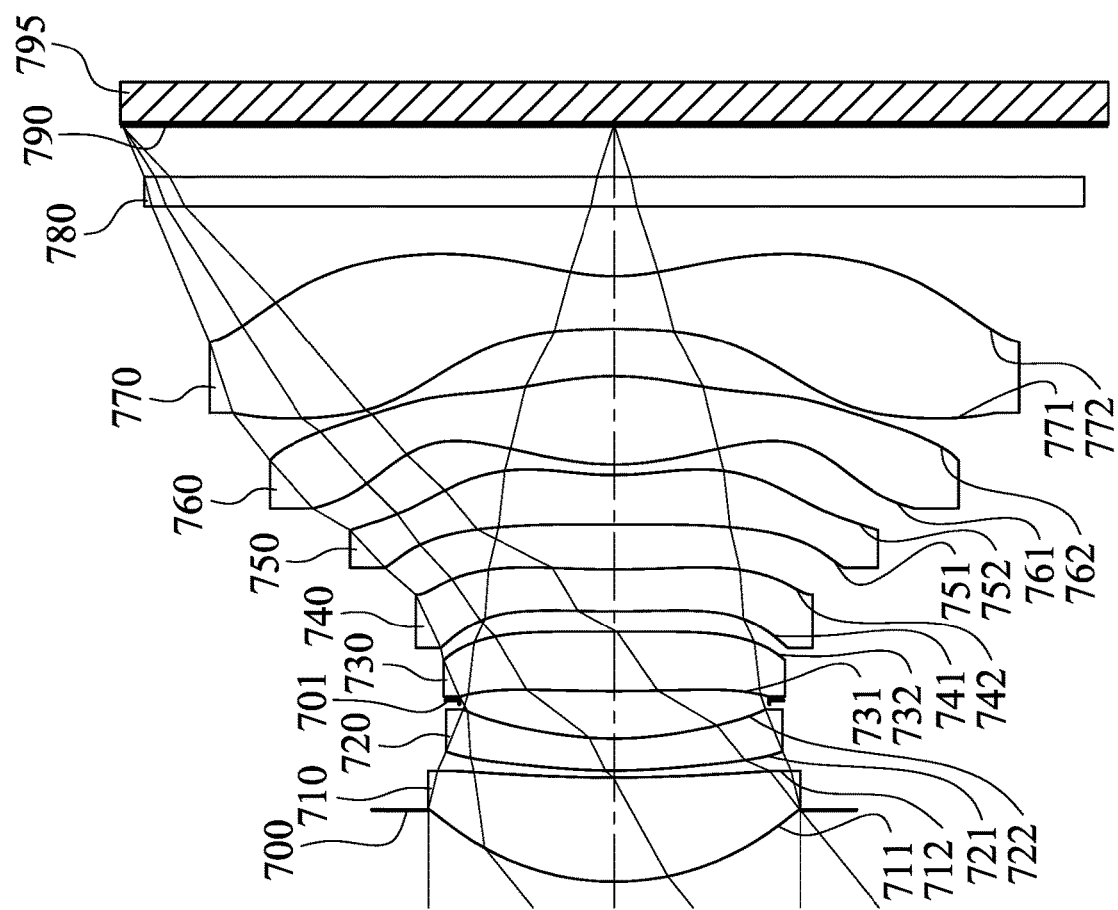
FIG. 13 is a schematic view of an imaging apparatus according to the 7th embodiment of the present disclosure.
Figure 14:
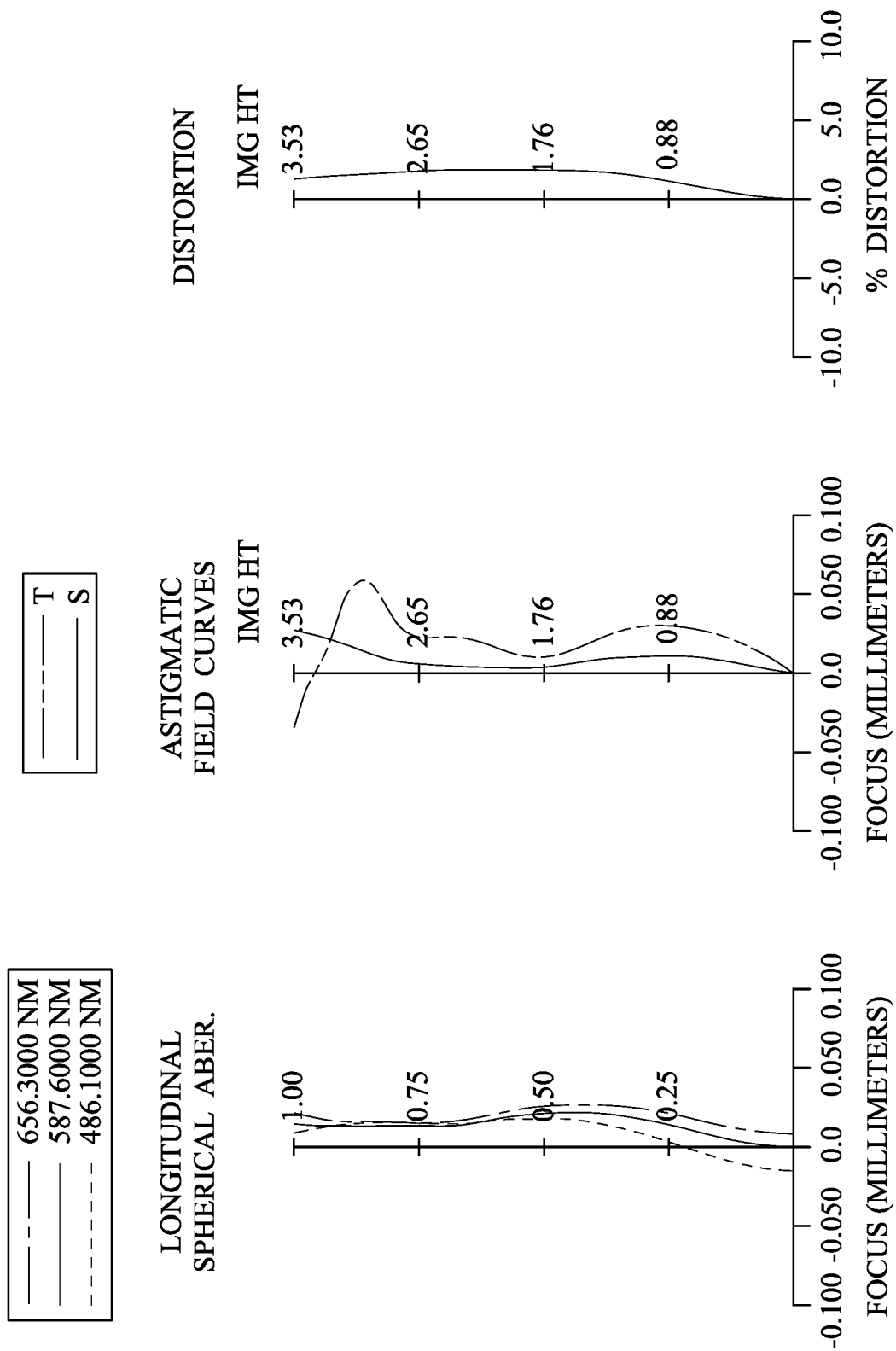
FIG. 14 shows, in order from left to right, spherical aberration curves, astigmatic field curves and a distortion curve of the imaging apparatus of the 7th embodiment.

FIG. 13 is a schematic view of an imaging apparatus according to the 7th embodiment of the present disclosure. FIG. 14 shows, in order from left to right, spherical aberration curves, astigmatic field curves and a distortion curve of the imaging apparatus of the 7th embodiment. As shown in FIG. 13, the imaging apparatus of the 7th embodiment includes a photographing optical lens assembly (reference number is omitted) and an image sensor 795. The photographing optical lens assembly includes, in order from an object side to an image side, an aperture stop 700, a first lens element 710, a second lens element 720, a stop 701, a third lens element 730, a fourth lens element 740, a fifth lens element 750, a sixth lens element 760, a seventh lens element 770, a filter 780 and an image surface 790, wherein the image sensor 795 is disposed on the image surface 790 of the photographing optical lens assembly. The photographing optical lens assembly includes seven lens elements (710, 720, 730, 740, 750, 760, 770) without additional one or more lens elements inserted between the first lens element 710 and the seventh lens element 770.

The first lens element 710 with positive refractive power has an object-side surface 711 being convex in a paraxial region thereof and an image-side surface 712 being concave in a paraxial region thereof. The first lens element 710 is made of a plastic material, and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of a plastic material, and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of a plastic material, and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of a plastic material, and has the object-side surface 751 and the image-side surface 752 being both aspheric. Furthermore, the image-side surface 752 of the fifth lens element 750 includes at least four inflection points and at least one convex critical point.

The sixth lens element 760 with positive refractive power has an object-side surface 761 being convex in a paraxial region thereof and an image-side surface 762 being convex in a paraxial region thereof. The sixth lens element 760 is made of a plastic material, and has the object-side surface 761 and the image-side surface 762 being both aspheric.

The seventh lens element 770 with negative refractive power has an object-side surface 771 being concave in a paraxial region thereof and an image-side surface 772 being concave in a paraxial region thereof. The seventh lens element 770 is made of a plastic material, and has the object-side surface 771 and the image-side surface 772 being both aspheric. Furthermore, the image-side surface 772 of the seventh lens element 770 includes at least one convex critical point in an off-axis region thereof.

The filter 780 is made of a glass material and disposed between the seventh lens element 770 and the image surface 790 and will not affect the focal length of the photographing optical lens assembly.

The detailed optical data of the 7th embodiment are shown in Table 13 and the aspheric surface data are shown in Table 14 below.

TABLE 13

7th Embodiment
f = 4.29 mm, Fno = 1.61, HFOV = 39.0 deg.

| Surface # |  | Curvature radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.514 |  |  |  |  |
| 2 | Lens 1 | 1.916 | ASP | 0.746 | Plastic | 1.545 | 56.1 | 4.34 |
| 3 |  | 8.755 | ASP | 0.049 |  |  |  |  |
| 4 | Lens 2 | 4.086 | ASP | 0.230 | Plastic | 1.669 | 19.5 | −11.39 |
| 5 |  | 2.600 | ASP | 0.272 |  |  |  |  |
| 6 | Stop | Plano |  | 0.068 |  |  |  |  |
| 7 | Lens 3 | 12.452 | ASP | 0.424 | Plastic | 1.544 | 56.0 | 30.07 |
| 8 |  | 51.503 | ASP | 0.151 |  |  |  |  |
| 9 | Lens 4 | 9.576 | ASP | 0.300 | Plastic | 1.669 | 19.5 | −61.57 |
| 10 |  | 7.671 | ASP | 0.322 |  |  |  |  |
| 11 | Lens 5 | 29.974 | ASP | 0.354 | Plastic | 1.556 | 42.6 | −4.02 |
| 12 |  | 2.072 | ASP | 0.074 |  |  |  |  |
| 13 | Lens 6 | 1.749 | ASP | 0.634 | Plastic | 1.550 | 54.0 | 1.75 |
| 14 |  | −1.857 | ASP | 0.340 |  |  |  |  |
| 15 | Lens 7 | −6.004 | ASP | 0.380 | Plastic | 1.534 | 55.9 | −2.27 |
| 16 |  | 1.552 | ASP | 0.500 |  |  |  |  |
| 17 | Filter | Plano |  | 0.210 | Glass | 1.517 | 64.2 | — |
| 18 |  | Plano |  | 0.375 |  |  |  |  |
| 19 | Image | Plano |  | — |  |  |  |  |

Reference wavelength is 587.6 nm (d-line).
Effective radius of Surface 6 is 1.110 mm.
Effective radius of Surface 11 is 1.640 mm.

TABLE 14

Aspheric Coefficients

| | Surface # | | | | | | |
|---|---|---|---|---|---|---|---|
| | 2 | 3 | 4 | 5 | 7 | 8 | 9 |
| k = | −8.2173E−02 | 3.5418E+01 | −3.2785E−01 | −9.2507E−01 | −8.3841E+01 | 7.0979E+01 | −3.1746E+01 |
| A4 = | 1.4378E−03 | −6.4756E−02 | −1.0212E−01 | −5.3107E−02 | −1.6009E−02 | −4.0140E−02 | −9.3795E−02 |
| A6 = | 8.1511E−03 | 8.6817E−02 | 1.0344E−01 | 2.7145E−02 | −6.5429E−02 | −1.2419E−01 | −1.0325E−01 |
| A8 = | −2.0836E−02 | −7.3058E−02 | −4.4779E−02 | 2.0807E−02 | 1.1076E−01 | 2.3665E−01 | 1.1590E−01 |
| A10 = | 3.0973E−02 | 2.6540E−02 | −1.3870E−02 | −3.7487E−02 | −1.6584E−01 | −2.9230E−01 | −7.5812E−02 |
| A12 = | −2.5688E−02 | −1.3776E−03 | 2.6700E−02 | 2.1448E−02 | 1.1246E−01 | 1.7838E−01 | 1.8586E−02 |
| A14 = | 1.0983E−02 | −1.5886E−03 | −7.8137E−03 |  | −2.6675E−02 | −4.2214E−02 | 9.2159E−04 |

| | Surface # | | | | | | |
|---|---|---|---|---|---|---|---|
| | 10 | 11 | 12 | 13 | 14 | 15 | 16 |
| k = | −1.9150E+01 | 9.0000E+01 | −1.5299E+01 | −7.2575E+00 | −1.1786E+01 | 2.9783E−01 | −7.4788E+00 |
| A4 = | −5.3697E−02 | −1.5837E−01 | −3.1335E−01 | −8.4270E−02 | 5.3955E−02 | −1.0549E−01 | −1.1123E−01 |
| A6 = | −7.0328E−02 | 2.8466E−01 | 2.7605E−01 | 1.0224E−01 | 6.9401E−02 | −3.0833E−02 | 5.1484E−02 |
| A8 = | 8.2407E−02 | −3.4828E−01 | −2.3614E−01 | −9.4079E−02 | −1.0655E−01 | 5.6427E−02 | −1.7670E−02 |
| A10 = | −6.8450E−02 | 2.4691E−01 | 1.3246E−01 | 3.3353E−02 | 5.3071E−02 | −2.2466E−02 | 4.4751E−03 |
| A12 = | 4.5216E−02 | −1.0017E−01 | −4.0320E−02 | −4.9401E−03 | −1.3351E−02 | 4.4839E−03 | −8.0260E−04 |
| A14 = | −2.0739E−02 | 2.1007E−02 | 6.1539E−03 | 2.3417E−04 | 1.8191E−03 | −4.9915E−04 | 9.1923E−05 |
| A16 = | 4.3476E−03 | −1.7338E−03 | −3.7142E−04 | 4.6195E−06 | −1.2661E−04 | 2.9714E−05 | −5.8634E−06 |
| A18 = |  |  |  |  | 3.4539E−06 | −7.4091E−07 | 1.5748E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.29 | TL/ImgH | 1.54 |
| f/EPD | 1.61 | |(R11 + R12)/(R11 − R12)| | 0.03 |
| HFOV [deg.] | 39.0 | R10/R1 | 1.08 |
| V4 + V5 | 62.1 | f5/f3 | −0.13 |
| V40 | 2.00 | f5/f2 | 0.35 |
| CT6/T67 | 1.86 | f/R10 | 2.07 |
| ΣAT/(T12 + T34 + T56) | 4.66 | (f/f4) + (f/f5) | −1.14 |
| Td/EPD | 1.63 | f/f5 | −1.07 |
| Td/ΣCT | 1.42 | | |

8th Embodiment

Figure 15:
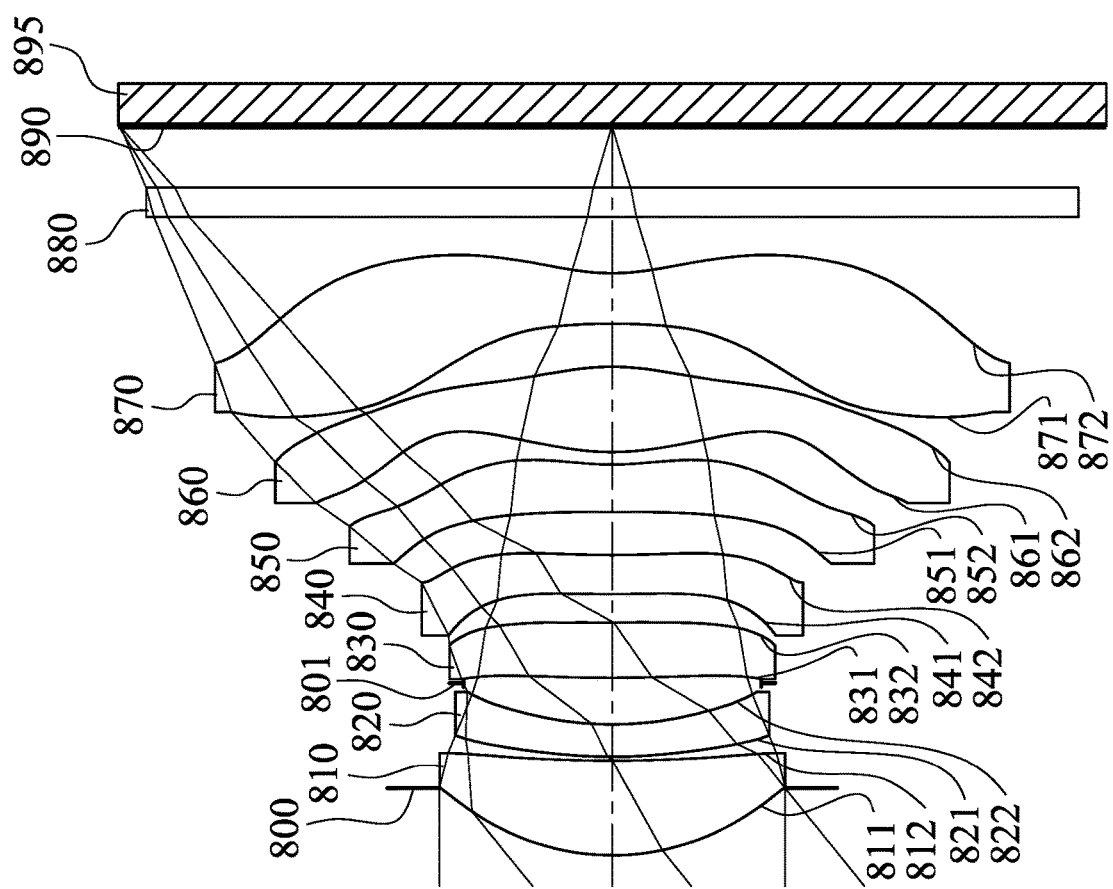
FIG. 15 is a schematic view of an imaging apparatus according to the 8th embodiment of the present disclosure.
Figure 16:
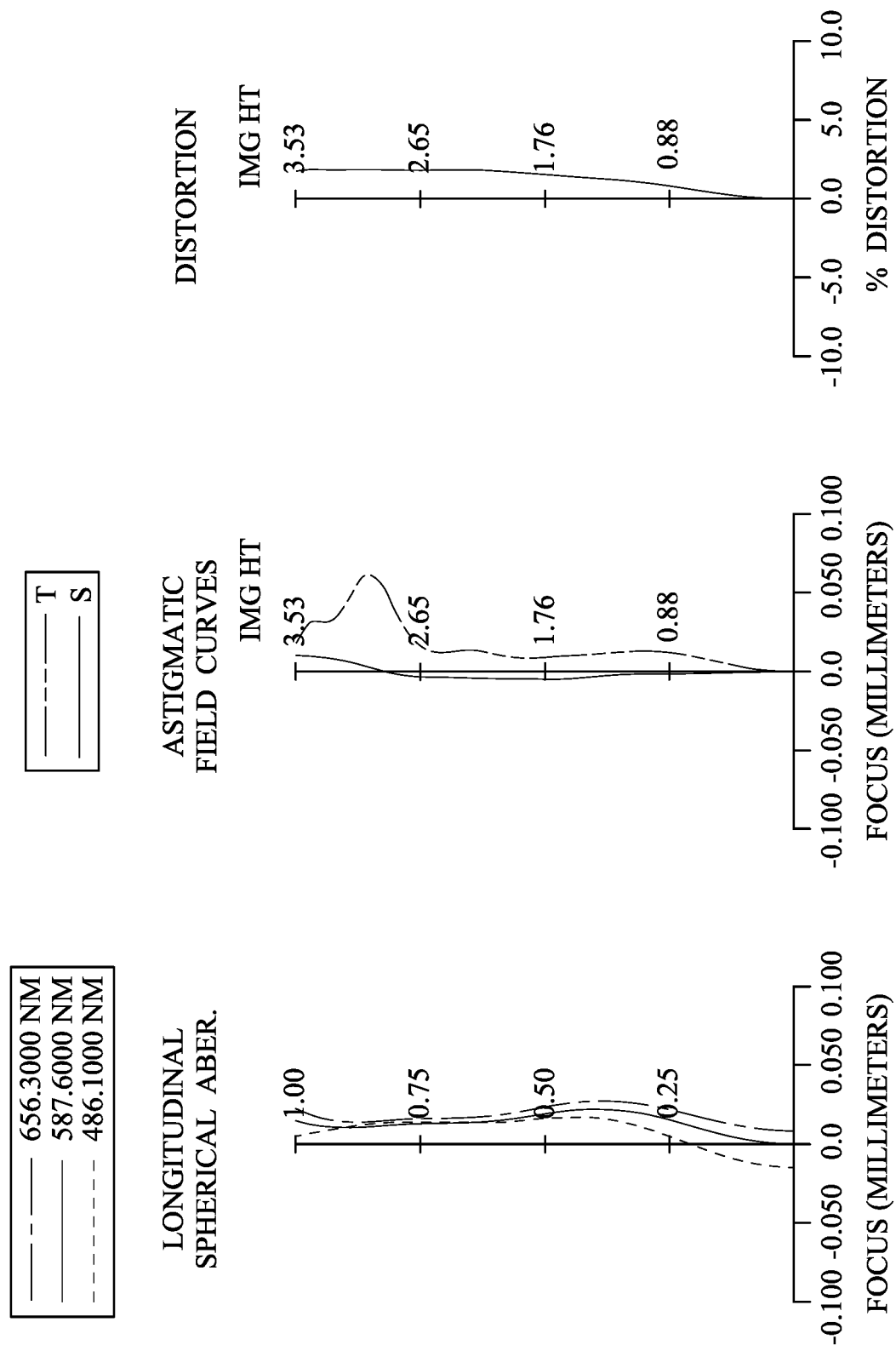
FIG. 16 shows, in order from left to right, spherical aberration curves, astigmatic field curves and a distortion curve of the imaging apparatus of the 8th embodiment.

FIG. 15 is a schematic view of an imaging apparatus according to the 8th embodiment of the present disclosure. FIG. 16 shows, in order from left to right, spherical aberration curves, astigmatic field curves and a distortion curve of the imaging apparatus of the 8th embodiment. As shown in FIG. 15, the imaging apparatus of the 8th embodiment includes a photographing optical lens assembly (reference number is omitted) and an image sensor 895. The photographing optical lens assembly includes, in order from an object side to an image side, an aperture stop 800, a first lens element 810, a second lens element 820, a stop 801, a third lens element 830, a fourth lens element 840, a fifth lens element 850, a sixth lens element 860, a seventh lens element 870, a filter 880 and an image surface 890, wherein the image sensor 895 is disposed on the image surface 890 of the photographing optical lens assembly. The photographing optical lens assembly includes seven lens elements (810, 820, 830, 840, 850, 860, 870) without additional one or more lens elements inserted between the first lens element 810 and the seventh lens element 870.

The first lens element 810 with positive refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric.

The fifth lens element 850 with negative refractive power has an object-side surface 851 being convex in a paraxial region thereof and an image-side surface 852 being concave in a paraxial region thereof. The fifth lens element 850 is made of a plastic material, and has the object-side surface 851 and the image-side surface 852 being both aspheric. Furthermore, the image-side surface 852 of the fifth lens element 850 includes at least three inflection points and at least one convex critical point.

The sixth lens element 860 with positive refractive power has an object-side surface 861 being convex in a paraxial region thereof and an image-side surface 862 being convex in a paraxial region thereof. The sixth lens element 860 is made of a plastic material, and has the object-side surface 861 and the image-side surface 862 being both aspheric.

The seventh lens element 870 with negative refractive power has an object-side surface 871 being concave in a paraxial region thereof and an image-side surface 872 being concave in a paraxial region thereof. The seventh lens element 870 is made of a plastic material, and has the object-side surface 871 and the image-side surface 872 being both aspheric. Furthermore, the image-side surface 872 of the seventh lens element 870 includes at least one convex critical point in an off-axis region thereof.

The filter 880 is made of a glass material and disposed between the seventh lens element 870 and the image surface 890 and will not affect the focal length of the photographing optical lens assembly.

The detailed optical data of the 8th embodiment are shown in Table 15 and the aspheric surface data are shown in Table 16 below.

TABLE 15

8th Embodiment
f = 4.27 mm, Fno = 1.73, HFOV = 39.0 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.479 | | | | |
| 2 | Lens 1 | 1.771 | ASP | 0.678 | Plastic | 1.545 | 56.1 | 4.07 |
| 3 | | 7.588 | ASP | 0.030 | | | | |
| 4 | Lens 2 | 3.418 | ASP | 0.230 | Plastic | 1.669 | 19.5 | −11.38 |
| 5 | | 2.295 | ASP | 0.295 | | | | |
| 6 | Stop | Plano | | 0.038 | | | | |

TABLE 15-continued

8th Embodiment
f = 4.27 mm, Fno = 1.73, HFOV = 39.0 deg.

| Surface # | | Curvature radius | | Thickness | Material | Index | Abbe # | Focal Length |
|---|---|---|---|---|---|---|---|---|
| 7 | Lens 3 | 10.707 | ASP | 0.396 | Plastic | 1.544 | 56.0 | 22.41 |
| 8 | | 86.893 | ASP | 0.202 | | | | |
| 9 | Lens 4 | 11.847 | ASP | 0.280 | Plastic | 1.669 | 19.5 | −26.58 |
| 10 | | 7.042 | ASP | 0.304 | | | | |
| 11 | Lens 5 | 47.295 | ASP | 0.346 | Plastic | 1.572 | 37.0 | −3.95 |
| 12 | | 2.152 | ASP | 0.089 | | | | |
| 13 | Lens 6 | 1.821 | ASP | 0.609 | Plastic | 1.555 | 46.8 | 1.72 |
| 14 | | −1.762 | ASP | 0.309 | | | | |
| 15 | Lens 7 | −5.240 | ASP | 0.360 | Plastic | 1.544 | 56.0 | −2.16 |
| 16 | | 1.553 | ASP | 0.400 | | | | |
| 17 | Filter | Plano | | 0.210 | Glass | 1.517 | 64.2 | — |
| 18 | | Plano | | 0.445 | | | | |
| 19 | Image | Plano | | — | | | | |

Reference wavelength is 587.6 nm (d-line).
Effective radius of Surface 6 is 1.064 mm.

TABLE 16

Aspheric Coefficients

| Surface # | | | | | | | |
|---|---|---|---|---|---|---|---|
| | 2 | 3 | 4 | 5 | 7 | 8 | 9 |
| k = | −9.5328E−02 | 3.0473E+01 | 8.5497E−01 | −3.3036E−01 | 2.4426E+01 | −9.9000E+01 | −2.6602E+01 |
| A4 = | 3.8837E−03 | −8.6650E−02 | −1.2593E−01 | −5.4143E−02 | −2.6529E−02 | −4.7692E−02 | −1.2568E−01 |
| A6 = | −2.6223E−03 | 1.6094E−01 | 1.8754E−01 | 3.6796E−02 | −3.5184E−02 | −7.8156E−02 | −1.0137E−01 |
| A8 = | 1.6224E−02 | −1.8607E−01 | −1.8050E−01 | 1.7242E−02 | 8.0182E−02 | 1.9847E−01 | 1.3674E−01 |
| A10 = | −2.7688E−02 | 1.1238E−01 | 1.0492E−01 | −3.8304E−02 | −1.5115E−01 | −2.8537E−01 | −1.0219E−01 |
| A12 = | 2.0389E−02 | −3.4999E−02 | −2.6518E−02 | 2.6105E−02 | 1.1791E−01 | 1.9166E−01 | 2.3637E−02 |
| A14 = | −6.3839E−03 | 3.0001E−03 | 2.2748E−03 | | −3.3064E−02 | −5.2583E−02 | |

| Surface # | | | | | | | |
|---|---|---|---|---|---|---|---|
| | 10 | 11 | 12 | 13 | 14 | 15 | 16 |
| k = | −3.4027E+01 | −6.4346E+00 | −2.0845E+01 | −8.0679E+00 | −9.7889E+00 | 2.1071E−01 | −9.0308E+00 |
| A4 = | −7.4631E−02 | −2.0460E−01 | −3.2665E−01 | −8.0916E−02 | 8.6047E−02 | −1.2467E−01 | −1.2503E−01 |
| A6 = | −5.5778E−02 | 3.8278E−01 | 2.8425E−01 | 9.4129E−02 | 2.9627E−02 | −1.8894E−02 | 5.9659E−02 |
| A8 = | 6.3191E−02 | −4.8447E−01 | −2.3990E−01 | −9.9779E−02 | −9.6360E−02 | 5.8871E−02 | −2.0091E−02 |
| A10 = | −5.5284E−02 | 3.5896E−01 | 1.3651E−01 | 3.8420E−02 | 5.7098E−02 | −2.5790E−02 | 4.8450E−03 |
| A12 = | 4.2053E−02 | −1.5535E−01 | −4.2652E−02 | −5.9381E−03 | −1.6084E−02 | 5.4968E−03 | −8.4247E−04 |
| A14 = | −2.4448E−02 | 3.5245E−02 | 6.7790E−03 | 2.6406E−04 | 2.4080E−03 | −6.4585E−04 | 9.5397E−05 |
| A16 = | 6.4884E−03 | −3.1610E−03 | −4.3787E−04 | 9.3447E−06 | −1.8310E−04 | 4.0271E−05 | −6.0052E−06 |
| A18 = | | | | | 5.4766E−06 | −1.0452E−06 | 1.5691E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | |
|---|---|
| f [mm] | 4.27 |
| f/EPD | 1.73 |
| HFOV [deg.] | 39.0 |
| V4 + V5 | 56.4 |
| V40 | 3 |
| TL/ImgH | 1.48 |
| |(R11 + R12)/(R11 − R12)| | 0.02 |
| R10/R1 | 1.22 |
| f5/f3 | −0.18 |
| f5/f2 | 0.35 |

-continued

| 8th Embodiment | |
|---|---|
| CT6/T67 | 1.97 |
| ΣAT/(T12 + T34 + T56) | 3.95 |
| Td/EPD | 1.69 |
| Td/ΣCT | 1.44 |
| f/R10 | 1.99 |
| (f/f4) + (f/f5) | −1.24 |
| f/f5 | −1.08 |

9th Embodiment

Figure 17:
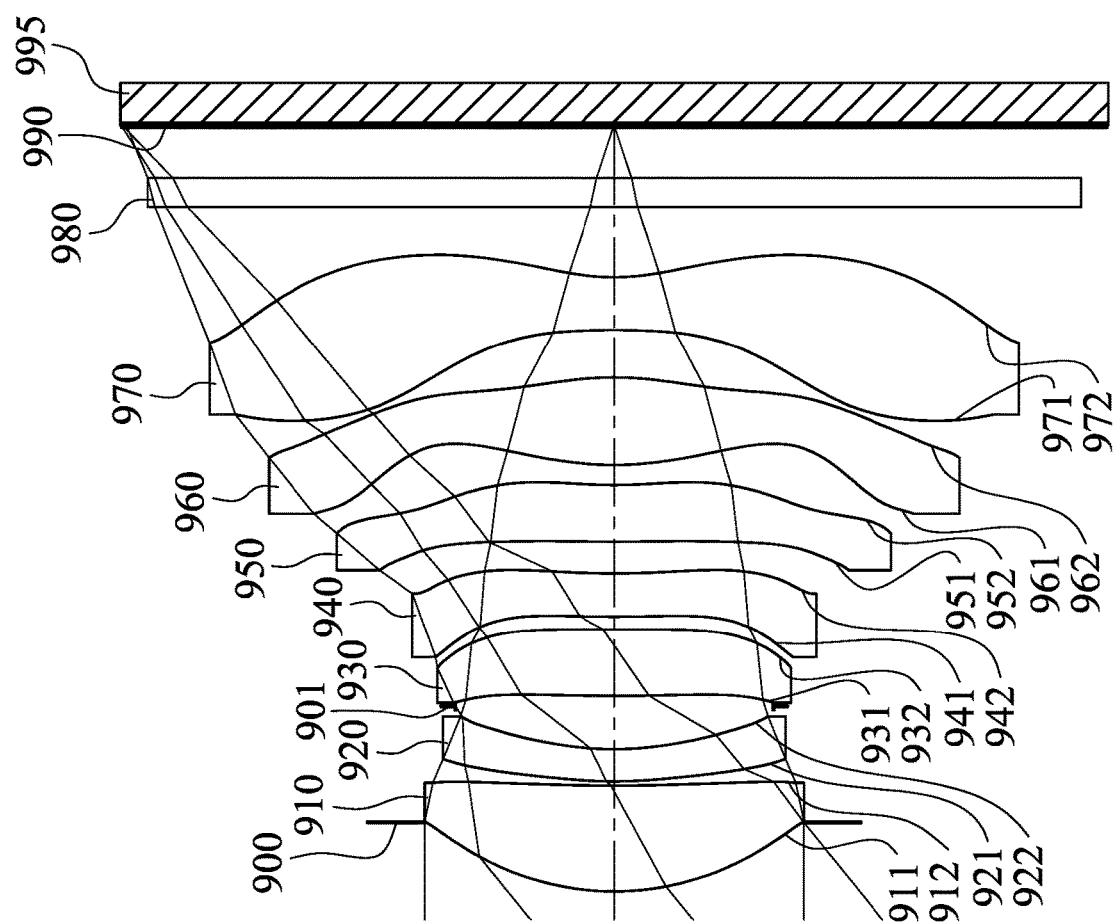
FIG. 17 is a schematic view of an imaging apparatus according to the 9th embodiment of the present disclosure.
Figure 18:
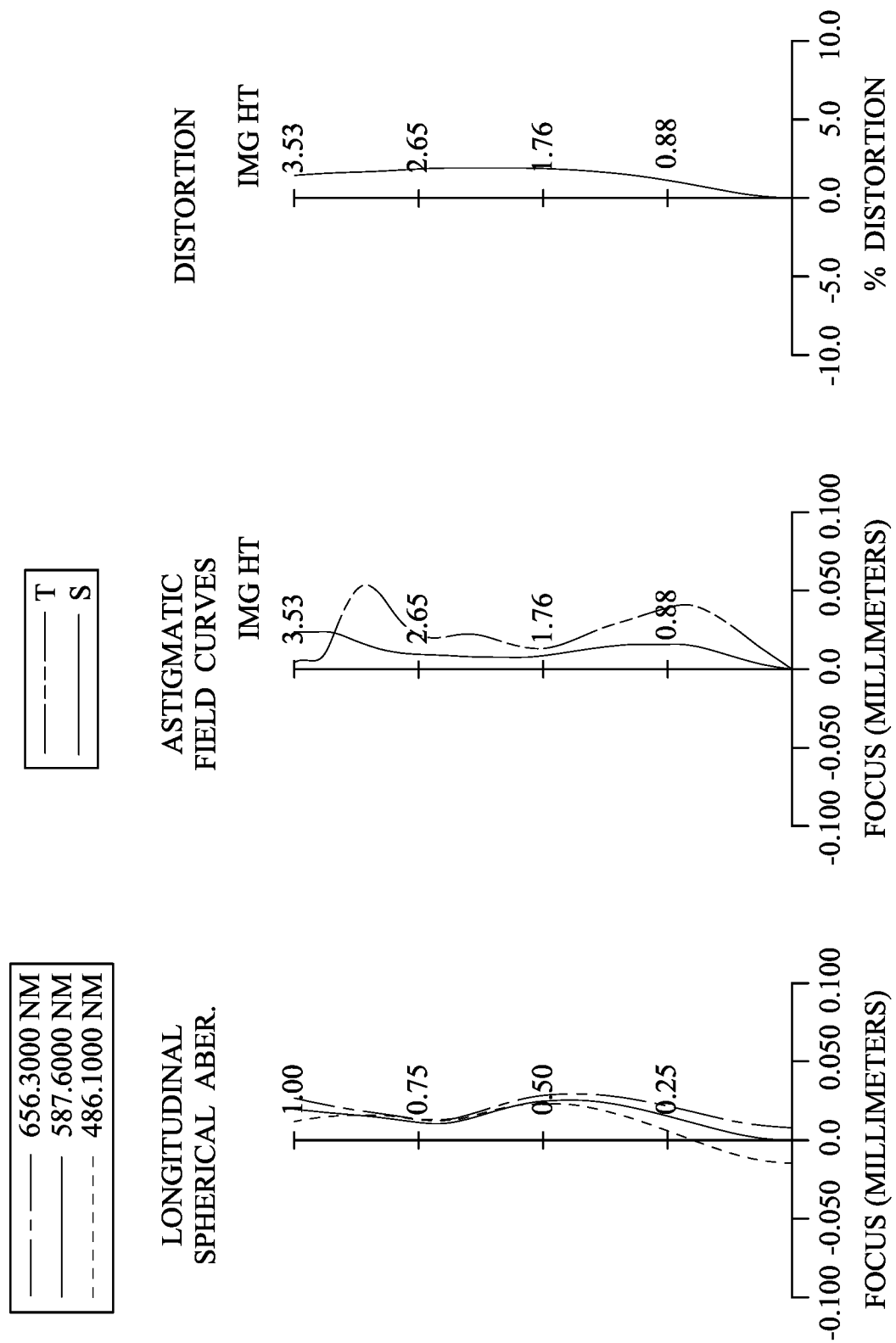
FIG. 18 shows, in order from left to right, spherical aberration curves, astigmatic field curves and a distortion curve of the imaging apparatus of the 9th embodiment.

FIG. 17 is a schematic view of an imaging apparatus according to the 9th embodiment of the present disclosure. FIG. 18 shows, in order from left to right, spherical aberration curves, astigmatic field curves and a distortion curve of the imaging apparatus of the 9th embodiment. As shown in FIG. 17, the imaging apparatus of the 9th embodiment includes a photographing optical lens assembly (reference number is omitted) and an image sensor 995. The photographing optical lens assembly includes, in order from an object side to an image side, an aperture stop 900, a first lens element 910, a second lens element 920, a stop 901, a third lens element 930, a fourth lens element 940, a fifth lens element 950, a sixth lens element 960, a seventh lens element 970, a filter 980 and an image surface 990, wherein the image sensor 995 is disposed on the image surface 990 of the photographing optical lens assembly. The photographing optical lens assembly includes seven lens elements (910, 920, 930, 940, 950, 960, 970) without additional one or more lens elements inserted between the first lens element 910 and the seventh lens element 970.

The first lens element 910 with positive refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of a plastic material, and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of a plastic material, and has the object-side surface 941 and the image-side surface 942 being both aspheric.

The fifth lens element 950 with negative refractive power has an object-side surface 951 being convex in a paraxial region thereof and an image-side surface 952 being concave in a paraxial region thereof. The fifth lens element 950 is made of a plastic material, and has the object-side surface 951 and the image-side surface 952 being both aspheric. Furthermore, the image-side surface 952 of the fifth lens element 950 includes at least three inflection points and at least one convex critical point.

The sixth lens element 960 with positive refractive power has an object-side surface 961 being convex in a paraxial region thereof and an image-side surface 962 being convex in a paraxial region thereof. The sixth lens element 960 is made of a plastic material, and has the object-side surface 961 and the image-side surface 962 being both aspheric.

The seventh lens element 970 with negative refractive power has an object-side surface 971 being concave in a paraxial region thereof and an image-side surface 972 being concave in a paraxial region thereof. The seventh lens element 970 is made of a plastic material, and has the object-side surface 971 and the image-side surface 972 being both aspheric. Furthermore, the image-side surface 972 of the seventh lens element 970 includes at least one convex critical point in an off-axis region thereof.

The filter 980 is made of a glass material and disposed between the seventh lens element 970 and the image surface 990 and will not affect the focal length of the photographing optical lens assembly.

The detailed optical data of the 9th embodiment are shown in Table 17 and the aspheric surface data are shown in Table 18 below.

TABLE 17

9th Embodiment
f = 4.28 mm, Fno = 1.58, HFOV = 39.0度

| Surface # |  | Curvature radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.493 |  |  |  |  |
| 2 | Lens 1 | 2.005 | ASP | 0.755 | Plastic | 1.545 | 56.1 | 4.47 |
| 3 |  | 9.801 | ASP | 0.030 |  |  |  |  |
| 4 | Lens 2 | 3.264 | ASP | 0.230 | Plastic | 1.669 | 19.5 | −12.47 |
| 5 |  | 2.280 | ASP | 0.308 |  |  |  |  |
| 6 | Stop | Plano |  | 0.073 |  |  |  |  |
| 7 | Lens 3 | 15.115 | ASP | 0.479 | Plastic | 1.544 | 56.0 | 25.93 |
| 8 |  | −209.130 | ASP | 0.091 |  |  |  |  |
| 9 | Lens 4 | 10.687 | ASP | 0.312 | Plastic | 1.639 | 23.5 | −25.11 |
| 10 |  | 6.340 | ASP | 0.227 |  |  |  |  |
| 11 | Lens 5 | 14.756 | ASP | 0.404 | Plastic | 1.566 | 37.4 | −7.76 |
| 12 |  | 3.353 | ASP | 0.142 |  |  |  |  |
| 13 | Lens 6 | 2.165 | ASP | 0.627 | Plastic | 1.544 | 56.0 | 2.10 |
| 14 |  | −2.182 | ASP | 0.342 |  |  |  |  |
| 15 | Lens 7 | −6.431 | ASP | 0.380 | Plastic | 1.534 | 55.9 | −2.33 |
| 16 |  | 1.573 | ASP | 0.500 |  |  |  |  |
| 17 | Filter | Plano |  | 0.210 | Glass | 1.517 | 64.2 | — |
| 18 |  | Plano |  | 0.376 |  |  |  |  |
| 19 | Image | Plano |  | — |  |  |  |  |

Reference wavelength is 587.6 nm (d-line).

Effective radius of Surface 6 is 1.137 mm.

Effective radius of Surface 14 is 2.470 mm.

TABLE 18

Aspheric Coefficients

| Surface # | 2 | 3 | 4 | 5 | 7 | 8 | 9 |
|---|---|---|---|---|---|---|---|
| k = | −1.1936E−01 | 3.9015E+01 | −2.8845E+00 | −1.5696E+00 | 6.6419E+01 | 9.0000E+01 | 5.8136E+01 |
| A4 = | 1.3509E−03 | −8.8231E−02 | −1.1674E−01 | −5.0885E−02 | −9.5146E−03 | 8.8920E−05 | −5.5074E−02 |
| A6 = | 1.0860E−02 | 1.3405E−01 | 1.1319E−01 | 1.1093E−02 | −7.2879E−02 | −2.6079E−01 | −2.7227E−01 |
| A8 = | −2.8759E−02 | −1.2584E−01 | −4.3251E−02 | 2.2873E−02 | 1.0580E−01 | 4.4156E−01 | 3.7754E−01 |
| A10 = | 3.9142E−02 | 5.9797E−02 | −2.3325E−02 | −1.3094E−02 | −1.4568E−01 | −4.6936E−01 | −3.0190E−01 |
| A12 = | −2.9517E−02 | −1.1674E−02 | 3.3437E−02 | −5.3633E−03 | 8.9967E−02 | 2.5508E−01 | 1.2168E−01 |
| A14 = | 1.1317E−02 | −9.4612E−04 | −9.3301E−03 | 8.9234E−03 | −1.8059E−02 | −5.4276E−02 | −1.7896E−02 |

| Surface # | 10 | 11 | 12 | 13 | 14 | 15 | 16 |
|---|---|---|---|---|---|---|---|
| k = | −5.9863E+00 | 6.0919E+01 | −4.8926E+00 | −5.5464E+00 | −1.3441E+01 | 3.8478E−01 | −7.9290E+00 |
| A4 = | −2.4565E−02 | −1.3155E−01 | −3.4077E−01 | −6.9606E−02 | 8.2101E−02 | −1.2694E−01 | −1.0689E−01 |
| A6 = | −1.2573E−01 | 2.5343E−01 | 3.1373E−01 | 6.0994E−02 | 1.5621E−04 | 2.3065E−02 | 5.4194E−02 |
| A8 = | 1.4274E−01 | −3.4259E−01 | −2.5568E−01 | −5.6372E−02 | −4.2948E−02 | 9.6836E−03 | −2.1808E−02 |
| A10 = | −9.5180E−02 | 2.7927E−01 | 1.4535E−01 | 1.9749E−02 | 2.3311E−02 | −1.8724E−03 | 6.6009E−03 |
| A12 = | 4.0598E−02 | −1.3377E−01 | −4.6903E−02 | −4.1109E−03 | −5.9223E−03 | −8.9720E−04 | −1.4232E−03 |
| A14 = | −1.3419E−02 | 3.3762E−02 | 7.7478E−03 | 8.4963E−04 | 9.0865E−04 | 3.8042E−04 | 2.0435E−04 |
| A16 = | 2.6955E−03 | −3.4306E−03 | −5.1382E−04 | −1.3484E−04 | −1.0094E−04 | −5.9329E−05 | −1.8282E−05 |
| A18 = | | | | 8.7470E−06 | 8.4560E−06 | 4.3950E−06 | 9.1731E−07 |
| A20 = | | | | | −3.6963E−07 | −1.2950E−07 | −1.9624E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.28 | TL/ImgH | 1.55 |
| f/EPD | 1.58 | \|(R11 + R12)/(R11 − R12)\| | 0.00 |
| HFOV [deg.] | 39.0 | R10/R1 | 1.67 |
| V4 + V5 | 60.9 | f5/f3 | −0.30 |
| V40 | 3.00 | f5/f2 | 0.62 |
| CT6/T67 | 1.83 | f/R10 | 1.28 |
| ΣAT/(T12 + T34 + T56) | 4.61 | (f/f4) + (f/f5) | −0.72 |
| Td/EPD | 1.62 | f/f5 | −0.55 |
| Td/ΣCT | 1.38 | | |

10th Embodiment

Figure 19:
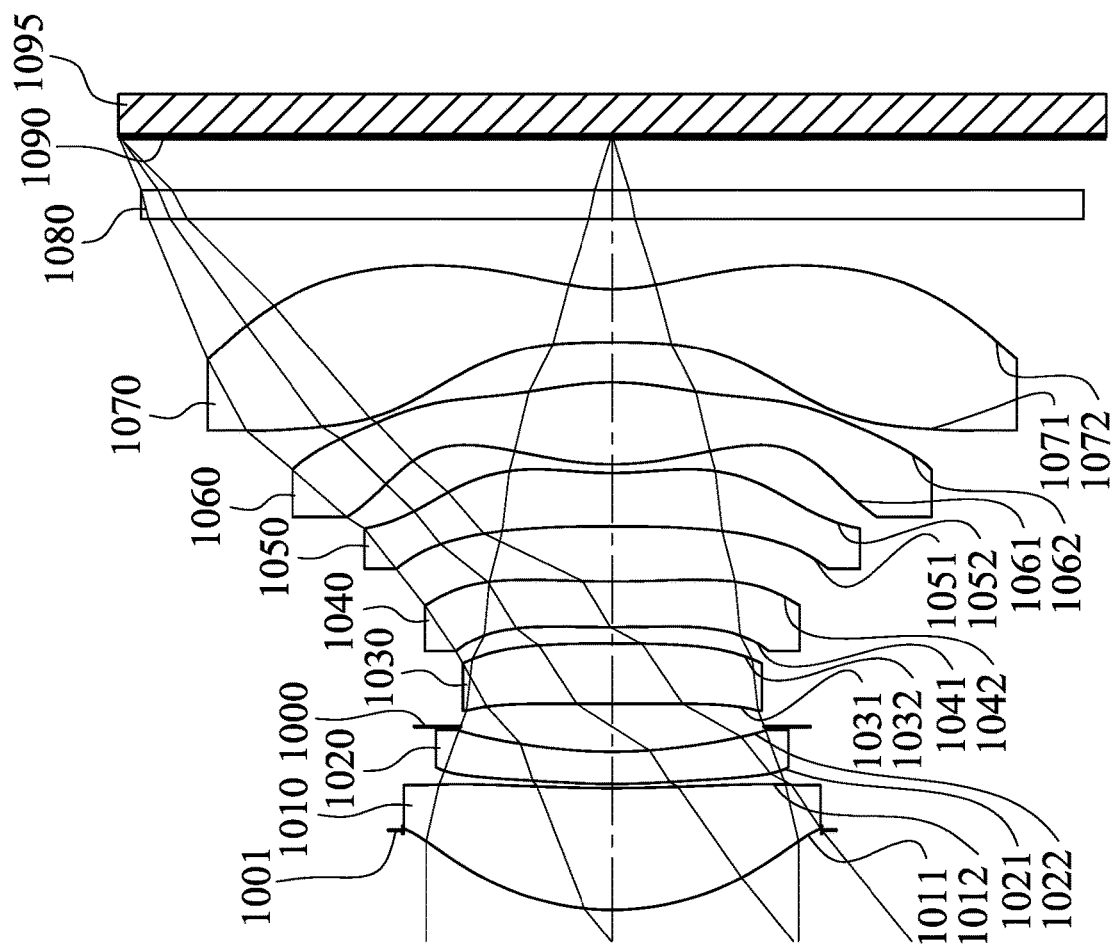
FIG. 19 is a schematic view of an imaging apparatus according to the 10th embodiment of the present disclosure.
Figure 20:
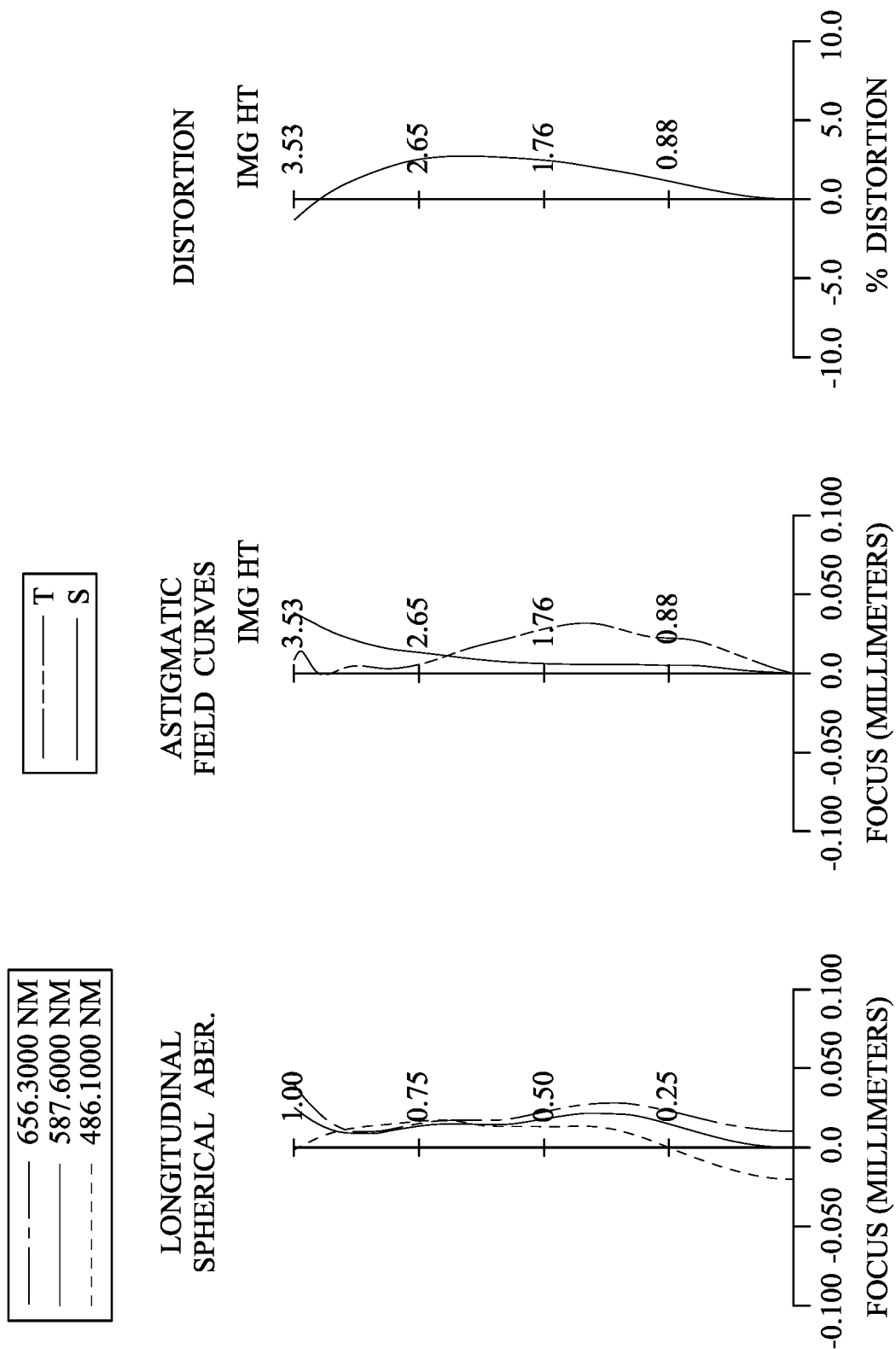
FIG. 20 shows, in order from left to right, spherical aberration curves, astigmatic field curves and a distortion curve of the imaging apparatus of the 10th embodiment.

FIG. 19 is a schematic view of an imaging apparatus according to the 10th embodiment of the present disclosure. FIG. 20 shows, in order from left to right, spherical aberration curves, astigmatic field curves and a distortion curve of the imaging apparatus of the 10th embodiment. As shown in FIG. 19, the imaging apparatus of the 9th embodiment includes a photographing optical lens assembly (reference number is omitted) and an image sensor 1095. The photographing optical lens assembly includes, in order from an object side to an image side, an stop 1001, a first lens element 1010, a second lens element 1020, an aperture stop 1000, a third lens element 1030, a fourth lens element 1040, a fifth lens element 1050, a sixth lens element 1060, a seventh lens element 1070, a filter 1080 and an image surface 1090, wherein the image sensor 1095 is disposed on the image surface 1090 of the photographing optical lens assembly. The photographing optical lens assembly includes seven lens elements (1010, 1020, 1030, 1040, 1050, 1060, 1070) without additional one or more lens elements inserted between the first lens element 1010 and the seventh lens element 1070.

The first lens element 1010 with positive refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of a plastic material, and has the object-side surface 1021 and the image-side surface 1022 being both aspheric.

The third lens element 1030 with positive refractive power has an object-side surface 1031 being convex in a paraxial region thereof and an image-side surface 1032 being convex in a paraxial region thereof. The third lens element 1030 is made of a plastic material, and has the object-side surface 1031 and the image-side surface 1032 being both aspheric.

The fourth lens element 1040 with negative refractive power has an object-side surface 1041 being convex in a paraxial region thereof and an image-side surface 1042 being concave in a paraxial region thereof. The fourth lens element 1040 is made of a plastic material, and has the object-side surface 1041 and the image-side surface 1042 being both aspheric.

The fifth lens element 1050 with negative refractive power has an object-side surface 1051 being concave in a paraxial region thereof and an image-side surface 1052 being concave in a paraxial region thereof. The fifth lens element 1050 is made of a plastic material, and has the object-side surface 1051 and the image-side surface 1052 being both aspheric. Furthermore, the image-side surface 1052 of the fifth lens element 1050 includes at least two inflection points and at least one convex critical point.

The sixth lens element 1060 with positive refractive power has an object-side surface 1061 being convex in a paraxial region thereof and an image-side surface 1062 being convex in a paraxial region thereof. The sixth lens element 1060 is made of a plastic material, and has the object-side surface 1061 and the image-side surface 1062 being both aspheric.

The seventh lens element 1070 with negative refractive power has an object-side surface 1071 being concave in a paraxial region thereof and an image-side surface 1072 being concave in a paraxial region thereof. The seventh lens element 1070 is made of a plastic material, and has the object-side surface 1071 and the image-side surface 1072 being both aspheric. Furthermore, the image-side surface 1072 of the seventh lens element 1070 includes at least one convex critical point in an off-axis region thereof.

The filter 1080 is made of a glass material and disposed between the seventh lens element 1070 and the image surface 1090 and will not affect the focal length of the photographing optical lens assembly.

The detailed optical data of the 10th embodiment are shown in Table 19 and the aspheric surface data are shown in Table 20 below.

TABLE 19

10th Embodiment
f = 4.40 mm, Fno = 1.65, HFOV = 39.0 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Stop | Plano | | −0.570 | | | | |
| 2 | Lens 1 | 1.977 | ASP | 0.870 | Plastic | 1.544 | 56.0 | 4.40 |
| 3 | | 9.621 | ASP | 0.030 | | | | |
| 4 | Lens 2 | 5.445 | ASP | 0.230 | Plastic | 1.688 | 18.7 | −13.41 |
| 5 | | 3.365 | ASP | 0.181 | | | | |
| 6 | Ape. Stop | Plano | | 0.162 | | | | |
| 7 | Lens 3 | 37.510 | ASP | 0.434 | Plastic | 1.544 | 56.0 | 23.22 |
| 8 | | −18.974 | ASP | 0.121 | | | | |
| 9 | Lens 4 | 9.628 | ASP | 0.326 | Plastic | 1.688 | 18.7 | −55.38 |
| 10 | | 7.580 | ASP | 0.396 | | | | |
| 11 | Lens 5 | −21.474 | ASP | 0.381 | Plastic | 1.559 | 40.4 | −4.06 |
| 12 | | 2.551 | ASP | 0.061 | | | | |
| 13 | Lens 6 | 1.833 | ASP | 0.587 | Plastic | 1.556 | 46.3 | 1.81 |
| 14 | | −1.977 | ASP | 0.292 | | | | |
| 15 | Lens 7 | −7.765 | ASP | 0.380 | Plastic | 1.530 | 55.8 | −2.25 |
| 16 | | 1.436 | ASP | 0.500 | | | | |
| 17 | Filter | Plano | | 0.210 | Glass | 1.517 | 64.2 | — |
| 18 | | Plano | | 0.382 | | | | |
| 19 | Image | Plano | | — | | | | |

Reference wavelength is 587.6 nm (d-line).
Effective radius of Surface 1 is 1.500 mm.
Effective radius of Surface 16 is 2.900 mm.

TABLE 20

Aspheric Coefficients

| | Surface # | | | | | | |
|---|---|---|---|---|---|---|---|
| | 2 | 3 | 4 | 5 | 7 | 8 | 9 |
| k = | −1.2531E−01 | 3.1098E+01 | −4.2825E−01 | −1.2861E+00 | −6.4080E+01 | 5.8136E+01 | −7.6411E+01 |
| A4 = | 4.1503E−03 | −6.1653E−02 | −8.7901E−02 | −4.1078E−02 | −2.7586E−02 | −9.9886E−02 | −1.6002E−01 |
| A6 = | −1.2960E−02 | 7.1694E−02 | 9.5013E−02 | 8.7465E−03 | −3.5118E−02 | 2.6640E−02 | 6.4252E−02 |
| A8 = | 3.3376E−02 | −5.9166E−02 | −7.6781E−02 | 2.4179E−02 | 5.1069E−02 | 3.7462E−03 | −1.2905E−01 |
| A10 = | −4.6979E−02 | 2.1300E−02 | 4.8308E−02 | −2.7079E−02 | −8.7608E−02 | −2.9167E−02 | 1.8926E−01 |
| A12 = | 3.5009E−02 | −2.8853E−03 | −1.9052E−02 | 1.2328E−02 | 7.3162E−02 | 2.1643E−02 | −1.4766E−01 |
| A14 = | −1.3497E−02 | 7.0316E−05 | 4.6226E−03 | | −2.4105E−02 | −7.6735E−03 | 4.1213E−02 |

| | Surface # | | | | | | |
|---|---|---|---|---|---|---|---|
| | 10 | 11 | 12 | 13 | 14 | 15 | 16 |
| k = | −2.9415E+01 | 5.7359E+01 | −2.1460E+01 | −8.7490E+00 | −1.2213E+01 | 2.1163E+00 | −7.9475E+00 |
| A4 = | −8.3859E−02 | −1.1340E−01 | −3.1495E−01 | −8.1969E−02 | 8.0921E−02 | −1.7404E−01 | −1.1804E−01 |
| A6 = | −2.8084E−03 | 2.0272E−01 | 2.3916E−01 | 7.3317E−02 | 3.1886E−03 | 4.3874E−02 | 6.6770E−02 |
| A8 = | 1.3936E−02 | −2.6652E−01 | −1.7994E−01 | −6.3703E−02 | −3.9114E−02 | 1.9731E−02 | −2.6743E−02 |
| A10 = | −1.3497E−02 | 2.0602E−01 | 9.4747E−02 | 1.6403E−02 | 1.3142E−02 | −1.2420E−02 | 7.3237E−03 |
| A12 = | 8.1787E−03 | −9.2490E−02 | −2.6468E−02 | −5.2361E−04 | 6.7639E−04 | 2.8338E−03 | −1.3324E−03 |
| A14 = | −6.4634E−03 | 2.1783E−02 | 3.4660E−03 | −1.6694E−04 | −1.0452E−03 | −3.3677E−04 | 1.5104E−04 |
| A16 = | 2.2074E−03 | −2.0652E−03 | −1.5602E−04 | 3.6777E−07 | 1.8694E−04 | 2.0839E−05 | −9.5523E−06 |
| A18 = | | | | | −1.0774E−05 | −5.3209E−07 | 2.5619E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 4.40 | TL/ImgH | 1.57 |
| f/EPD | 1.65 | |(R11 + R12)/(R11 − R12)| | 0.04 |
| HFOV [deg.] | 39.0 | R10/R1 | 1.29 |
| V4 + V5 | 59.1 | f5/f3 | −0.17 |
| V40 | 2.00 | f5/f2 | 0.30 |
| CT6/T67 | 2.01 | f/R10 | 1.72 |
| ΣAT/(T12 + T34 + T56) | 5.86 | (f/f4) + (f/f5) | −1.16 |
| Td/EPD | 1.67 | f/f5 | −1.08 |
| Td/ΣCT | 1.39 | | |

11th Embodiment

Figure 21:
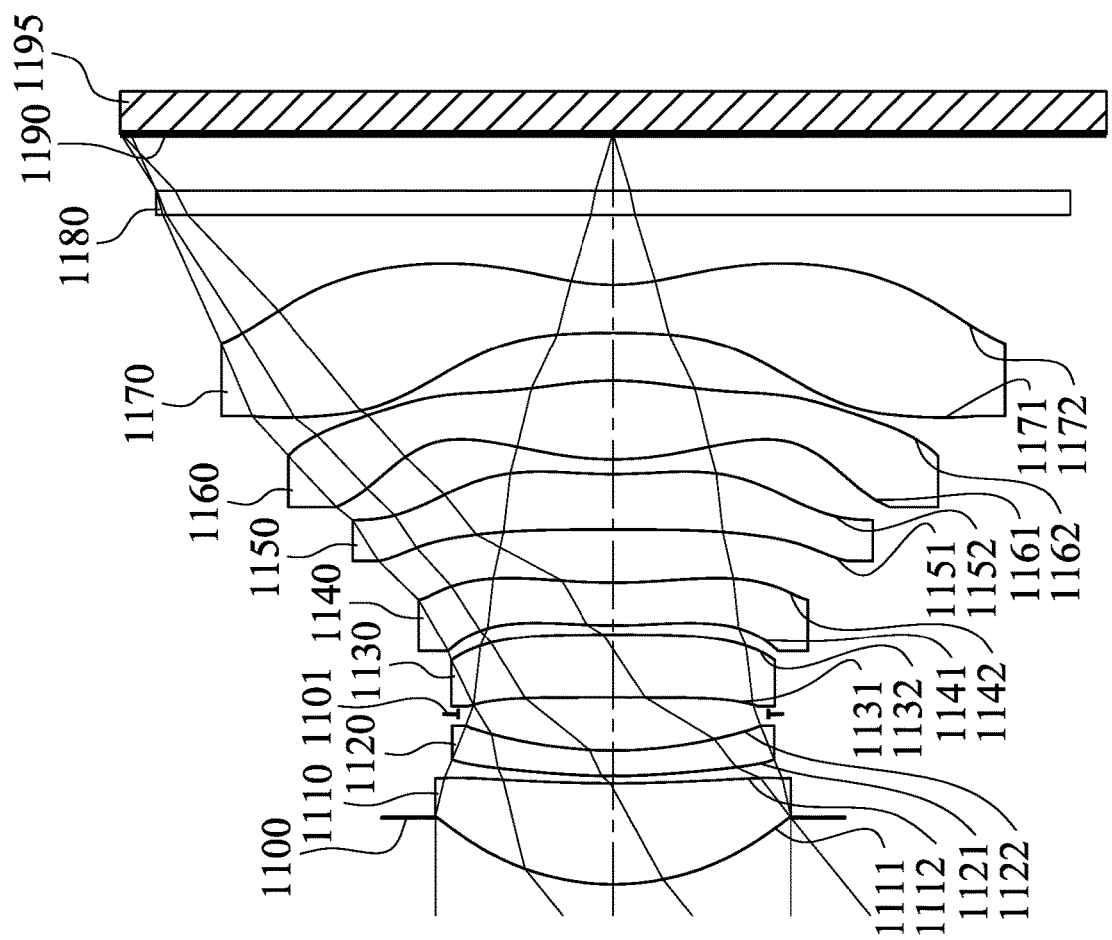
FIG. 21 is a schematic view of an imaging apparatus according to the 11th embodiment of the present disclosure.
Figure 22:
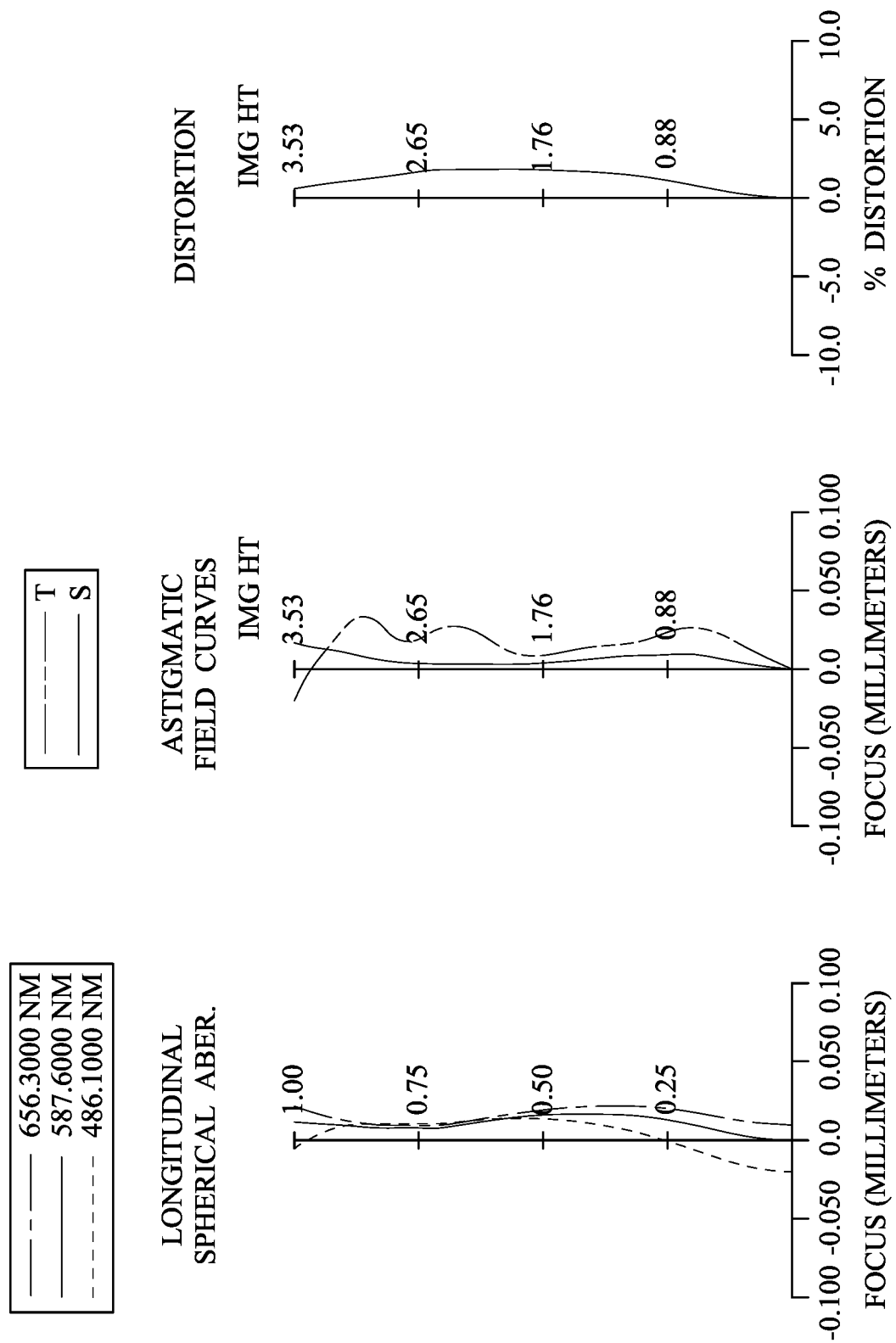
FIG. 22 shows, in order from left to right, spherical aberration curves, astigmatic field curves and a distortion curve of the imaging apparatus of the 11th embodiment.

FIG. 21 is a schematic view of an imaging apparatus according to the 11th embodiment of the present disclosure. FIG. 22 shows, in order from left to right, spherical aberration curves, astigmatic field curves and a distortion curve of the imaging apparatus of the 11th embodiment. As shown in FIG. 21, the imaging apparatus of the 9th embodiment includes a photographing optical lens assembly (reference number is omitted) and an image sensor 1195. The photographing optical lens assembly includes, in order from an object side to an image side, an aperture stop 1100, a first lens element 1110, a second lens element 1120, a stop 1101, a third lens element 1130, a fourth lens element 1140, a fifth lens element 1150, a sixth lens element 1160, a seventh lens element 1170, a filter 1180 and an image surface 1190, wherein the image sensor 1195 is disposed on the image surface 1190 of the photographing optical lens assembly. The photographing optical lens assembly includes seven lens elements (1110, 1120, 1130, 1140, 1150, 1160, 1170) without additional one or more lens elements inserted between the first lens element 1110 and the seventh lens element 1170.

The first lens element 1110 with positive refractive power has an object-side surface 1111 being convex in a paraxial region thereof and an image-side surface 1112 being concave in a paraxial region thereof. The first lens element 1110 is made of a plastic material, and has the object-side surface 1111 and the image-side surface 1112 being both aspheric.

The second lens element 1120 with negative refractive power has an object-side surface 1121 being convex in a paraxial region thereof and an image-side surface 1122 being concave in a paraxial region thereof. The second lens element 1120 is made of a plastic material, and has the object-side surface 1121 and the image-side surface 1122 being both aspheric.

The third lens element 1130 with negative refractive power has an object-side surface 1131 being concave in a paraxial region thereof and an image-side surface 1132 being concave in a paraxial region thereof. The third lens element 1130 is made of a plastic material, and has the object-side surface 1131 and the image-side surface 1132 being both aspheric.

The fourth lens element 1140 with positive refractive power has an object-side surface 1141 being convex in a paraxial region thereof and an image-side surface 1142 being concave in a paraxial region thereof. The fourth lens element 1140 is made of a plastic material, and has the object-side surface 1141 and the image-side surface 1142 being both aspheric.

The fifth lens element 1150 with negative refractive power has an object-side surface 1151 being convex in a paraxial region thereof and an image-side surface 1152 being concave in a paraxial region thereof. The fifth lens element 1150 is made of a plastic material, and has the object-side surface 1151 and the image-side surface 1152 being both aspheric. Furthermore, the image-side surface 1152 of the fifth lens element 1150 includes at least three inflection points and at least one convex critical point.

The sixth lens element 1160 with positive refractive power has an object-side surface 1161 being convex in a paraxial region thereof and an image-side surface 1162 being convex in a paraxial region thereof. The sixth lens element 1160 is made of a plastic material, and has the object-side surface 1161 and the image-side surface 1162 being both aspheric.

The seventh lens element 1170 with negative refractive power has an object-side surface 1171 being concave in a paraxial region thereof and an image-side surface 1172 being concave in a paraxial region thereof. The seventh lens element 1170 is made of a plastic material, and has the object-side surface 1171 and the image-side surface 1172 being both aspheric. Furthermore, the image-side surface 1172 of the seventh lens element 1170 includes at least one convex critical point in an off-axis region thereof.

The filter 1180 is made of a glass material and disposed between the seventh lens element 1170 and the image surface 1190 and will not affect the focal length of the photographing optical lens assembly.

The detailed optical data of the 11th embodiment are shown in Table 21 and the aspheric surface data are shown in Table 22 below.

TABLE 21

11th Embodiment
f = 4.33 mm, Fno = 1.70, HFOV = 39.0 deg.

| Surface # | | Curvature radius | | Thickness | Material | Index | Abbe # | Focal Length |
|---|---|---|---|---|---|---|---|---|
| 0 | Object | Plano | | Infinity | | | | |
| 1 | Ape. stop | Plano | | −0.477 | | | | |
| 2 | Lens 1 | 1.859 | ASP | 0.722 | Plastic | 1.543 | 56.5 | 4.19 |
| 3 | | 8.756 | ASP | 0.054 | | | | |
| 4 | Lens 2 | 4.312 | ASP | 0.180 | Plastic | 1.688 | 18.7 | −12.16 |

TABLE 21-continued

11th Embodiment
f = 4.33 mm, Fno = 1.70, HFOV = 39.0 deg.

| Surface # | | Curvature radius | | Thickness | Material | Index | Abbe # | Focal Length |
|---|---|---|---|---|---|---|---|---|
| 5 | | 2.797 | ASP | 0.262 | | | | |
| 6 | Stop | Plano | | 0.119 | | | | |
| 7 | Lens 3 | −119.645 | ASP | 0.451 | Plastic | 1.543 | 56.5 | −142.61 |
| 8 | | 220.273 | ASP | 0.067 | | | | |
| 9 | Lens 4 | 4.123 | ASP | 0.308 | Plastic | 1.656 | 21.3 | 124.75 |
| 10 | | 4.213 | ASP | 0.378 | | | | |
| 11 | Lens 5 | 53.924 | ASP | 0.398 | Plastic | 1.559 | 40.4 | −6.17 |
| 12 | | 3.232 | ASP | 0.105 | | | | |
| 13 | Lens 6 | 2.032 | ASP | 0.563 | Plastic | 1.544 | 56.0 | 2.05 |
| 14 | | −2.240 | ASP | 0.345 | | | | |
| 15 | Lens 7 | −8.800 | ASP | 0.345 | Plastic | 1.534 | 55.9 | −2.34 |
| 16 | | 1.472 | ASP | 0.500 | | | | |
| 17 | Filter | Plano | | 0.175 | Glass | 1.517 | 64.2 | — |
| 18 | | Plano | | 0.406 | | | | |
| 19 | Image | Plano | | — | | | | |

Reference wavelength is 587.6 nm (d-line).
Effective radius of Surface 6 is 1.110 mm.
Effective radius of Surface 13 is 1.980 mm.

TABLE 22

Aspheric Coefficients

| | Surface # | | | | | | |
|---|---|---|---|---|---|---|---|
| | 2 | 3 | 4 | 5 | 7 | 8 | 9 |
| k = | −1.2971E−01 | 3.1862E+01 | 3.6814E−01 | −1.0015E+00 | 9.0000E+01 | −9.0000E+01 | −5.3541E+01 |
| A4 = | 1.4442E−03 | −6.8430E−02 | −1.1607E−01 | −6.3337E−02 | −7.0126E−03 | −1.6292E−01 | −1.6134E−01 |
| A6 = | 1.2859E−02 | 9.9055E−02 | 1.3509E−01 | 5.7425E−02 | −6.2053E−02 | 1.6107E−01 | 2.8331E−02 |
| A8 = | −3.1681E−02 | −8.5562E−02 | −7.3047E−02 | −1.7368E−02 | 9.1743E−02 | −8.8892E−02 | 7.3287E−02 |
| A10 = | 4.6871E−02 | 2.5816E−02 | −1.2215E−02 | −1.6129E−02 | −1.4700E−01 | −7.2829E−02 | −1.4035E−01 |
| A12 = | −3.9652E−02 | 3.8514E−03 | 3.7894E−02 | 1.7501E−02 | 1.0088E−01 | 9.0963E−02 | 7.3511E−02 |
| A14 = | 1.7578E−02 | −3.4688E−03 | −1.1469E−02 | | −2.4329E−02 | −2.6588E−02 | −1.2368E−02 |
| A16 = | −3.5432E−03 | | | | | | |

| | Surface # | | | | | | |
|---|---|---|---|---|---|---|---|
| | 10 | 11 | 12 | 13 | 14 | 15 | 16 |
| k = | −2.2260E+01 | 9.0000E+01 | −1.5561E+01 | −8.1188E+00 | −1.2224E+01 | 3.4827E+00 | −7.2683E+00 |
| A4 = | −8.1399E−02 | −1.1806E−01 | −3.3676E−01 | −5.9165E−02 | 1.2741E−01 | −1.5615E−01 | −1.3030E−01 |
| A6 = | −3.6784E−02 | 1.9367E−01 | 2.9762E−01 | 6.2497E−02 | −4.1458E−02 | 1.7177E−01 | 6.7915E−02 |
| A8 = | 1.1076E−01 | −2.3814E−01 | −2.3854E−01 | −7.1756E−02 | −2.8894E−02 | 3.4438E−02 | −2.5475E−02 |
| A10 = | −1.3767E−01 | 1.7856E−01 | 1.3287E−01 | 2.8516E−02 | 2.0881E−02 | −1.6709E−02 | 6.8630E−03 |
| A12 = | 9.0065E−02 | −7.8754E−02 | −4.1840E−02 | −5.5752E−03 | −4.9325E−03 | 3.5568E−03 | −1.2831E−03 |
| A14 = | −3.3003E−02 | 1.8339E−02 | 6.7983E−03 | 6.8687E−04 | 4.4796E−04 | −4.0652E−04 | 1.5230E−04 |
| A16 = | 5.5551E−03 | −1.7106E−03 | −4.4828E−04 | −4.8389E−05 | 2.1419E−07 | 2.4333E−05 | −1.0072E−05 |
| A18 = | | | | | −1.6242E−06 | −5.9936E−07 | 2.8015E−07 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

11th Embodiment

| | | | |
|---|---|---|---|
| f [mm] | 4.33 | TL/ImgH | 1.52 |
| f/EPD | 1.70 | \|(R11 + R12)/(R11 − R12)\| | 0.05 |
| HFOV [deg.] | 39.0 | R10/R1 | 1.74 |
| V4 + V5 | 61.7 | f5/f3 | 0.04 |
| V40 | 2.00 | f5/f2 | 0.51 |
| CT6/T67 | 1.63 | f/R10 | 1.34 |
| ΣAT/(T12 + T34 + T56) | 5.88 | (f/f4) + (f/f5) | −0.67 |
| Td/EPD | 1.69 | f/f5 | −0.70 |
| Td/ΣCT | 1.45 | | |

12th Embodiment

Figure 23:
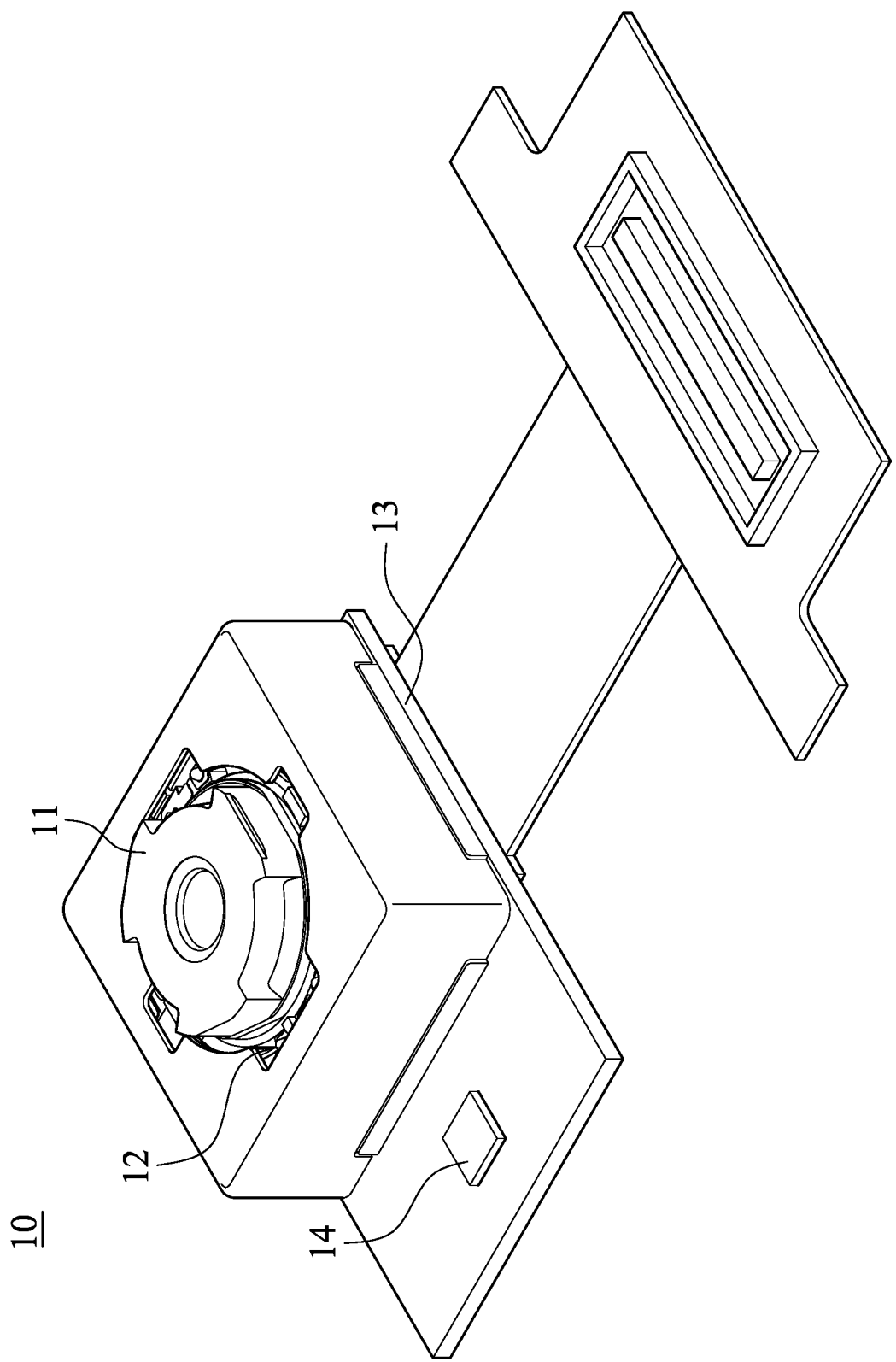
FIG. 23 is a schematic view of an imaging apparatus according to the 12th embodiment of the present disclosure.

FIG. 23 is a schematic view of an imaging apparatus 10 according to the 12th embodiment of the present disclosure. As shown in FIG. 23, the imaging apparatus 10 of the 12th embodiment is a camera module, the imaging apparatus 10 includes an imaging lens assembly 11, a driving apparatus 12 and an image sensor 13, wherein the imaging lens assembly 11 includes the photographing optical lens assembly of the 1st embodiment and a lens barrel (not shown in drawings) for carrying the photographing optical lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto focus module, which can be driven by driving systems, such as voice coil motors (VCM), micro electro-mechanical systems (MEMS), piezoelectric systems, and shape memory alloys etc. The photographing optical lens assembly can obtain a favorable imaging position by the driving apparatus 12 so as to capture clear images when the imaged object is disposed at different object distances.

The imaging apparatus 10 can include the image sensor 13 located on the image surface of the photographing optical lens assembly, such as CMOS and CCD, with superior photosensitivity and low noise. Thus, it is favorable for providing realistic images with high definition image quality thereof.

Furthermore, the imaging apparatus 10 can further include an image stabilization module 14, which can be a kinetic energy sensor, such as an accelerometer, a gyro sensor, and a Hall Effect sensor. In the 12th embodiment, the image stabilization module 14 is a gyro sensor, but is not limited thereto. Therefore, the variation of different axial directions of the photographing optical lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

13th Embodiment

Figure 24A:
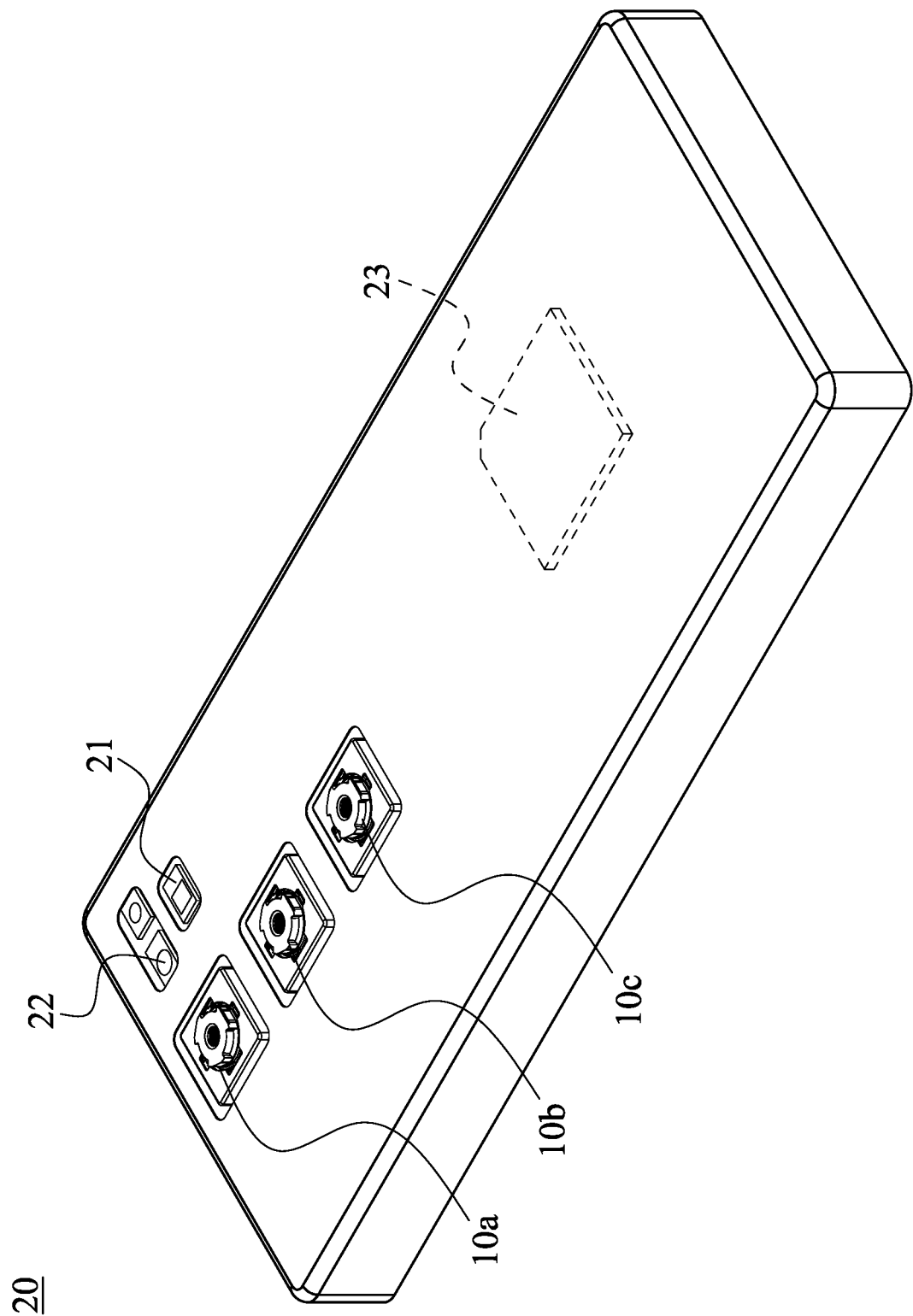
FIG. 24A is a schematic view of an electronic device according to the 13th embodiment of the present disclosure.
Figure 24B:
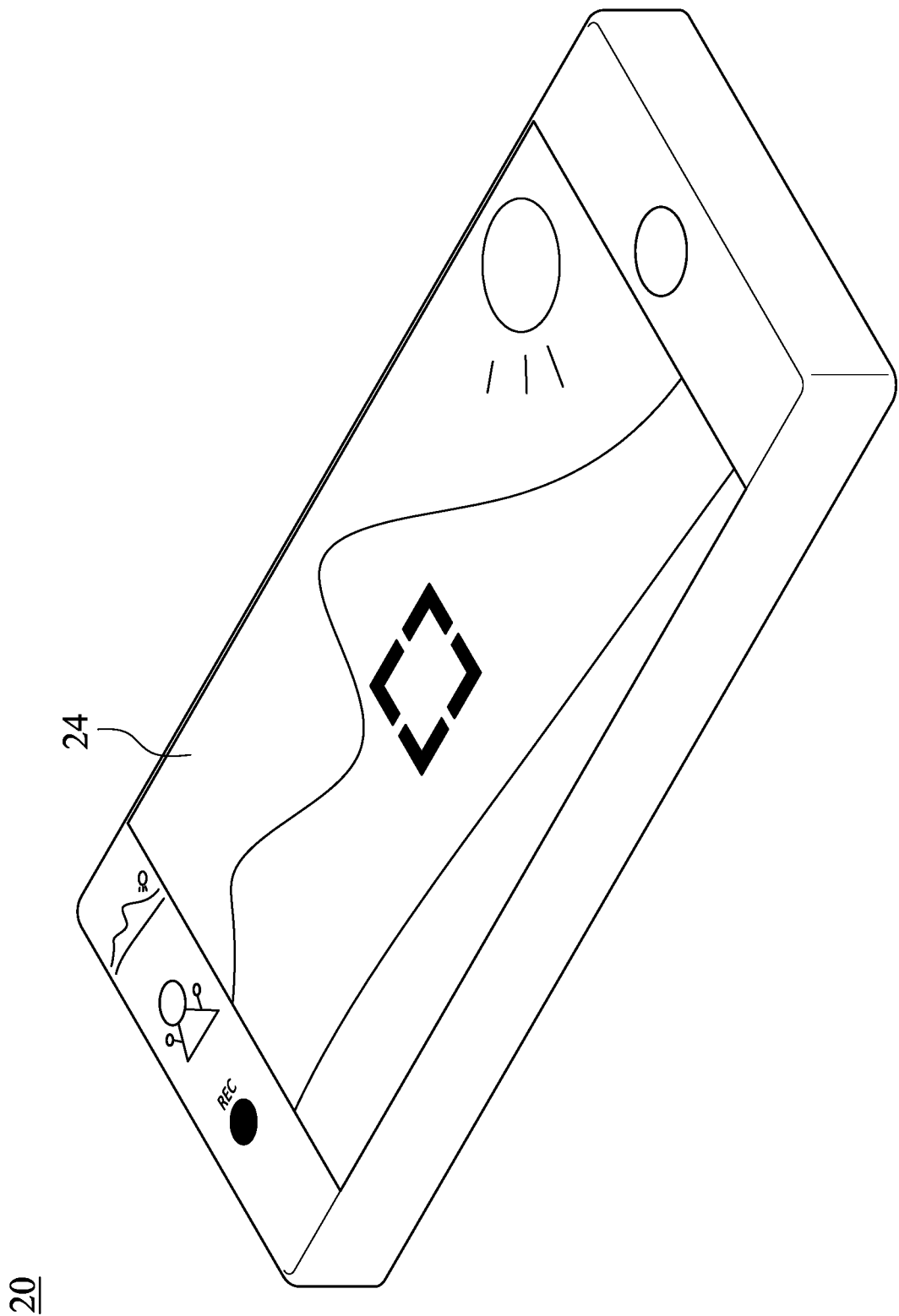
FIG. 24B is another schematic view of the electronic device of FIG. 24A.
Figure 24C:
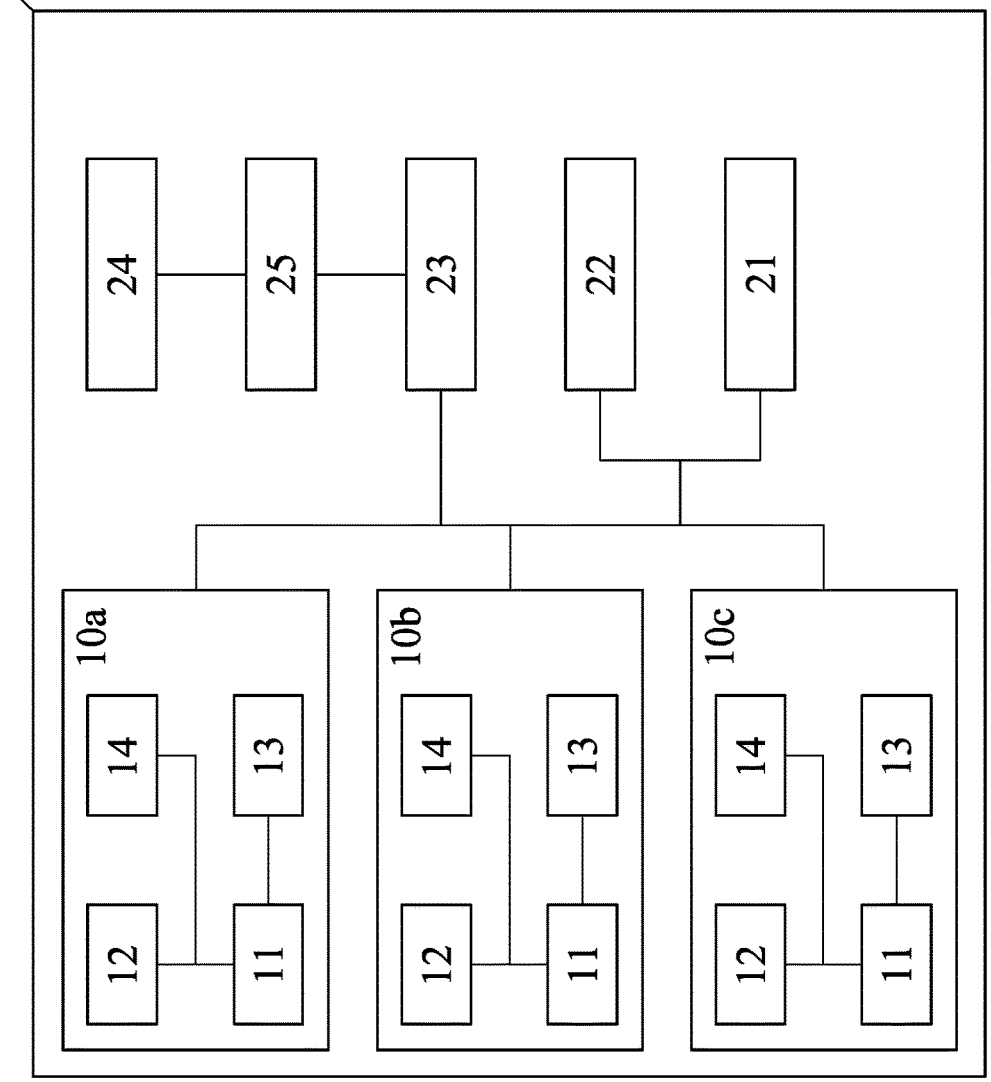
FIG. 24C is a system block diagram of the electronic device of FIG. 24A.

FIG. 24A is a schematic view of an electronic device 20 according to the 13th embodiment of the present disclosure. FIG. 24B is another schematic view of the electronic device 20 of FIG. 24A. FIG. 24C is a system block diagram of the electronic device 20 of FIG. 24A. as shown in FIG. 24A, FIG. 24B and FIG. 24C, the electronic device 20 according to the 13th embodiment is a smartphone, wherein the electronic device 20 includes three imaging apparatus 10a, 10b, 10c, a flash module 21, a focusing assisting module 22, an image signal processor (ISP) 23, a user interface 24 and an image software processor 25. When the user captures images of an imaged object 26 via the user interface 24, the electronic device 20 focuses and generates an image via the imaging apparatus 10a, 10b, 10c while compensating for low illumination via the flash module 21 when necessary. Then, the electronic device 20 quickly focuses on the imaged object according to its object distance information provided by the focusing assisting module 22, and optimizes the image via the image signal processor 23 and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

According to the 13th embodiment, the imaging apparatus 10a, 10b, 10c can be the same with the imaging apparatus 10 according to the 12th embodiment and will not describe again herein. In detail, the imaging apparatus 10a, 10b, 10c of the 13th embodiment can be respectively a telephoto imaging apparatus, a super wide-angle imaging apparatus and a wide-angle imaging apparatus (which has a view angle between the super wide-angle and the telephoto), or other kinds of imaging apparatus, and the present disclosure is not limited thereto.

14th Embodiment

Figure 25:
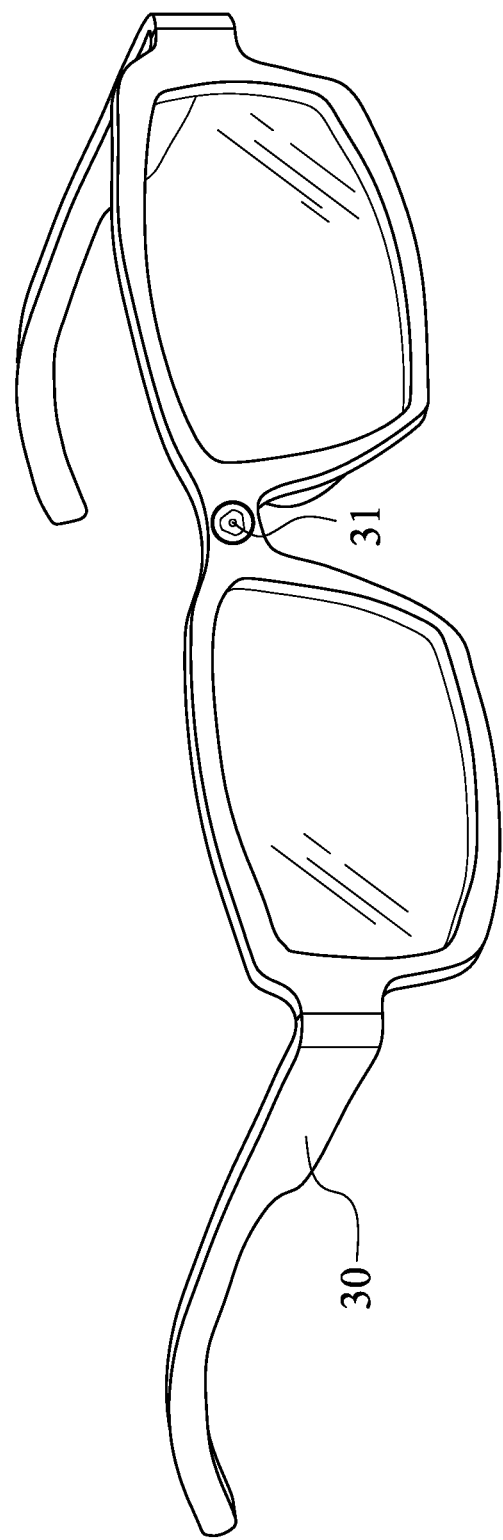
FIG. 25 is a schematic view of an electronic device according to the 14th embodiment of the present disclosure.

FIG. 25 is a schematic view of an electronic device 30 according to the 14th embodiment of the present disclosure. The electronic device 30 of the 14th embodiment is a wearable device. The electronic device 30 includes an imaging apparatus 31. The imaging apparatus 31 can be the same as that of the 12th embodiment, and will not be repeated herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising seven lens elements, the seven lens elements being, in order from an object side to an image side, a first lens element, a second lens element, a third lens element, a fourth lens element, a fifth lens element, a sixth lens element and a seventh lens element, wherein:

the first lens element has positive refractive power;

the fourth lens element has an image-side surface being convex in a paraxial region thereof;

the fifth lens element with negative refractive power has an image-side surface being concave in a paraxial region thereof;

the sixth lens element has an image-side surface being convex in a paraxial region thereof; and the seventh lens element has an image-side surface being concave in a paraxial region thereof, wherein the image-side surface of the seventh lens element comprises at least one convex critical point in an off-axis region thereof;

wherein an Abbe number of the fourth lens element is V4, an Abbe number of the fifth lens element is V5, a focal length of the photographing optical lens assembly is f, a focal length of the third lens element is f3, a focal length of the fourth lens element is f4, a focal length of the fifth lens element is f5, and the following conditions are satisfied:

$V4+V5<70;$ $-2.0<(f/f4)+(f/f5)<-0.50;$ and $-4.0<f5/f3<8.0.$

2. The photographing optical lens assembly of claim 1, wherein the sixth lens element has positive refractive power, and the seventh lens element has negative refractive power.

3. The photographing optical lens assembly of claim 1, wherein the focal length of the photographing optical lens assembly is f, the focal length of the fifth lens element is f5, and the following condition is satisfied:

$-1.50<f/f5<-0.50.$

4. The photographing optical lens assembly of claim 1, wherein the focal length of the third lens element is f3, the focal length of the fifth lens element is f5, and the following condition is satisfied:

$-3.0<f5/f3<3.0.$

5. The photographing optical lens assembly of claim 1, wherein a focal length of the second lens element is f2, the focal length of the fifth lens element is f5, and the following condition is satisfied:

$f5/f2<2.0.$

6. The photographing optical lens assembly of claim 1, wherein an axial distance between an object-side surface of the first lens element and the image-side surface of the seventh lens element is Td, an entrance pupil diameter of the photographing optical lens assembly is EPD, an axial distance between the object-side surface of the first lens element and an image surface is TL, a maximum image height of the photographing optical lens assembly is ImgH, and the following conditions are satisfied:

$-1.0<Td/EPD<2.0;$ and $0.80<TL/ImgH<1.70.$

7. The photographing optical lens assembly of claim 1, wherein the focal length of the photographing optical lens assembly is f, a curvature radius of an image-side surface of the fifth lens element is R10, and the following condition is satisfied:

$-1.0<f/R10<3.0.$

8. The photographing optical lens assembly of claim 1, wherein a curvature radius of an object-side surface of the sixth lens element is R11, a curvature radius of the image-side surface of the sixth lens element is R12, and the following condition is satisfied:

$|(R11+R12)/(R11-R12)|<0.50.$

9. The photographing optical lens assembly of claim 1, wherein the Abbe number of the fourth lens element is V4, the Abbe number of the fifth lens element is V5, and the following condition is satisfied:

$V4+V5<50.$

10. The photographing optical lens assembly of claim 1, wherein an axial distance between an object-side surface of the first lens element and the image-side surface of the seventh lens element is Td, a sum of all central thicknesses of lens elements of the photographing optical lens assembly is ΣCT, and the following condition is satisfied:

$-1.0<Td/\Sigma CT<1.55.$

11. The photographing optical lens assembly of claim 1, wherein the image-side surface of the fifth lens element comprises at least two inflection points.

12. The photographing optical lens assembly of claim 1, wherein an Abbe number of the sixth lens element is V6, and the following condition is satisfied:

$V6<32.$

13. The photographing optical lens assembly of claim 1, wherein a number of the lens elements of the photographing optical lens assembly having Abbe numbers less than or equal to 40 is V40, and the following condition is satisfied:

$5 \leq V40.$

14. The photographing optical lens assembly of claim 1, wherein a curvature radius of an object-side surface of the first lens element is R1, a curvature radius of the image-side surface of the fifth lens element is R10, and the following condition is satisfied:

$0.75<R10/R1<2.0.$

15. The photographing optical lens assembly of claim 1, wherein a central thickness of the sixth lens element is CT6, an axial distance between the sixth lens element and the seventh lens element is T67, and the following condition is satisfied:

$1.0<CT6/T67<3.0.$

16. The photographing optical lens assembly of claim 1, wherein a sum of all axial distances between adjacent lens elements of the photographing optical lens assembly is ΣAT, an axial distance between the first lens element and the second lens element is T12, an axial distance between the third lens element and the fourth lens element is T34, an axial distance between the fifth lens element and the sixth lens element is T56, and the following condition is satisfied:

$2.50<\Sigma AT/(T12+T34+T56).$

17. The photographing optical lens assembly of claim 1, wherein the focal length of the photographing optical lens assembly is f, the focal length of the fourth lens element is f4, the focal length of the fifth lens element is f5, and the following condition is satisfied:

$-2.0<(f/f4)+(f/f5)<-0.55.$

18. An image apparatus, comprising:
the photographing optical lens assembly of claim 1; and
an image sensor disposed on an image surface of the photographing optical lens assembly.

19. An electronic device, comprising:
the image apparatus of claim 18.

20. A photographing optical lens assembly comprising seven lens elements, the seven lens elements being, in order from an object side to an image side, a first lens element, a second lens element, a third lens element, a fourth lens element, a fifth lens element, a sixth lens element and a seventh lens element, wherein:
the first lens element has positive refractive power;
the fourth lens element has an image-side surface being convex in a paraxial region thereof;
the fifth lens element with negative refractive power has an image-side surface being concave in a paraxial region thereof;
the sixth lens element has an image-side surface being convex in a paraxial region thereof; and
the seventh lens element has an image-side surface being concave in a paraxial region thereof, and the image-side surface of the seventh lens element comprises at least one convex critical point in an off-axis region thereof;
wherein an Abbe number of the fourth lens element is V4, an Abbe number of the fifth lens element is V5, a focal length of the photographing optical lens assembly is f, a focal length of the fourth lens element is f4, a focal length of the fifth lens element is f5, and the following conditions are satisfied:

$V4+V5<70;$ $-2.0<(f/f4)+(f/f5)<-0.50;$ and $f/f5 \leq -0.25.$

21. The photographing optical lens assembly of claim 20, wherein the focal length of the photographing optical lens assembly is f, the focal length of the fifth lens element is f5, and the following condition is satisfied:

$-1.50<f/f5<-0.50.$

22. The photographing optical lens assembly of claim 20, wherein a number of the lens elements of the photographing optical lens assembly having Abbe numbers less than or equal to 40 is V40, and the following condition is satisfied:

$5 \leq V40.$

23. The photographing optical lens assembly of claim 20, wherein the focal length of the photographing optical lens assembly is f, a curvature radius of the image-side surface of the fifth lens element is R10, and the following condition is satisfied:

$1.0<f/R10<3.0.$

24. The photographing optical lens assembly of claim 20, wherein an axial distance between an object-side surface of the first lens element and the image-side surface of the seventh lens element is Td, an entrance pupil diameter of the photographing optical lens assembly is EPD, an axial distance between the object-side surface of the first lens element and an image surface is TL, a maximum image height of the photographing optical lens assembly is ImgH, and the following conditions are satisfied:

$1.0<Td/EPD<2.0;$ and $0.80<TL/ImgH<1.70.$

25. The photographing optical lens assembly of claim 20, wherein a focal length of the second lens element is f2, the focal length of the fifth lens element is f5, and the following condition is satisfied:

$f5/f2<2.0.$

26. The photographing optical lens assembly of claim 20, wherein the Abbe number of the fourth lens element is V4, the Abbe number of the fifth lens element is V5, and the following condition is satisfied:

$V4+V5<50.$

27. The photographing optical lens assembly of claim 20, wherein a sum of all axial distances between adjacent lens elements of the photographing optical lens assembly is $\Sigma AT$, an axial distance between the first lens element and the second lens element is T12, an axial distance between the third lens element and the fourth lens element is T34, an axial distance between the fifth lens element and the sixth lens element is T56, and the following condition is satisfied:

$2.50<\Sigma AT/(T12+T34+T56).$

28. An image apparatus, comprising:
the photographing optical lens assembly of claim 20; and
an image sensor disposed on an image surface of the photographing optical lens assembly.

29. An electronic device, comprising:
the image apparatus of claim 28.

* * * * *

UNITED STATES PATENT AND TRADEMARK OFFICE
CERTIFICATE OF CORRECTION

PATENT NO. : 11,249,282 B2
APPLICATION NO. : 16/299381
DATED : February 15, 2022
INVENTOR(S) : Cheng-Chen Lin et al.

Page 1 of 1

It is certified that error appears in the above-identified patent and that said Letters Patent is hereby corrected as shown below:

In the Claims (1) In Column 49, Line 37 (in Claim 6), please delete "-".

(2) In Column 49, Line 46 (in Claim 7), please delete "-".

(3) In Column 49, Line 67 (in Claim 10), please delete "-".

Signed and Sealed this
Twenty-sixth Day of April, 2022

Katherine Kelly Vidal
*Director of the United States Patent and Trademark Office*